(12) United States Patent
Lee

(10) Patent No.: US 12,369,509 B2
(45) Date of Patent: Jul. 29, 2025

(54) DISPLAY FOR CONTROLLING ROBOTIC TOOL

(71) Applicant: TECHTRONIC CORDLESS GP, Anderson, SC (US)

(72) Inventor: Chi Chau Lee, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 197 days.

(21) Appl. No.: 18/353,576

(22) Filed: Jul. 17, 2023

(65) Prior Publication Data

US 2024/0023474 A1 Jan. 25, 2024

Related U.S. Application Data

(60) Provisional application No. 63/390,574, filed on Jul. 19, 2022.

(51) Int. Cl.
*A01B 69/04* (2006.01)
*A01D 34/00* (2006.01)
*A01D 101/00* (2006.01)

(52) U.S. Cl.
CPC .......... *A01B 69/008* (2013.01); *A01D 34/008* (2013.01); *A01D 2101/00* (2013.01)

(58) Field of Classification Search
CPC ............... A01B 69/008; A01D 34/008; A01D 2101/00; G05D 2111/36; G05D 1/2246; G05D 1/247; G05D 1/661; G05D 2111/54; G05D 1/245; G05D 2105/15; G05D 2107/23; G05D 2109/10; G01C 21/20;

(Continued)

(56) References Cited

U.S. PATENT DOCUMENTS 923,312 A 6/1909 Alexanderson
2,511,124 A 6/1950 Phelps
(Continued)

FOREIGN PATENT DOCUMENTS

AU 2006100911 A4 11/2006
AU 2011239326 A1 11/2011
(Continued)

OTHER PUBLICATIONS

US 8,272,092 B2, 09/2012, Schnittman et al. (withdrawn)
(Continued)

*Primary Examiner* — Alan D Hutchinson
(74) *Attorney, Agent, or Firm* — Michael Best & Friedrich LLP

(57) ABSTRACT

An external device for use with one or more robotic tools, the external device including a display and an electronic processor, where when an initiate setup button is selected by a first user input, the processor is configured to send a signal to the first robotic garden tool to travel from a dock and along a perimeter of an operating area. When the add start point button is selected by a second user input, the processor is configured to retrieve a first position of the first robotic garden tool, the first position being indicative of a first start point remote of the dock, and where the first robotic garden tool is configured to return to the dock after traveling along the perimeter and to communicate a calculated boundary length based on the data gathered by the odometry unit to the processor.

20 Claims, 17 Drawing Sheets

(58) Field of Classification Search
CPC .... G01C 21/005; G01C 21/16; G01C 21/165; G01C 22/00
See application file for complete search history.

(56) References Cited

U.S. PATENT DOCUMENTS

| | | | |
|---|---|---|---|
| 2,539,779 | A | 1/1951 | Grosso |
| 2,701,942 | A | 2/1955 | Caldwell, Jr. et al. |
| 2,751,030 | A | 6/1956 | Null |
| 2,914,902 | A | 12/1959 | Beymer |
| 3,057,140 | A | 10/1962 | Amos et al. |
| 3,147,662 | A | 9/1964 | Snook |
| 3,311,738 | A | 3/1967 | Makow |
| 3,393,598 | A | 7/1968 | Bettinger |
| 3,500,622 | A | 3/1970 | Bowen |
| 3,570,227 | A | 3/1971 | Bellinger |
| 3,612,574 | A | 10/1971 | Klopfer et al. |
| 3,680,295 | A | 8/1972 | Rutherford |
| 3,776,327 | A | 12/1973 | Klopfer et al. |
| 4,065,913 | A | 1/1978 | Fisher et al. |
| 4,126,990 | A | 11/1978 | Fisher et al. |
| 4,126,991 | A | 11/1978 | Gobin et al. |
| 4,165,597 | A | 8/1979 | Scanland et al. |
| 4,205,510 | A | 6/1980 | Raniero |
| 4,268,964 | A | 5/1981 | Moore |
| 4,306,375 | A | 12/1981 | Goldfarb et al. |
| 4,333,202 | A | 6/1982 | Block |
| 4,351,132 | A | 9/1982 | Molin |
| 4,468,884 | A | 9/1984 | Goldfarb et al. |
| 4,492,058 | A | 1/1985 | Goldfarb et al. |
| 4,511,343 | A | 4/1985 | Goldfarb et al. |
| 4,522,606 | A | 6/1985 | Goldfarb et al. |
| 4,547,166 | A | 10/1985 | Goldfarb et al. |
| 4,591,347 | A | 5/1986 | Goldfarb et al. |
| 4,596,412 | A | 6/1986 | Everett et al. |
| 4,627,563 | A | 12/1986 | Meyer |
| 4,652,247 | A | 3/1987 | Goldfarb et al. |
| 4,673,370 | A | 6/1987 | Goldfarb et al. |
| 4,693,656 | A | 9/1987 | Guthrie |
| 4,787,794 | A | 11/1988 | Guthrie |
| 4,826,066 | A | 5/1989 | Koester et al. |
| 4,902,260 | A | 2/1990 | Im |
| 4,916,813 | A | 4/1990 | Elia |
| 4,951,985 | A | 8/1990 | Pong et al. |
| 4,958,068 | A | 9/1990 | Pong et al. |
| 4,962,453 | A | 10/1990 | Pong, Jr. et al. |
| 4,964,265 | A | 10/1990 | Young |
| 4,968,878 | A | 11/1990 | Pong et al. |
| 5,024,728 | A | 6/1991 | Morita et al. |
| 5,025,969 | A | 6/1991 | Koester et al. |
| 5,323,593 | A | 6/1994 | Cline et al. |
| 5,363,633 | A | 11/1994 | Masaru |
| 5,402,110 | A | 3/1995 | Oliver et al. |
| 5,406,778 | A | 4/1995 | Lamb et al. |
| 5,507,137 | A | 4/1996 | Norris |
| 5,540,037 | A | 7/1996 | Lamb et al. |
| 5,548,278 | A | 8/1996 | Oliver et al. |
| 5,553,445 | A | 9/1996 | Lamb et al. |
| 5,561,972 | A | 10/1996 | Rolfe |
| 5,572,856 | A | 11/1996 | Ku |
| 5,577,868 | A | 11/1996 | Chen |
| 5,703,569 | A | 12/1997 | Oliver et al. |
| 5,785,480 | A | 7/1998 | Difeo |
| 5,821,731 | A | 10/1998 | Kuki et al. |
| 5,850,135 | A | 12/1998 | Kuki et al. |
| 5,916,111 | A | 6/1999 | Colens |
| 5,942,869 | A | 8/1999 | Katou et al. |
| 6,076,025 | A | 6/2000 | Ueno et al. |
| 6,101,795 | A | 8/2000 | Diekhans |
| 6,212,917 | B1 | 4/2001 | Rathbun |
| 6,255,793 | B1 | 7/2001 | Peless et al. |
| 6,300,737 | B1 | 10/2001 | Bergvall et al. |
| 6,321,515 | B1 | 11/2001 | Colens |
| D451,931 | S | 12/2001 | Abramson et al. |
| 6,338,013 | B1 | 1/2002 | Ruffner |
| 6,339,735 | B1 | 1/2002 | Peless et al. |
| 6,417,641 | B2 | 7/2002 | Peless et al. |
| 6,442,845 | B2 | 9/2002 | Wheeler et al. |
| 6,443,509 | B1 | 9/2002 | Levin et al. |
| 6,460,253 | B1 | 10/2002 | Wheeler et al. |
| 6,465,982 | B1 | 10/2002 | Bergvall et al. |
| 6,481,515 | B1 | 11/2002 | Kirkpatrick et al. |
| 6,493,613 | B2 | 12/2002 | Peless et al. |
| 6,502,017 | B2 | 12/2002 | Ruffner |
| 6,525,509 | B1 | 2/2003 | Petersson et al. |
| 6,586,908 | B2 | 7/2003 | Petersson et al. |
| 6,594,844 | B2 | 7/2003 | Jones |
| 6,600,981 | B2 | 7/2003 | Ruffner |
| 6,604,348 | B2 | 8/2003 | Hunt |
| 6,611,738 | B2 | 8/2003 | Ruffner |
| 6,615,108 | B1 | 9/2003 | Peless et al. |
| 6,636,847 | B1 | 10/2003 | Spires |
| 6,650,975 | B2 | 11/2003 | Ruffner |
| 6,662,889 | B2 | 12/2003 | De Fazio et al. |
| 6,728,607 | B1 | 4/2004 | Anderson |
| 6,763,282 | B2 | 7/2004 | Glenn et al. |
| 6,779,217 | B2 | 8/2004 | Fisher |
| 6,809,490 | B2 | 10/2004 | Jones et al. |
| 6,813,557 | B2 | 11/2004 | Schmidt et al. |
| 6,850,024 | B2 | 2/2005 | Peless et al. |
| 6,870,792 | B2 | 3/2005 | Chiappetta |
| 6,879,878 | B2 | 4/2005 | Glenn et al. |
| 6,885,912 | B2 | 4/2005 | Peless et al. |
| 6,907,336 | B2 | 6/2005 | Gray et al. |
| 6,934,615 | B2 | 8/2005 | Flann et al. |
| 6,984,952 | B2 | 1/2006 | Peless et al. |
| 7,010,425 | B2 | 3/2006 | Gray et al. |
| 7,024,842 | B2 | 4/2006 | Hunt et al. |
| 7,024,843 | B2 | 4/2006 | Hunt et al. |
| 7,047,712 | B1 | 5/2006 | Hunt et al. |
| 7,053,580 | B2 | 5/2006 | Aldred |
| 7,069,111 | B2 | 6/2006 | Glenn et al. |
| 7,076,348 | B2 | 7/2006 | Bucher et al. |
| 7,079,923 | B2 | 7/2006 | Abramson et al. |
| 7,079,943 | B2 | 7/2006 | Flann et al. |
| 7,085,624 | B2 | 8/2006 | Aldred et al. |
| 7,103,457 | B2 | 9/2006 | Dean |
| 7,110,881 | B2 | 9/2006 | Gray et al. |
| 7,114,318 | B2 | 10/2006 | Poulson et al. |
| 7,117,660 | B1 | 10/2006 | Colens |
| 7,133,746 | B2 | 11/2006 | Abramson et al. |
| 7,146,786 | B2 | 12/2006 | Brandon |
| 7,155,308 | B2 | 12/2006 | Jones |
| 7,155,309 | B2 | 12/2006 | Peless et al. |
| 7,166,983 | B2 | 1/2007 | Jung |
| 7,167,775 | B2 | 1/2007 | Abramson et al. |
| 7,173,391 | B2 | 2/2007 | Jones et al. |
| 7,174,157 | B2 | 2/2007 | Gassho et al. |
| 7,211,980 | B1 | 5/2007 | Bruemmer et al. |
| 7,216,033 | B2 | 5/2007 | Flann et al. |
| 7,227,334 | B2 | 6/2007 | Yang et al. |
| 7,228,214 | B2 | 6/2007 | Flann et al. |
| 7,233,683 | B2 | 6/2007 | Han et al. |
| 7,242,791 | B2 | 7/2007 | Han et al. |
| 7,286,902 | B2 | 10/2007 | Kim et al. |
| D559,867 | S | 1/2008 | Abramson |
| 7,332,890 | B2 | 2/2008 | Cohen et al. |
| 7,349,759 | B2 | 3/2008 | Peless et al. |
| 7,363,994 | B1 | 4/2008 | Defazio et al. |
| 7,369,460 | B2 | 5/2008 | Chiappetta et al. |
| 7,369,924 | B2 | 5/2008 | Han et al. |
| 7,388,343 | B2 | 6/2008 | Jones et al. |
| D573,610 | S | 7/2008 | Abramson |
| 7,395,648 | B1 | 7/2008 | Silbernagel et al. |
| 7,418,328 | B2 | 8/2008 | Romig |
| 7,429,843 | B2 | 9/2008 | Jones et al. |
| 7,430,455 | B2 | 9/2008 | Casey et al. |
| 7,444,214 | B2 | 10/2008 | Cho et al. |
| 7,469,525 | B2 | 12/2008 | Zeigler et al. |
| 7,474,941 | B2 | 1/2009 | Kim et al. |
| 7,480,958 | B2 | 1/2009 | Song et al. |
| 7,480,960 | B2 | 1/2009 | Kim |
| 7,497,053 | B2 | 3/2009 | Nicolet |
| 7,499,774 | B2 | 3/2009 | Barrett et al. |

(56) References Cited

U.S. PATENT DOCUMENTS

| | | |
|---|---|---|
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,539,557 B2 | 5/2009 | Yamauchi |
| 7,568,873 B1 | 8/2009 | Rambo |
| 7,574,282 B2 | 8/2009 | Petersson et al. |
| 7,577,499 B2 | 8/2009 | Sun et al. |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |
| 7,613,543 B2 | 11/2009 | Petersson et al. |
| 7,614,835 B2 | 11/2009 | Kitamura |
| 7,617,890 B2 | 11/2009 | Romig |
| 7,647,144 B2 | 1/2010 | Haegermarck |
| D610,072 S | 2/2010 | Wallet et al. |
| 7,663,333 B2 | 2/2010 | Jones et al. |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,720,572 B2 | 5/2010 | Ziegler et al. |
| 7,729,801 B2 | 6/2010 | Abramson |
| 7,730,705 B2 | 6/2010 | Kubinski |
| 7,769,490 B2 | 8/2010 | Abramson et al. |
| 7,787,989 B2 | 8/2010 | Colens |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,091,105 B2 | 1/2012 | Lee |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,135,498 B2 | 3/2012 | Hyung et al. |
| 8,150,574 B2 | 4/2012 | Han et al. |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,234,010 B2 | 7/2012 | Thompson et al. |
| 8,234,848 B2 | 8/2012 | Messina et al. |
| 8,237,389 B2 | 8/2012 | Fitch et al. |
| 8,239,992 B2 | 8/2012 | Schnittman et al. |
| 8,255,092 B2 | 8/2012 | Phillips et al. |
| 8,271,132 B2 | 9/2012 | Nielsen et al. |
| 8,292,007 B2 | 10/2012 | Defazio et al. |
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,549,826 B2 | 10/2013 | Kraft et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |
| 8,760,397 B2 | 6/2014 | Robbins et al. |
| 8,761,935 B2 | 6/2014 | Casey et al. |
| 8,781,627 B2 | 7/2014 | Sandin et al. |
| 8,788,092 B2 | 7/2014 | Casey et al. |

(56) References Cited

U.S. PATENT DOCUMENTS

| | | |
|---|---|---|
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,854,001 B2 | 10/2014 | Cohen et al. |
| 8,856,150 B2 | 10/2014 | Machtelinck |
| 8,868,237 B2 | 10/2014 | Sandin et al. |
| 8,869,337 B2 | 10/2014 | Sumonthee |
| 8,869,369 B1 | 10/2014 | Roach |
| 8,874,269 B2 | 10/2014 | Biber et al. |
| 8,874,300 B2 | 10/2014 | Allard et al. |
| D718,339 S | 11/2014 | Damshak et al. |
| D718,340 S | 11/2014 | Damshak et al. |
| D718,341 S | 11/2014 | Gur et al. |
| 8,892,352 B2 | 11/2014 | Petereit et al. |
| D718,793 S | 12/2014 | Gur et al. |
| 8,911,192 B2 | 12/2014 | Hohmann et al. |
| 8,918,241 B2 | 12/2014 | Chen et al. |
| 8,925,667 B2 | 1/2015 | Chen |
| 8,930,023 B2 | 1/2015 | Gutmann et al. |
| 8,930,024 B2 | 1/2015 | Abramson |
| 8,938,318 B2 | 1/2015 | Bergström et al. |
| 8,942,862 B2 | 1/2015 | Markusson et al. |
| 8,954,193 B2 | 2/2015 | Sandin et al. |
| 8,958,911 B2 | 2/2015 | Wong et al. |
| 8,958,939 B2 | 2/2015 | Einecke et al. |
| 8,965,578 B2 | 2/2015 | Versteeg et al. |
| 8,989,946 B2 | 3/2015 | Anderson |
| 8,989,972 B2 | 3/2015 | Anderson |
| 8,996,171 B2 | 3/2015 | Anderson et al. |
| 8,996,177 B2 | 3/2015 | Coenen |
| D729,280 S | 5/2015 | Näslund et al. |
| 9,021,777 B2 | 5/2015 | Johnson et al. |
| 9,026,299 B2 | 5/2015 | Johnson et al. |
| 9,026,302 B2 | 5/2015 | Stout et al. |
| 9,031,050 B2 | 5/2015 | Cherian et al. |
| 9,037,294 B2 | 5/2015 | Chung et al. |
| 9,043,016 B2 | 5/2015 | Filippov et al. |
| 9,043,129 B2 | 5/2015 | Bonefas et al. |
| D731,402 S | 6/2015 | Tedesco et al. |
| 9,043,952 B2 | 6/2015 | Sandin et al. |
| 9,043,953 B2 | 6/2015 | Sandin et al. |
| 9,072,218 B2 | 7/2015 | Johnson et al. |
| 9,072,219 B2 | 7/2015 | Da Rocha et al. |
| 9,079,303 B2 | 7/2015 | Abramson et al. |
| 9,093,868 B2 | 7/2015 | Baxter |
| 9,104,204 B2 | 8/2015 | Jones et al. |
| 9,104,206 B2 | 8/2015 | Biber et al. |
| 9,110,471 B2 | 8/2015 | Pack et al. |
| 9,113,595 B2 | 8/2015 | Roth et al. |
| 9,119,341 B2 | 9/2015 | Jägenstedt |
| 9,137,943 B2 | 9/2015 | Einecke et al. |
| 9,144,193 B2 | 9/2015 | Paden |
| 9,182,763 B2 | 11/2015 | Park et al. |
| 9,186,800 B2 | 11/2015 | Shin et al. |
| 9,188,980 B2 | 11/2015 | Anderson |
| 9,188,983 B2 | 11/2015 | Stout et al. |
| 9,195,256 B2 | 11/2015 | Robbins et al. |
| D745,897 S | 12/2015 | Mehra et al. |
| 9,213,934 B1 | 12/2015 | Versteeg et al. |
| 9,215,957 B2 | 12/2015 | Cohen et al. |
| 9,223,312 B2 | 12/2015 | Goel et al. |
| 9,232,692 B2 | 1/2016 | Björn et al. |
| 9,235,214 B2 | 1/2016 | Anderson |
| 9,236,637 B2 | 1/2016 | Anderson |
| 9,241,441 B2 | 1/2016 | Björn et al. |
| D748,568 S | 2/2016 | Helin et al. |
| 9,258,942 B2 | 2/2016 | Biber et al. |
| 9,268,331 B2 | 2/2016 | Abramson et al. |
| 9,276,419 B2 | 3/2016 | Borinato et al. |
| 9,278,690 B2 | 3/2016 | Smith |
| 9,301,444 B2 | 4/2016 | Campbell et al. |
| D757,637 S | 5/2016 | Horowitz |
| 9,327,407 B2 | 5/2016 | Jones et al. |
| 9,335,767 B2 | 5/2016 | Jang et al. |
| 9,338,130 B2 | 5/2016 | Von Huben et al. |
| 9,348,897 B2 | 5/2016 | Shoham et al. |
| 9,349,187 B2 | 5/2016 | Schepelmann et al. |
| D758,455 S | 6/2016 | Maibach et al. |
| D759,577 S | 6/2016 | Wang et al. |
| 9,357,699 B2 | 6/2016 | Elonsson |
| 9,363,945 B2 | 6/2016 | Jägenstedt et al. |
| 9,375,842 B2 | 6/2016 | Shamlian et al. |
| 9,376,027 B2 | 6/2016 | Harris |
| D760,806 S | 7/2016 | Cmich et al. |
| 9,380,742 B2 | 7/2016 | Biber et al. |
| 9,405,294 B2 | 8/2016 | Jägenstedt et al. |
| 9,412,515 B2 | 8/2016 | Hyde et al. |
| 9,419,453 B2 | 8/2016 | Andersson et al. |
| 9,420,741 B2 | 8/2016 | Balutis et al. |
| 9,421,879 B2 | 8/2016 | Pastoor et al. |
| 9,426,946 B2 | 8/2016 | Fisher |
| 9,429,950 B2 | 8/2016 | Sjöholm |
| 9,436,185 B2 | 9/2016 | Schnittman |
| 9,439,348 B2 | 9/2016 | Biber et al. |
| 9,439,367 B2 | 9/2016 | Abhyanker |
| 9,440,350 B2 | 9/2016 | Mou et al. |
| 9,440,354 B2 | 9/2016 | Gutmann et al. |
| 9,446,521 B2 | 9/2016 | Casey et al. |
| 9,452,525 B2 | 9/2016 | Ziegler et al. |
| 9,452,685 B2 | 9/2016 | Hyde et al. |
| D769,180 S | 10/2016 | Wang et al. |
| 9,456,545 B2 | 10/2016 | Biber |
| 9,457,677 B2 | 10/2016 | Hyde et al. |
| 9,463,704 B2 | 10/2016 | Hyde et al. |
| 9,471,063 B2 | 10/2016 | Ouyang |
| 9,480,201 B2 | 11/2016 | Maruyama et al. |
| 9,483,055 B2 | 11/2016 | Johnson et al. |
| 9,491,904 B2 | 11/2016 | Jägenstedt et al. |
| 9,497,901 B2 | 11/2016 | Willgert |
| 9,505,140 B1 | 11/2016 | Fay et al. |
| 9,510,505 B2 | 12/2016 | Halloran et al. |
| 9,516,806 B2 | 12/2016 | Yamauchi et al. |
| D776,169 S | 1/2017 | Cmich et al. |
| 9,532,688 B1 | 1/2017 | Ebrahimi Afrouzi et al. |
| 9,538,702 B2 | 1/2017 | Balutis et al. |
| 9,543,680 B2 | 1/2017 | Elonsson |
| 9,545,032 B2 | 1/2017 | Baer et al. |
| 9,550,294 B2 | 1/2017 | Cohen et al. |
| 9,554,508 B2 | 1/2017 | Balutis et al. |
| 9,559,461 B1 | 1/2017 | Diehr |
| 9,560,800 B2 | 2/2017 | Reichen et al. |
| 9,563,204 B2 | 2/2017 | Willgert |
| 9,573,275 B2 | 2/2017 | Reigo et al. |
| D781,349 S | 3/2017 | Cmich |
| D781,926 S | 3/2017 | Al-Hashimi et al. |
| 9,586,563 B2 | 3/2017 | Kanai et al. |
| 9,590,862 B2 | 3/2017 | Larocca |
| 9,606,541 B2 | 3/2017 | Abramson |
| 9,622,399 B2 | 4/2017 | Kremmer et al. |
| 9,623,557 B2 | 4/2017 | Gutmann et al. |
| 9,630,319 B2 | 4/2017 | Vicenti |
| 9,632,489 B2 | 4/2017 | Biber et al. |
| 9,699,964 B2 | 7/2017 | Roth et al. |
| 9,701,020 B1 | 7/2017 | Ebrahimi Afrouzi |
| 9,711,767 B2 | 7/2017 | Juenger et al. |
| 9,713,302 B2 | 7/2017 | Sandin et al. |
| 9,713,303 B2 | 7/2017 | Jägenstedt et al. |
| D794,089 S | 8/2017 | Maibach et al. |
| 9,717,175 B2 | 8/2017 | Fay, II et al. |
| 9,720,417 B2 | 8/2017 | Reigo et al. |
| 9,723,782 B2 | 8/2017 | Roth et al. |
| 9,736,981 B2 | 8/2017 | Roth et al. |
| 9,740,210 B2 | 8/2017 | Sjöholm |
| D796,555 S | 9/2017 | Landberg et al. |
| D797,530 S | 9/2017 | Cmich |
| 9,750,183 B2 | 9/2017 | Haun |
| 9,766,627 B2 | 9/2017 | Jägenstedt et al. |
| D799,555 S | 10/2017 | Cmich |
| 9,785,148 B2 | 10/2017 | Yun |
| 9,788,481 B2 | 10/2017 | Das et al. |
| 9,788,483 B2 | 10/2017 | Roth et al. |

(56) References Cited

U.S. PATENT DOCUMENTS

| | | |
|---|---|---|
| 9,791,860 B2 | 10/2017 | Phillips et al. |
| 9,804,604 B2 | 10/2017 | Mattsson et al. |
| 9,807,925 B2 | 11/2017 | Johnson |
| 9,807,930 B1 | 11/2017 | Lydon et al. |
| 9,817,398 B2 | 11/2017 | Yamamura et al. |
| 9,820,433 B2 | 11/2017 | Borinato |
| 9,826,678 B2 | 11/2017 | Balutis et al. |
| 9,829,891 B2 | 11/2017 | Smith et al. |
| 9,841,768 B2 | 12/2017 | Hiramatsu et al. |
| 9,844,876 B2 | 12/2017 | Chung et al. |
| 9,848,529 B2 | 12/2017 | Franzius et al. |
| 9,848,532 B2 | 12/2017 | Keski-Luopa et al. |
| 9,851,718 B2 | 12/2017 | Booher |
| 9,853,468 B2 | 12/2017 | Ireland |
| D807,281 S | 1/2018 | Irwin et al. |
| D807,811 S | 1/2018 | Wang et al. |
| 9,854,737 B2 | 1/2018 | Yamauchi et al. |
| 9,854,956 B2 | 1/2018 | Song et al. |
| 9,857,025 B2 | 1/2018 | Gottinger et al. |
| 9,861,035 B2 | 1/2018 | Kruckeberg et al. |
| 9,872,437 B2 | 1/2018 | Markusson et al. |
| 9,874,876 B2 | 1/2018 | Shimamura |
| 9,876,370 B2 | 1/2018 | Yamamura et al. |
| D810,664 S | 2/2018 | Sgreccia et al. |
| D810,665 S | 2/2018 | Sgreccia et al. |
| 9,884,423 B2 | 2/2018 | Cohen et al. |
| 9,894,836 B2 | 2/2018 | Garton |
| 9,895,808 B2 | 2/2018 | Stout et al. |
| 9,901,028 B2 | 2/2018 | Hans |
| 9,903,947 B2 | 2/2018 | Das et al. |
| 9,924,632 B2 | 3/2018 | Chenevert et al. |
| 9,924,847 B2 | 3/2018 | Gottinger et al. |
| 9,931,007 B2 | 4/2018 | Morin et al. |
| 9,931,008 B2 | 4/2018 | Yoo et al. |
| 9,931,750 B2 | 4/2018 | Cohen et al. |
| 9,936,635 B2 | 4/2018 | Gottinger et al. |
| 9,968,024 B2 | 5/2018 | Haneda et al. |
| 9,972,098 B1 | 5/2018 | Ebrahimi Afrouzi et al. |
| 9,983,586 B2 | 5/2018 | Borinato |
| 10,011,180 B2 | 7/2018 | Hyde et al. |
| 10,021,830 B2 | 7/2018 | Doughty |
| 10,024,964 B2 | 7/2018 | Pierce et al. |
| 10,029,368 B2 | 7/2018 | Wolowelsky et al. |
| 10,031,527 B2 | 7/2018 | Björn |
| 10,034,421 B2 | 7/2018 | Doughty et al. |
| 10,035,270 B2 | 7/2018 | Fay et al. |
| 10,037,038 B2 | 7/2018 | Sandin et al. |
| 10,046,130 B2 | 8/2018 | Molden et al. |
| 10,054,924 B2 | 8/2018 | Willgert |
| 10,057,813 B1 | 8/2018 | Likar et al. |
| 10,067,232 B2 | 9/2018 | Halloran et al. |
| 10,070,764 B2 | 9/2018 | Schnittman et al. |
| 10,071,475 B2 | 9/2018 | Lin et al. |
| 10,078,336 B2 | 9/2018 | Reigo et al. |
| 10,080,326 B2 | 9/2018 | Yamamura et al. |
| D830,418 S | 10/2018 | Näslund et al. |
| 10,091,930 B2 | 10/2018 | Balutis et al. |
| 10,093,194 B2 | 10/2018 | Hyde et al. |
| 10,093,259 B2 | 10/2018 | Pan |
| 10,098,277 B2 | 10/2018 | Ouyang |
| 10,104,835 B2 | 10/2018 | Köhler et al. |
| 10,105,838 B2 | 10/2018 | Mou et al. |
| 10,108,198 B2 | 10/2018 | Björn et al. |
| D834,185 S | 11/2018 | Molden et al. |
| D834,504 S | 11/2018 | Ropars |
| D834,505 S | 11/2018 | Wang et al. |
| 10,117,379 B2 | 11/2018 | Guiet et al. |
| 10,123,479 B2 | 11/2018 | Ladd, Jr. et al. |
| 10,124,494 B2 | 11/2018 | Outa et al. |
| 10,131,057 B2 | 11/2018 | Patel et al. |
| 10,136,576 B2 | 11/2018 | Reigo |
| 10,149,430 B2 | 12/2018 | Bergström et al. |
| 10,152,062 B2 | 12/2018 | Schnittman |
| 10,157,334 B2 | 12/2018 | Schepelmann et al. |
| 10,159,180 B2 | 12/2018 | Balutis et al. |
| 10,162,359 B2 | 12/2018 | Johnson et al. |
| D837,150 S | 1/2019 | Näslund et al. |
| 10,165,725 B2 | 1/2019 | Sugumaran et al. |
| 10,172,282 B2 | 1/2019 | Svensson et al. |
| 10,178,826 B2 | 1/2019 | Jägenstedt et al. |
| 10,183,400 B2 | 1/2019 | Trigui et al. |
| 10,183,701 B2 | 1/2019 | Ebrahimi Afrouzi et al. |
| 10,185,325 B2 | 1/2019 | Reigo et al. |
| 10,201,261 B2 | 2/2019 | Tanaka et al. |
| 10,207,557 B2 | 2/2019 | Björn et al. |
| 10,212,880 B2 | 2/2019 | Cmich et al. |
| 10,238,026 B2 | 3/2019 | Köhler et al. |
| D845,877 S | 4/2019 | Geng et al. |
| 10,244,678 B2 | 4/2019 | Lydon et al. |
| 10,246,907 B2 | 4/2019 | Shen |
| 10,257,976 B2 | 4/2019 | Ladd, Jr. et al. |
| 10,259,498 B2 | 4/2019 | Jägenstedt et al. |
| 10,268,206 B2 | 4/2019 | Yamamura |
| 10,274,954 B2 | 4/2019 | Balutis et al. |
| D848,488 S | 5/2019 | Cmich |
| 10,281,912 B2 | 5/2019 | Hollister |
| 10,281,922 B2 | 5/2019 | Smith et al. |
| 10,299,431 B2 | 5/2019 | Ladd, Jr. et al. |
| 10,299,652 B2 | 5/2019 | Gilbert, Jr. et al. |
| D852,232 S | 6/2019 | Eidson et al. |
| 10,310,510 B2 | 6/2019 | Mannefred et al. |
| 10,315,306 B2 | 6/2019 | Abramson |
| 10,321,625 B2 | 6/2019 | Einecke et al. |
| 10,327,384 B2 | 6/2019 | Johansson et al. |
| D853,447 S | 7/2019 | Mehra et al. |
| D853,448 S | 7/2019 | Mehra et al. |
| D853,449 S | 7/2019 | Mehra et al. |
| 10,338,602 B2 | 7/2019 | Grufman et al. |
| 10,343,280 B1 | 7/2019 | Ebrahimi Afrouzi |
| 10,346,995 B1 | 7/2019 | Ebrahimi Afrouzi |
| 10,353,399 B2 | 7/2019 | Ebrahimi Afrouzi |
| 10,362,730 B2 | 7/2019 | Ladd, Jr. et al. |
| 10,365,661 B2 | 7/2019 | Jägenstedt et al. |
| 10,369,705 B2 | 8/2019 | Trigui et al. |
| 10,372,140 B2 | 8/2019 | Sun et al. |
| 10,375,880 B2 | 8/2019 | Morin et al. |
| 10,377,035 B2 | 8/2019 | He et al. |
| 10,379,172 B2 | 8/2019 | Kleiner et al. |
| 10,384,346 B2 | 8/2019 | Hickman et al. |
| 10,386,844 B2 | 8/2019 | Wilcox et al. |
| 10,390,483 B2 | 8/2019 | Balutis et al. |
| D858,424 S | 9/2019 | Chattopadhyay |
| 10,405,488 B2 | 9/2019 | Kamfors et al. |
| 10,425,488 B2 | 9/2019 | Larsén et al. |
| D864,256 S | 10/2019 | Eidson et al. |
| 10,426,083 B2 | 10/2019 | Doughty |
| 10,440,879 B2 | 10/2019 | Björn et al. |
| 10,442,083 B2 | 10/2019 | Wolowelsky et al. |
| 10,444,756 B2 | 10/2019 | Kamfors et al. |
| 10,444,757 B2 | 10/2019 | Dong et al. |
| 10,444,760 B2 | 10/2019 | Grufman et al. |
| 10,448,565 B2 | 10/2019 | Mannefred et al. |
| 10,454,287 B2 | 10/2019 | Yamamura et al. |
| 10,456,924 B2 | 10/2019 | Outa et al. |
| 10,459,452 B2 | 10/2019 | Eagling et al. |
| 10,462,961 B2 | 11/2019 | Tjernberg et al. |
| 10,463,215 B2 | 11/2019 | Morin et al. |
| 10,464,206 B2 | 11/2019 | Frisby et al. |
| 10,466,710 B2 | 11/2019 | Biber et al. |
| 10,485,164 B2 | 11/2019 | Letsky |
| 10,488,865 B2 | 11/2019 | Afrouzi et al. |
| 10,496,262 B1 | 12/2019 | Ebrahimi Afrouzi et al. |
| 10,500,722 B2 | 12/2019 | Vicenti |
| 10,514,701 B2 | 12/2019 | Windorfer |
| 10,517,211 B2 | 12/2019 | Öhrlund et al. |
| 10,518,651 B2 | 12/2019 | Svensson et al. |
| 10,520,113 B1 | 12/2019 | Thompson |
| 10,542,667 B2 | 1/2020 | Song et al. |
| 10,542,670 B2 | 1/2020 | Cmich et al. |
| 10,549,646 B2 | 2/2020 | Reynolds et al. |
| 10,551,844 B2 | 2/2020 | Biber et al. |
| 10,552,770 B2 | 2/2020 | Brough et al. |
| 10,555,456 B2 | 2/2020 | Borinato |
| 10,555,457 B2 | 2/2020 | Song et al. |

(56) References Cited

U.S. PATENT DOCUMENTS

| | | |
|---|---|---|
| 10,561,063 B2 | 2/2020 | Hasegawa et al. |
| 10,568,258 B2 | 2/2020 | Wahlgren |
| 10,571,905 B2 | 2/2020 | Yamamura |
| 10,571,928 B2 | 2/2020 | Sun et al. |
| 10,575,465 B2 | 3/2020 | Ran et al. |
| 10,575,696 B2 | 3/2020 | O'Brien et al. |
| 10,583,562 B2 | 3/2020 | Stout et al. |
| 10,588,255 B2 | 3/2020 | Song et al. |
| 10,589,418 B2 | 3/2020 | Gordon-Carroll et al. |
| 10,589,432 B2 | 3/2020 | Al Nahwi et al. |
| 10,589,433 B2 | 3/2020 | Al Nahwi et al. |
| 10,592,998 B2 | 3/2020 | Eijdenberg et al. |
| 10,594,117 B2 | 3/2020 | Song et al. |
| 10,595,459 B2 | 3/2020 | Aposhian et al. |
| 10,595,692 B2 | 3/2020 | Morin et al. |
| 10,598,793 B2 | 3/2020 | Öhrlund et al. |
| 10,599,154 B2 | 3/2020 | Dean et al. |
| 10,606,275 B2 | 3/2020 | Dean et al. |
| 10,606,279 B2 | 3/2020 | Grufman et al. |
| D880,532 S | 4/2020 | Gunnarsson et al. |
| D881,252 S | 4/2020 | Vestberg et al. |
| D882,640 S | 4/2020 | Estey |
| 10,609,862 B2 | 4/2020 | Wu et al. |
| 10,611,028 B1 | 4/2020 | Zhou et al. |
| 10,612,929 B2 | 4/2020 | Afrouzi et al. |
| 10,613,541 B1 | 4/2020 | Ebrahimi Afrouzi et al. |
| 10,621,537 B2 | 4/2020 | Ben-Alexander |
| D884,762 S | 5/2020 | Gunnarsson et al. |
| D884,763 S | 5/2020 | Gunnarsson et al. |
| 10,643,377 B2 | 5/2020 | Grufman et al. |
| 10,646,997 B2 | 5/2020 | Reigo et al. |
| 10,649,466 B2 | 5/2020 | Holmström et al. |
| 10,651,594 B1 | 5/2020 | Tsai et al. |
| 10,653,057 B2 | 5/2020 | Choi et al. |
| 10,653,058 B2 | 5/2020 | Yamanaka et al. |
| 10,653,282 B2 | 5/2020 | Song et al. |
| 10,656,652 B2 | 5/2020 | Dean et al. |
| D887,464 S | 6/2020 | Gunnarsson et al. |
| D887,465 S | 6/2020 | Gunnarsson et al. |
| D887,466 S | 6/2020 | Gunnarsson et al. |
| 10,670,406 B2 | 6/2020 | Eguchi et al. |
| 10,673,630 B2 | 6/2020 | Pakkan et al. |
| 10,674,659 B2 | 6/2020 | Ladd, Jr. et al. |
| 10,674,660 B2 | 6/2020 | Matsuzawa et al. |
| 10,681,863 B2 | 6/2020 | Hans et al. |
| 10,681,864 B2 | 6/2020 | Matt et al. |
| 10,691,000 B2 | 6/2020 | Du et al. |
| 10,698,417 B2 | 6/2020 | Churavy et al. |
| D889,517 S | 7/2020 | Prybor et al. |
| 10,716,258 B2 | 7/2020 | Pellenc et al. |
| 10,721,860 B2 | 7/2020 | Liljedahl |
| D892,187 S | 8/2020 | Maggard |
| 10,737,369 B2 | 8/2020 | Steinhauser et al. |
| 10,737,395 B2 | 8/2020 | Wolff et al. |
| 10,738,495 B2 | 8/2020 | Durvasula et al. |
| 10,739,769 B2 | 8/2020 | Dean et al. |
| 10,747,413 B2 | 8/2020 | Schneider et al. |
| 10,750,667 B2 | 8/2020 | Yamauchi et al. |
| 10,750,918 B2 | 8/2020 | Jung et al. |
| D896,737 S | 9/2020 | Phely |
| 10,758,100 B2 | 9/2020 | Cohen et al. |
| 10,765,284 B2 | 9/2020 | Song et al. |
| 10,766,147 B2 | 9/2020 | Trigui et al. |
| 10,777,000 B2 | 9/2020 | Grufman et al. |
| 10,782,705 B2 | 9/2020 | Reigo et al. |
| 10,785,907 B2 | 9/2020 | Doughty et al. |
| 10,788,832 B2 | 9/2020 | Nykamp |
| 10,791,684 B2 | 10/2020 | He et al. |
| 10,795,377 B2 | 10/2020 | Afrouzi et al. |
| 10,806,075 B2 | 10/2020 | Grufman et al. |
| 10,809,071 B2 | 10/2020 | Afrouzi et al. |
| 10,809,740 B2 | 10/2020 | Reinert et al. |
| 10,814,495 B2 | 10/2020 | Patel et al. |
| 10,820,493 B2 | 11/2020 | Ritzer et al. |
| 10,824,163 B2 | 11/2020 | Einecke et al. |
| 10,842,074 B2 | 11/2020 | Jägenstedt et al. |
| 10,843,734 B1 | 11/2020 | Ebrahimi Afrouzi et al. |
| 10,843,735 B1 | 11/2020 | Ebrahimi Afrouzi et al. |
| 10,845,481 B2 | 11/2020 | Pierce et al. |
| 10,845,804 B2 | 11/2020 | Holgersson et al. |
| D906,373 S | 12/2020 | Morin et al. |
| 10,849,267 B2 | 12/2020 | Strandberg et al. |
| 10,849,270 B2 | 12/2020 | Johansson et al. |
| 10,850,400 B2 | 12/2020 | Park |
| 10,852,735 B2 | 12/2020 | Tan et al. |
| 10,852,738 B2 | 12/2020 | Mannefred et al. |
| 10,856,467 B2 | 12/2020 | Maggard |
| 10,858,041 B2 | 12/2020 | Jägenstedt et al. |
| 10,869,432 B2 | 12/2020 | Wykman et al. |
| 10,873,194 B2 | 12/2020 | Lydon et al. |
| 10,874,045 B2 | 12/2020 | Balutis et al. |
| 10,874,049 B2 | 12/2020 | Ladd, Jr. et al. |
| 10,874,051 B2 | 12/2020 | Kasai et al. |
| 10,874,278 B2 | 12/2020 | Matt et al. |
| D908,597 S | 1/2021 | Meng et al. |
| D908,598 S | 1/2021 | Meng et al. |
| 10,882,187 B2 | 1/2021 | Li et al. |
| 10,888,046 B2 | 1/2021 | Gorenflo et al. |
| 10,890,921 B2 | 1/2021 | Gillett |
| 10,895,876 B2 | 1/2021 | Arenz et al. |
| 10,899,171 B2 | 1/2021 | Cmich |
| 10,912,253 B2 | 2/2021 | Einecke et al. |
| 10,928,833 B2 | 2/2021 | Reigo |
| 10,932,409 B2 | 3/2021 | Ingvalson et al. |
| 10,935,383 B1 | 3/2021 | Ebrahimi Afrouzi et al. |
| 10,939,611 B2 | 3/2021 | Liljedahl |
| 10,952,578 B2 | 3/2021 | Gill et al. |
| 10,959,371 B2 | 3/2021 | Zhou et al. |
| 10,966,368 B2 | 4/2021 | Desai et al. |
| 10,967,752 B2 | 4/2021 | Liu et al. |
| 10,973,168 B2 | 4/2021 | Hans et al. |
| 10,986,775 B2 | 4/2021 | Matt et al. |
| 10,986,971 B1 | 4/2021 | Ebrahimi Afrouzi |
| 10,993,598 B2 | 5/2021 | Park et al. |
| 11,003,192 B2 | 5/2021 | Dalfra et al. |
| 11,009,869 B2 | 5/2021 | Moroi et al. |
| 11,013,655 B1 | 5/2021 | Ebrahimi Afrouzi et al. |
| 11,014,460 B2 | 5/2021 | Schnittman et al. |
| 11,016,481 B2 | 5/2021 | Gustavsson et al. |
| D922,444 S | 6/2021 | Morin et al. |
| 11,019,975 B2 | 6/2021 | Jang et al. |
| 11,020,857 B2 | 6/2021 | Xiong et al. |
| 11,039,582 B2 | 6/2021 | Gilliam et al. |
| 11,039,583 B2 | 6/2021 | Gilliam et al. |
| 11,044,844 B2 | 6/2021 | Keski-luopa et al. |
| 11,048,268 B2 | 6/2021 | Ouyang |
| 11,051,449 B2 | 7/2021 | Bergh et al. |
| 11,051,671 B2 | 7/2021 | Jang et al. |
| 11,052,535 B2 | 7/2021 | Parks, II et al. |
| 11,052,540 B2 | 7/2021 | Stout et al. |
| 11,054,822 B2 | 7/2021 | Özmen |
| 11,054,836 B2 | 7/2021 | Wang et al. |
| 11,058,053 B2 | 7/2021 | Patel et al. |
| 11,064,652 B2 | 7/2021 | Matt et al. |
| 11,065,762 B2 | 7/2021 | Sakai et al. |
| 11,069,082 B1 | 7/2021 | Ebrahimi Afrouzi et al. |
| 11,071,429 B2 | 7/2021 | Jang et al. |
| 11,072,250 B2 | 7/2021 | Gilbert, Jr. et al. |
| 11,072,255 B2 | 7/2021 | Svensson et al. |
| 11,075,910 B2 | 7/2021 | Dean et al. |
| 11,076,529 B2 | 8/2021 | Chen et al. |
| 11,079,755 B2 | 8/2021 | Schlacks, IV et al. |
| 11,084,172 B2 | 8/2021 | Casey et al. |
| 11,089,732 B2 | 8/2021 | Jägenstedt et al. |
| 11,097,428 B2 | 8/2021 | Al Nahwi et al. |
| 11,099,572 B2 | 8/2021 | Cestonaro et al. |
| 11,104,006 B2 | 8/2021 | Fay et al. |
| 11,105,109 B2 | 8/2021 | Durvasula et al. |
| 11,106,215 B2 | 8/2021 | Dalfra |
| 11,109,528 B2 | 9/2021 | Strang |
| 11,109,731 B2 | 9/2021 | Jang et al. |
| 11,112,505 B2 | 9/2021 | Öhrlund et al. |
| 11,112,532 B2 | 9/2021 | Jägenstedt et al. |
| 11,115,798 B2 | 9/2021 | Beaulieu et al. |

(56) References Cited

U.S. PATENT DOCUMENTS

| | | |
|---|---|---|
| 11,117,264 B2 | 9/2021 | Tsai et al. |
| 11,119,496 B1 | 9/2021 | Ebrahimi Afrouzi et al. |
| 11,126,193 B2 | 9/2021 | Mannefred et al. |
| 11,134,609 B2 | 10/2021 | Willgert et al. |
| 11,140,815 B2 | 10/2021 | Matt et al. |
| 11,140,819 B2 | 10/2021 | Chen et al. |
| 11,141,034 B2 | 10/2021 | Jang et al. |
| 11,154,006 B2 | 10/2021 | Liljedahl |
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone, Jr. |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153172 A1 | 6/2011 | Anderson |
| 2011/0153338 A1 | 6/2011 | Anderson |
| 2011/0202307 A1 | 8/2011 | Petereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |

(56) References Cited

U.S. PATENT DOCUMENTS

| | | |
|---|---|---|
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0253096 A1* | 9/2018 | Holgersson .......... G05D 1/0274 |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Årlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |

(56) References Cited

U.S. PATENT DOCUMENTS

| | | |
|---|---|---|
| 2021/0070356 A1 | 3/2021 | Lyzen et al. |
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| | | |
|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |

(56) References Cited

FOREIGN PATENT DOCUMENTS

| | | | |
|---|---|---|---|
| CN | 2693167 Y | 4/2005 |
| CN | 3512456 | 3/2006 |
| CN | 3599999 | 1/2007 |
| CN | 3626101 | 3/2007 |
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |
| CN | 100498602 C | 6/2009 |
| CN | 201260303 Y | 6/2009 |
| CN | 301144405 | 2/2010 |
| CN | 301276003 | 6/2010 |
| CN | 301290512 | 7/2010 |
| CN | 201557392 U | 8/2010 |
| CN | 301328063 | 8/2010 |
| CN | 101292244 B | 12/2010 |
| CN | 301444971 | 1/2011 |
| CN | 101982037 A | 3/2011 |
| CN | 201797741 U | 4/2011 |
| CN | 301506267 | 4/2011 |
| CN | 201846616 U | 6/2011 |
| CN | 301573109 | 6/2011 |
| CN | 301611305 | 7/2011 |
| CN | 301653707 | 8/2011 |
| CN | 301660006 | 8/2011 |
| CN | 301742022 | 11/2011 |
| CN | 202077380 U | 12/2011 |
| CN | 102523841 A | 7/2012 |
| CN | 302020661 | 8/2012 |
| CN | 102687620 A | 9/2012 |
| CN | 102687625 A | 9/2012 |
| CN | 302080704 | 9/2012 |
| CN | 102771246 A | 11/2012 |
| CN | 102771259 A | 11/2012 |
| CN | 302218376 | 12/2012 |
| CN | 102880175 A | 1/2013 |
| CN | 302299693 | 1/2013 |
| CN | 302350176 | 3/2013 |
| CN | 302456271 | 6/2013 |
| CN | 302483861 | 6/2013 |
| CN | 103294056 A | 9/2013 |
| CN | 103324191 A | 9/2013 |
| CN | 103324192 A | 9/2013 |
| CN | 203233683 U | 10/2013 |
| CN | 302629702 | 11/2013 |
| CN | 103473497 A | 12/2013 |
| CN | 302702748 | 1/2014 |
| CN | 103578164 A | 2/2014 |
| CN | 103676947 A | 3/2014 |
| CN | 203575087 U | 5/2014 |
| CN | 103858584 A | 6/2014 |
| CN | 203691948 U | 7/2014 |
| CN | 203735069 U | 7/2014 |
| CN | 302881351 | 7/2014 |
| CN | 104007765 A | 8/2014 |
| CN | 104025796 A | 9/2014 |
| CN | 203840762 U | 9/2014 |
| CN | 302943247 | 9/2014 |
| CN | 302943249 | 9/2014 |
| CN | 104094727 A | 10/2014 |
| CN | 104111460 A | 10/2014 |
| CN | 104111651 A | 10/2014 |
| CN | 104111652 A | 10/2014 |
| CN | 104111653 A | 10/2014 |
| CN | 203851480 U | 10/2014 |
| CN | 302974154 | 10/2014 |
| CN | 104160830 A | 11/2014 |
| CN | 302993652 | 11/2014 |
| CN | 204014494 U | 12/2014 |
| CN | 204047176 U | 12/2014 |
| CN | 303058887 | 12/2014 |
| CN | 303075143 | 1/2015 |
| CN | 104360684 A | 2/2015 |
| CN | 204143255 U | 2/2015 |
| CN | 104571102 A | 4/2015 |
| CN | 104686050 A | 6/2015 |
| CN | 104704979 A | 6/2015 |
| CN | 104704980 A | 6/2015 |
| CN | 204362599 U | 6/2015 |
| CN | 303232131 | 6/2015 |
| CN | 104737699 A | 7/2015 |
| CN | 104750104 A | 7/2015 |
| CN | 104782314 A | 7/2015 |
| CN | 104793614 A | 7/2015 |
| CN | 104793617 A | 7/2015 |
| CN | 204443108 U | 7/2015 |
| CN | 204462853 U | 7/2015 |
| CN | 204495362 U | 7/2015 |
| CN | 204515530 U | 7/2015 |
| CN | 204539960 U | 8/2015 |
| CN | 303318601 | 8/2015 |
| CN | 104904403 A | 9/2015 |
| CN | 104904404 A | 9/2015 |
| CN | 204613789 U | 9/2015 |
| CN | 204649212 U | 9/2015 |
| CN | 303408640 | 10/2015 |
| CN | 105082080 A | 11/2015 |
| CN | 105096177 A | 11/2015 |
| CN | 303452341 | 11/2015 |
| CN | 303452355 | 11/2015 |
| CN | 105163037 A | 12/2015 |
| CN | 204810982 U | 12/2015 |
| CN | 204858702 U | 12/2015 |
| CN | 204925588 U | 12/2015 |
| CN | 303478376 | 12/2015 |
| CN | 303519781 | 12/2015 |
| CN | 105230225 A | 1/2016 |
| CN | 103621244 B | 2/2016 |
| CN | 105353758 A | 2/2016 |
| CN | 303579400 | 2/2016 |
| CN | 105432212 A | 3/2016 |
| CN | 105512689 A | 4/2016 |
| CN | 303654613 | 4/2016 |
| CN | 105557175 A | 5/2016 |
| CN | 105573308 A | 5/2016 |
| CN | 105573311 A | 5/2016 |
| CN | 303670522 | 5/2016 |
| CN | 105660039 A | 6/2016 |
| CN | 105684630 A | 6/2016 |
| CN | 105700521 A | 6/2016 |
| CN | 205335882 U | 6/2016 |
| CN | 205336853 U | 6/2016 |
| CN | 303690781 | 6/2016 |
| CN | 105759813 A | 7/2016 |
| CN | 205431101 U | 8/2016 |
| CN | 205489586 U | 8/2016 |
| CN | 303778782 | 8/2016 |
| CN | 303862286 | 9/2016 |
| CN | 103283404 B | 10/2016 |
| CN | 105988469 A | 10/2016 |
| CN | 105988470 A | 10/2016 |
| CN | 106020207 A | 10/2016 |
| CN | 303888354 | 10/2016 |
| CN | 303888360 | 10/2016 |
| CN | 106142023 A | 11/2016 |
| CN | 205694315 U | 11/2016 |
| CN | 303933081 | 11/2016 |
| CN | 103941600 B | 12/2016 |
| CN | 106171248 A | 12/2016 |
| CN | 205812811 U | 12/2016 |
| CN | 205829192 U | 12/2016 |
| CN | 205830138 U | 12/2016 |
| CN | 303969591 | 12/2016 |
| CN | 106258166 A | 1/2017 |
| CN | 106325280 A | 1/2017 |
| CN | 106355609 A | 1/2017 |
| CN | 304004639 | 1/2017 |
| CN | 106393094 A | 2/2017 |
| CN | 106406301 A | 2/2017 |
| CN | 304055132 | 2/2017 |
| CN | 304055134 | 2/2017 |

(56) References Cited

FOREIGN PATENT DOCUMENTS

| | | |
|---|---|---|
| CN | 304055136 | 2/2017 |
| CN | 106489412 A | 3/2017 |
| CN | 205993268 U | 3/2017 |
| CN | 103576681 B | 4/2017 |
| CN | 206115269 U | 4/2017 |
| CN | 304095129 | 4/2017 |
| CN | 106647727 A | 5/2017 |
| CN | 106708033 A | 5/2017 |
| CN | 206196372 U | 5/2017 |
| CN | 304129527 | 5/2017 |
| CN | 304129534 | 5/2017 |
| CN | 106852225 A | 6/2017 |
| CN | 106877420 A | 6/2017 |
| CN | 206274765 U | 6/2017 |
| CN | 206278169 U | 6/2017 |
| CN | 304175254 | 6/2017 |
| CN | 304208974 | 7/2017 |
| CN | 107024910 A | 8/2017 |
| CN | 304227934 | 8/2017 |
| CN | 304241160 | 8/2017 |
| CN | 206472500 U | 9/2017 |
| CN | 304283754 | 9/2017 |
| CN | 206547328 U | 10/2017 |
| CN | 206547363 U | 10/2017 |
| CN | 206611777 U | 11/2017 |
| CN | 206611791 U | 11/2017 |
| CN | 206611812 U | 11/2017 |
| CN | 206619022 U | 11/2017 |
| CN | 107463166 A | 12/2017 |
| CN | 107463168 A | 12/2017 |
| CN | 107505939 A | 12/2017 |
| CN | 107515603 A | 12/2017 |
| CN | 107516226 A | 12/2017 |
| CN | 107517642 A | 12/2017 |
| CN | 206686605 U | 12/2017 |
| CN | 206808075 U | 12/2017 |
| CN | 107544483 A | 1/2018 |
| CN | 107600209 A | 1/2018 |
| CN | 107624368 A | 1/2018 |
| CN | 207037461 U | 2/2018 |
| CN | 107800200 A | 3/2018 |
| CN | 207075257 U | 3/2018 |
| CN | 304529661 | 3/2018 |
| CN | 304544247 | 3/2018 |
| CN | 107888751 A | 4/2018 |
| CN | 107913034 A | 4/2018 |
| CN | 107960191 A | 4/2018 |
| CN | 207201326 U | 4/2018 |
| CN | 304565875 | 4/2018 |
| CN | 108055906 A | 5/2018 |
| CN | 108064539 A | 5/2018 |
| CN | 108073179 A | 5/2018 |
| CN | 108156957 A | 6/2018 |
| CN | 108205313 A | 6/2018 |
| CN | 207496811 U | 6/2018 |
| CN | 108323326 A | 7/2018 |
| CN | 108337987 A | 7/2018 |
| CN | 108345297 A | 7/2018 |
| CN | 108345298 A | 7/2018 |
| CN | 207639110 U | 7/2018 |
| CN | 207651536 U | 7/2018 |
| CN | 207692389 U | 8/2018 |
| CN | 304767946 | 8/2018 |
| CN | 304794944 | 8/2018 |
| CN | 207851614 U | 9/2018 |
| CN | 304806495 | 9/2018 |
| CN | 304811825 | 9/2018 |
| CN | 108664014 A | 10/2018 |
| CN | 108693873 A | 10/2018 |
| CN | 207965652 U | 10/2018 |
| CN | 108919814 A | 11/2018 |
| CN | 208159284 U | 11/2018 |
| CN | 108957512 A | 12/2018 |
| CN | 109062225 A | 12/2018 |
| CN | 109075284 A | 12/2018 |
| CN | 208175354 U | 12/2018 |
| CN | 208285831 U | 12/2018 |
| CN | 304926953 | 12/2018 |
| CN | 304926955 | 12/2018 |
| CN | 109213123 A | 1/2019 |
| CN | 208387297 U | 1/2019 |
| CN | 304980236 | 1/2019 |
| CN | 305010344 | 1/2019 |
| CN | 305010365 | 1/2019 |
| CN | 305017366 | 1/2019 |
| CN | 105875063 B | 2/2019 |
| CN | 208480301 U | 2/2019 |
| CN | 208521989 U | 2/2019 |
| CN | 305027640 | 2/2019 |
| CN | 109542092 A | 3/2019 |
| CN | 208638993 U | 3/2019 |
| CN | 109566065 A | 4/2019 |
| CN | 109601114 A | 4/2019 |
| CN | 109658937 A | 4/2019 |
| CN | 109682368 A | 4/2019 |
| CN | 109682371 A | 4/2019 |
| CN | 109683604 A | 4/2019 |
| CN | 109696888 A | 4/2019 |
| CN | 208739598 U | 4/2019 |
| CN | 208752461 U | 4/2019 |
| CN | 109757189 A | 5/2019 |
| CN | 106982585 B | 6/2019 |
| CN | 109892096 A | 6/2019 |
| CN | 209002355 U | 6/2019 |
| CN | 209002393 U | 6/2019 |
| CN | 305196413 | 6/2019 |
| CN | 305225230 | 6/2019 |
| CN | 305227797 | 6/2019 |
| CN | 305227798 | 6/2019 |
| CN | 305227800 | 6/2019 |
| CN | 305503785 | 6/2019 |
| CN | 109960253 A | 7/2019 |
| CN | 109962512 A | 7/2019 |
| CN | 109983907 A | 7/2019 |
| CN | 109983908 A | 7/2019 |
| CN | 110018686 A | 7/2019 |
| CN | 209170907 U | 7/2019 |
| CN | 305261165 | 7/2019 |
| CN | 305261166 | 7/2019 |
| CN | 305265564 | 7/2019 |
| CN | 209265268 U | 8/2019 |
| CN | 209299766 U | 8/2019 |
| CN | 106155056 B | 9/2019 |
| CN | 110221594 A | 9/2019 |
| CN | 110268858 A | 9/2019 |
| CN | 209409782 U | 9/2019 |
| CN | 305355791 | 9/2019 |
| CN | 305357008 | 9/2019 |
| CN | 110347144 A | 10/2019 |
| CN | 110366368 A | 10/2019 |
| CN | 305407445 | 10/2019 |
| CN | 110447372 A | 11/2019 |
| CN | 209676901 U | 11/2019 |
| CN | 305447400 | 11/2019 |
| CN | 305452583 | 11/2019 |
| CN | 110584551 A | 12/2019 |
| CN | 110622680 A | 12/2019 |
| CN | 209861609 U | 12/2019 |
| CN | 305523640 | 12/2019 |
| CN | 209955654 U | 1/2020 |
| CN | 209964645 U | 1/2020 |
| CN | 305574602 | 1/2020 |
| CN | 110764495 A | 2/2020 |
| CN | 110850858 A | 2/2020 |
| CN | 110850860 A | 2/2020 |
| CN | 110852133 A | 2/2020 |
| CN | 210016305 U | 2/2020 |
| CN | 210116329 U | 2/2020 |
| CN | 305596393 | 2/2020 |
| CN | 105988472 B | 3/2020 |
| CN | 107493797 B | 3/2020 |
| CN | 110881903 A | 3/2020 |
| CN | 110895411 A | 3/2020 |
| CN | 110915409 A | 3/2020 |

(56) References Cited

FOREIGN PATENT DOCUMENTS

| | | |
|---|---|---|
| CN | 110928280 A | 3/2020 |
| CN | 110928285 A | 3/2020 |
| CN | 107643751 B | 4/2020 |
| CN | 111034450 A | 4/2020 |
| CN | 111045423 A | 4/2020 |
| CN | 305716236 | 4/2020 |
| CN | 107643750 B | 5/2020 |
| CN | 108142070 B | 5/2020 |
| CN | 111123910 A | 5/2020 |
| CN | 111165158 A | 5/2020 |
| CN | 210444878 U | 5/2020 |
| CN | 210580043 U | 5/2020 |
| CN | 305750432 | 5/2020 |
| CN | 305757781 | 5/2020 |
| CN | 305789888 | 5/2020 |
| CN | 111226569 A | 6/2020 |
| CN | 210782124 U | 6/2020 |
| CN | 210808273 U | 6/2020 |
| CN | 210821640 U | 6/2020 |
| CN | 210839520 U | 6/2020 |
| CN | 305827495 | 6/2020 |
| CN | 305827496 | 6/2020 |
| CN | 305827503 | 6/2020 |
| CN | 305860595 | 6/2020 |
| CN | 305860598 | 6/2020 |
| CN | 305869411 | 6/2020 |
| CN | 106717462 B | 7/2020 |
| CN | 108811699 B | 7/2020 |
| CN | 210900401 U | 7/2020 |
| CN | 210987056 U | 7/2020 |
| CN | 211015146 U | 7/2020 |
| CN | 305946746 | 7/2020 |
| CN | 305946760 | 7/2020 |
| CN | 111487982 A | 8/2020 |
| CN | 111512766 A | 8/2020 |
| CN | 211212948 U | 8/2020 |
| CN | 305989577 | 8/2020 |
| CN | 306019404 | 8/2020 |
| CN | 105988471 B | 9/2020 |
| CN | 111685651 A | 9/2020 |
| CN | 211531846 U | 9/2020 |
| CN | 211580673 U | 9/2020 |
| CN | 107637255 B | 10/2020 |
| CN | 110754204 B | 10/2020 |
| CN | 111742692 A | 10/2020 |
| CN | 111766589 A | 10/2020 |
| CN | 111819988 A | 10/2020 |
| CN | 211721118 U | 10/2020 |
| CN | 211721119 U | 10/2020 |
| CN | 211741921 U | 10/2020 |
| CN | 211741924 U | 10/2020 |
| CN | 306085189 | 10/2020 |
| CN | 306128197 | 10/2020 |
| CN | 306140210 | 10/2020 |
| CN | 306174630 | 11/2020 |
| CN | 112009175 A | 12/2020 |
| CN | 112119742 A | 12/2020 |
| CN | 112120620 A | 12/2020 |
| CN | 112134314 A | 12/2020 |
| CN | 112147992 A | 12/2020 |
| CN | 212061111 U | 12/2020 |
| CN | 212116218 U | 12/2020 |
| CN | 212116223 U | 12/2020 |
| CN | 306223128 | 12/2020 |
| CN | 306236075 | 12/2020 |
| CN | 306236808 | 12/2020 |
| CN | 112230636 A | 1/2021 |
| CN | 112230637 A | 1/2021 |
| CN | 112230644 A | 1/2021 |
| CN | 112235760 A | 1/2021 |
| CN | 112259866 A | 1/2021 |
| CN | 112261631 A | 1/2021 |
| CN | 212304892 U | 1/2021 |
| CN | 212305863 U | 1/2021 |
| CN | 306278588 | 1/2021 |
| CN | 306303188 | 1/2021 |
| CN | 106909140 B | 2/2021 |
| CN | 109247117 B | 2/2021 |
| CN | 109683556 B | 2/2021 |
| CN | 112306049 A | 2/2021 |
| CN | 112385401 A | 2/2021 |
| CN | 112400453 A | 2/2021 |
| CN | 212499740 U | 2/2021 |
| CN | 212515710 U | 2/2021 |
| CN | 212520009 U | 2/2021 |
| CN | 212539202 U | 2/2021 |
| CN | 212572469 U | 2/2021 |
| CN | 212621511 U | 2/2021 |
| CN | 306328112 | 2/2021 |
| CN | 112435422 A | 3/2021 |
| CN | 112438114 A | 3/2021 |
| CN | 112445221 A | 3/2021 |
| CN | 112449864 A | 3/2021 |
| CN | 112492956 A | 3/2021 |
| CN | 112514637 A | 3/2021 |
| CN | 112567959 A | 3/2021 |
| CN | 112567961 A | 3/2021 |
| CN | 212696648 U | 3/2021 |
| CN | 212696668 U | 3/2021 |
| CN | 306358736 | 3/2021 |
| CN | 112602441 A | 4/2021 |
| CN | 112720451 A | 4/2021 |
| CN | 112731935 A | 4/2021 |
| CN | 212876733 U | 4/2021 |
| CN | 212906002 U | 4/2021 |
| CN | 212933333 U | 4/2021 |
| CN | 212970834 U | 4/2021 |
| CN | 213075541 U | 4/2021 |
| CN | 213091901 U | 4/2021 |
| CN | 112740889 A | 5/2021 |
| CN | 112764419 A | 5/2021 |
| CN | 112769424 A | 5/2021 |
| CN | 112773264 A | 5/2021 |
| CN | 112799395 A | 5/2021 |
| CN | 112799399 A | 5/2021 |
| CN | 112823584 A | 5/2021 |
| CN | 112824993 A | 5/2021 |
| CN | 112826376 A | 5/2021 |
| CN | 112840828 A | 5/2021 |
| CN | 112859828 A | 5/2021 |
| CN | 213187216 U | 5/2021 |
| CN | 213210764 U | 5/2021 |
| CN | 213214364 U | 5/2021 |
| CN | 213240579 U | 5/2021 |
| CN | 306511371 | 5/2021 |
| CN | 306530808 | 5/2021 |
| CN | 306569554 | 5/2021 |
| CN | 306569555 | 5/2021 |
| CN | 306569560 | 5/2021 |
| CN | 107976995 B | 6/2021 |
| CN | 110122045 B | 6/2021 |
| CN | 112947399 A | 6/2021 |
| CN | 112970414 A | 6/2021 |
| CN | 113039919 A | 6/2021 |
| CN | 213306269 U | 6/2021 |
| CN | 306604261 | 6/2021 |
| CN | 113064419 A | 7/2021 |
| CN | 113156928 A | 7/2021 |
| CN | 113156929 A | 7/2021 |
| CN | 213814000 U | 7/2021 |
| CN | 306670241 | 7/2021 |
| CN | 306680105 | 7/2021 |
| CN | 306694791 | 7/2021 |
| CN | 106300578 B | 8/2021 |
| CN | 108781704 B | 8/2021 |
| CN | 113311830 A | 8/2021 |
| CN | 213850492 U | 8/2021 |
| CN | 213921292 U | 8/2021 |
| CN | 306745285 | 8/2021 |
| CN | 306753239 | 8/2021 |
| CN | 306768440 | 8/2021 |
| CN | 113366964 A | 9/2021 |
| CN | 113439526 A | 9/2021 |
| CN | 113448259 A | 9/2021 |

(56) References Cited

FOREIGN PATENT DOCUMENTS

| | | |
|---|---|---|
| CN | 214126036 U | 9/2021 |
| CN | 214151499 U | 9/2021 |
| CN | 214178073 U | 9/2021 |
| CN | 214240309 U | 9/2021 |
| CN | 306824139 | 9/2021 |
| CN | 306839148 | 9/2021 |
| CN | 306846782 | 9/2021 |
| CN | 113455167 A | 10/2021 |
| CN | 113552873 A | 10/2021 |
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 2006708 A1 | 12/2008 |
| EP | 2026161 A1 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 3495910 A1 | 6/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3725146 A1 | 10/2020 |

(56) References Cited

FOREIGN PATENT DOCUMENTS

| | | |
|---|---|---|
| EP | 3753387 A1 | 12/2020 |
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 3/1971 |
| GB | 1371959 A | 10/1974 |
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006251883 A | 9/2006 |
| JP | 2006268497 A | 10/2006 |
| JP | 2011020615 A | 2/2011 |
| JP | 2015149963 A | 8/2015 |
| KR | 20130044130 A | 5/2013 |
| KR | 20150125305 A | 11/2015 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO9106435 A1 | 5/1991 |
| WO | WO9749528 A1 | 12/1997 |
| WO | WO0060921 A1 | 10/2000 |
| WO | WO0074466 A1 | 12/2000 |
| WO | WO03040846 A1 | 5/2003 |
| WO | WO03103375 A1 | 12/2003 |
| WO | WO2005002320 A1 | 1/2005 |
| WO | WO2006094887 A2 | 9/2006 |
| WO | WO2006094889 A1 | 9/2006 |
| WO | WO2006102740 A1 | 10/2006 |
| WO | WO2007091967 A1 | 8/2007 |
| WO | WO2007140930 A1 | 12/2007 |
| WO | WO2008015479 A2 | 2/2008 |
| WO | WO2008060689 A2 | 5/2008 |
| WO | WO2008068494 A1 | 6/2008 |
| WO | WO2008095715 A2 | 8/2008 |
| WO | WO2008144135 A1 | 11/2008 |
| WO | WO2009036644 A1 | 3/2009 |
| WO | WO2009071379 A1 | 6/2009 |
| WO | WO2009077239 A1 | 6/2009 |
| WO | WO2009083319 A1 | 7/2009 |
| WO | WO2010077198 A1 | 7/2010 |
| WO | WO2010130479 A2 | 11/2010 |
| WO | WO2011115536 A1 | 9/2011 |
| WO | WO2012047176 A1 | 4/2012 |
| WO | WO2013010475 A1 | 1/2013 |
| WO | WO2013011252 A1 | 1/2013 |
| WO | WO2013025135 A1 | 2/2013 |
| WO | WO2013064301 A1 | 5/2013 |
| WO | WO2013081516 A1 | 6/2013 |
| WO | WO2013083311 A1 | 6/2013 |
| WO | WO2013102417 A1 | 7/2013 |
| WO | WO2013107266 A1 | 7/2013 |
| WO | WO2013107374 A1 | 7/2013 |
| WO | WO2013125992 A1 | 8/2013 |
| WO | WO2013185622 A1 | 12/2013 |
| WO | WO2014007694 A1 | 1/2014 |
| WO | WO2014056443 A1 | 4/2014 |
| WO | WO2014071860 A1 | 5/2014 |
| WO | WO2014079363 A1 | 5/2014 |
| WO | WO2014079632 A1 | 5/2014 |
| WO | WO2014086267 A1 | 6/2014 |
| WO | WO2014173290 A1 | 10/2014 |
| WO | WO2015010277 A1 | 1/2015 |
| WO | WO2015053488 A1 | 4/2015 |
| WO | WO2015144998 A1 | 10/2015 |
| WO | WO2015154822 A1 | 10/2015 |
| WO | WO2015161829 A1 | 10/2015 |
| WO | WO2015169343 A1 | 11/2015 |
| WO | WO2015172831 A1 | 11/2015 |
| WO | WO2015182514 A1 | 12/2015 |
| WO | WO2015192903 A1 | 12/2015 |
| WO | WO2016038512 A1 | 3/2016 |
| WO | WO2016097891 A1 | 6/2016 |
| WO | WO2016097892 A1 | 6/2016 |
| WO | WO2016097897 A1 | 6/2016 |
| WO | WO2016103070 A1 | 6/2016 |
| WO | WO2016108104 A1 | 7/2016 |
| WO | WO2016109721 A1 | 7/2016 |
| WO | WO2016119751 A1 | 8/2016 |
| WO | WO2016127923 A1 | 8/2016 |
| WO | WO2016131399 A1 | 8/2016 |
| WO | WO2016184398 A1 | 11/2016 |
| WO | WO2017101882 A1 | 6/2017 |
| WO | WO2017123137 A1 | 7/2017 |
| WO | WO2017129551 A1 | 8/2017 |
| WO | WO2017133625 A1 | 8/2017 |
| WO | WO2017148438 A1 | 9/2017 |
| WO | WO2017167207 A1 | 10/2017 |
| WO | WO2017181995 A1 | 10/2017 |
| WO | WO2017186372 A1 | 11/2017 |
| WO | WO2017190784 A1 | 11/2017 |
| WO | WO2017198222 A1 | 11/2017 |
| WO | WO2017206950 A1 | 11/2017 |
| WO | WO2017211308 A1 | 12/2017 |
| WO | WO2018001340 A1 | 1/2018 |
| WO | WO2018010650 A1 | 1/2018 |
| WO | WO2018028624 A1 | 2/2018 |
| WO | WO2018057250 A1 | 3/2018 |
| WO | WO2018057452 A2 | 3/2018 |
| WO | WO2018057589 A1 | 3/2018 |
| WO | WO2018059323 A1 | 4/2018 |
| WO | WO2018103178 A1 | 6/2018 |
| WO | WO2018117190 A1 | 6/2018 |
| WO | WO2018125222 A1 | 7/2018 |
| WO | WO2018127209 A1 | 7/2018 |
| WO | WO2018146518 A1 | 8/2018 |
| WO | WO2018153599 A1 | 8/2018 |
| WO | WO2018174777 A1 | 9/2018 |
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |

(56) References Cited

FOREIGN PATENT DOCUMENTS

| | | |
|---|---|---|
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO2020193513 A1 | 10/2020 |
| WO | WO2020199055 A1 | 10/2020 |
| WO | WO2020218960 A1 | 10/2020 |
| WO | WO2020256619 A1 | 12/2020 |
| WO | WO2020259586 A1 | 12/2020 |
| WO | WODM212022 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | WO2021164738 A1 | 8/2021 |
| WO | WO2021175331 A1 | 9/2021 |
| WO | WO2021180123 A1 | 9/2021 |
| WO | WO2021190627 A1 | 9/2021 |
| WO | WO2021208308 A1 | 10/2021 |
| WO | WO2021215980 A1 | 10/2021 |
| WO | WODM217452 | 10/2021 |
| WO | WO2021225494 A1 | 11/2021 |
| WO | WO2021230791 A1 | 11/2021 |
| WO | WO2021233205 A1 | 11/2021 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Extended European Search Reoprt for Application No. 23185499.3 dated Oct. 11, 2023 (4 pages).

\* cited by examiner

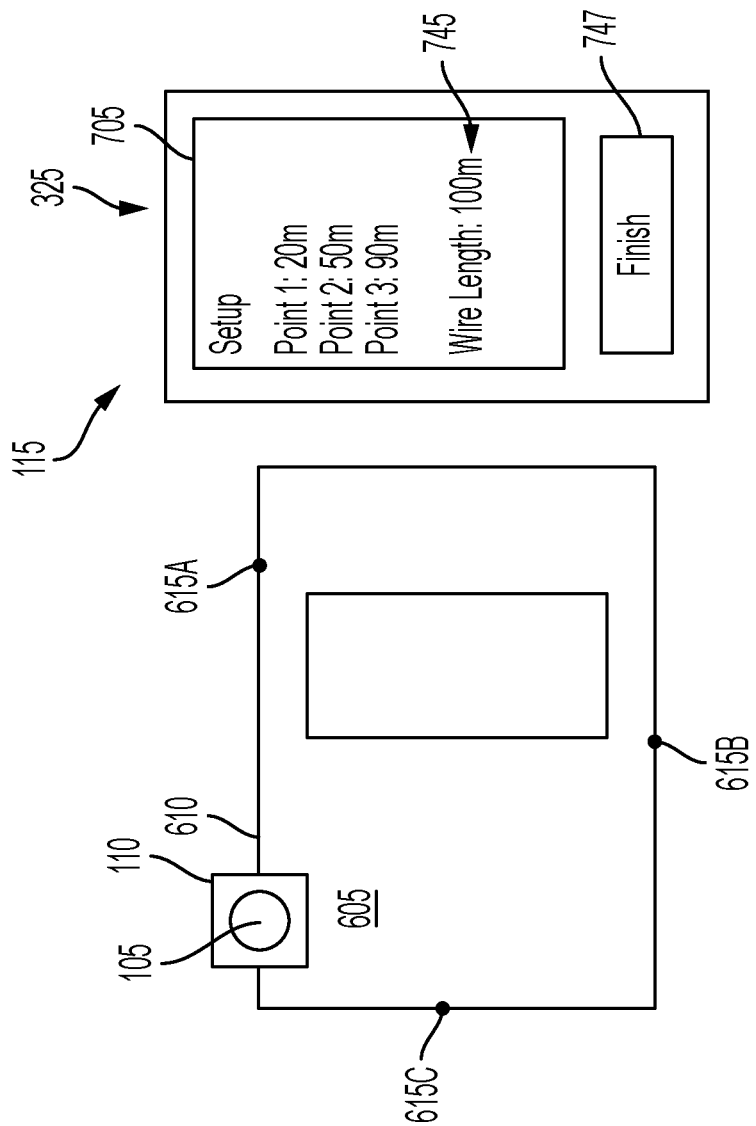

DISPLAY FOR CONTROLLING ROBOTIC TOOL

CROSS-REFERENCE OF RELATED APPLICATIONS

This application claims priority to prior-filed, U.S. Provisional Application No. 63/390,574 filed on Jul. 19, 2022, the entire contents of which is hereby incorporated by reference.

FIELD

The embodiments described herein related to a robotic tools, particularly to displays for controlling and monitoring start points of a robotic garden tool.

BACKGROUND

Robotic tools typically have some form of controller or control unit associated therewith to control the movement and operation of the robotic tool during use.

SUMMARY

In one aspect, an external device for use with one or more robotic tools, the external device including a display, a device network interface configured to allow the external device to wirelessly communicate with the one or more robotic tools, an electronic processor coupled to the display, the device network interface, and a memory, and configured to communicate with the one or more robotic garden tools via the device network interface, the electronic processor configured to display a start point screen on the display, the start point screen including an initiate setup button and an add start point button, where when the initiate setup button is selected by a first user input, the processor is configured to send a signal to the first robotic garden tool to travel from a dock and along a perimeter of an operating area, where the first robotic garden tool includes an odometry unit, which, while the first robotic garden tool travels along the boundary of the operating area, gathers data indicative of the position of the first robotic garden tool, where when the add start point button is selected by a second user input, the processor is configured to retrieve a first position of the first robotic garden tool, the first position being indicative of a first start point remote of the dock, and where the first robotic garden tool is configured to return to the dock after traveling along the perimeter and to communicate a calculated boundary length based on the data gathered by the odometry unit to the processor.

Alternatively or additionally, in any combination, where the start point button is configured to be selected during a first instance of the first robotic garden tool traveling from the dock and along the boundary of the operating area.

Alternatively or additionally, in any combination, where the odometry unit continuously communicates data indicative of the position of the first robotic garden tool with the external device via the device network interface.

Alternatively or additionally, in any combination, where a current boundary length is calculated based on the data gathered by the odometry unit, and the current boundary length is displayed on the setup screen as the first robotic garden tool travels along the boundary.

Alternatively or additionally, in any combination, where the setup screen includes an indicia relating to the calculated perimeter length.

Alternatively or additionally, in any combination, where the setup screen includes a line segment indicative of the perimeter, and a first start point indicia is populated adjacent the line segment at a corresponding length along the boundary as the first position.

Alternatively or additionally, in any combination, where the setup screen further includes a start point indicia relating to the length of the first position relative to the dock.

Alternatively or additionally, in any combination, where in a first lap of the first robotic garden tool along the perimeter, the odometry unit gathers data for calculation of the boundary length, and in a subsequent start point setting lap of the first robotic garden tool along the perimeter, the start point button is selected by the second user input to generate the first start point.

Alternatively or additionally, in any combination, after the first robotic garden tool returns to the dock and receives instructions to operate in a general operational state, the first robotic garden tool is configured to travel along the perimeter to the first start point and operate within the operating area starting from the first start point.

Alternatively or additionally, in any combination, where when the add start point button is selected by a third user input, the processor is configured to retrieve a second position of the first robotic garden tool, the second position being indicative of a second start point remote of the dock, the second position being different than the first position, and one of the first robotic garden tool and the external device includes a frequency balancing feature configured to determine whether the first robotic garden tool should travel along the perimeter to the first start point or the second start point prior to operation within the operating area from either the first start point or the second start point.

In another aspect, an external device including a display, a device network interface configured to allow the external device to wirelessly communicate with one or more robotic garden tools, an electronic processor coupled to the display, the device network interface, and the memory, and configured to communicate with the one or more robotic garden tools via the device network interface, the electronic processor configured to display a start point screen on the display, the start point screen including a line segment indicative of a perimeter of an operating area, and at least one start point indicator indicative of a first start point of the first robotic tool along the boundary, where when a first start point indicator of the at least one start point indicator is selected by a first user input, the processor is configured to send a signal to the first robotic garden tool to travel to the first start point, and where the first start point indicator is configured to be edited by a second user input to edit the first start point, and the processor is configured to reprogram the first start point to an adjusted first start point.

Alternatively or additionally, in any combination, where the first start point indicator is positioned adjacent the line segment a corresponding amount relating to a first distance between a dock on the perimeter and the first start point.

Alternatively or additionally, in any combination, where the edited first start point is positioned adjacent the line segment a corresponding amount relating to a second distance between the dock and the edited start point.

Alternatively or additionally, in any combination, where the electronic processor is configured to display a start point indicia on the start point screen and adjacent both the first start point indicator and the line segment, the start point indicia providing further indication of the distance between the dock and the first start point.

Alternatively or additionally, in any combination, where the electronic processor is configured to display a second start point indicator on the start point screen, the second start point indicator being indicative of a second start point of the first robotic garden tool along the boundary.

Alternatively or additionally, in any combination, where the electronic processor is configured to display a boundary length indicia on the start point screen, the boundary length indicia being indicative of a length of the boundary.

Alternatively or additionally, in any combination, where the electronic processor is configured to display a graphical user input interface once the external device receives the second user input, the graphical user input interface presenting to a user a plurality of options for adjusting the position of the first start point to the adjusted first start point.

In another aspect, an external device including a display, a device network interface configured to allow the external device to wirelessly communicate with one or more robotic garden tools, an electronic processor coupled to the display, the device network interface, and the memory, and configured to communicate with the one or more robotic garden tools via the device network interface, the electronic processor configured to display a start point screen on the display, the start point screen including a first display area having a line segment and at least one frequency adjustment indicator, where the line segment is indicative of a starting frequency of a first robotic garden tool of the one or more robotic garden tools to start cutting at either a first start point or a second start point different than the first start point, and where the frequency adjustment indicator is configured to be edited by a user input to edit the starting frequency of the first robotic garden tool.

Alternatively or additionally, in any combination, where the electronic processor is further configured to display a second display area having a second line segment and at least one start point indicator.

Alternatively or additionally, in any combination, where the first line segment and the second line segment extend parallel to one another in the first display area and the second display area, respectively.

BRIEF DESCRIPTION OF THE DRAWINGS

FIGS. 7A-7E illustrate the robotic tool of FIG. 1A operating in an exemplary operating area and an initialization setup screen displayed on the external device.

DETAILED DESCRIPTION

Figure 1A:
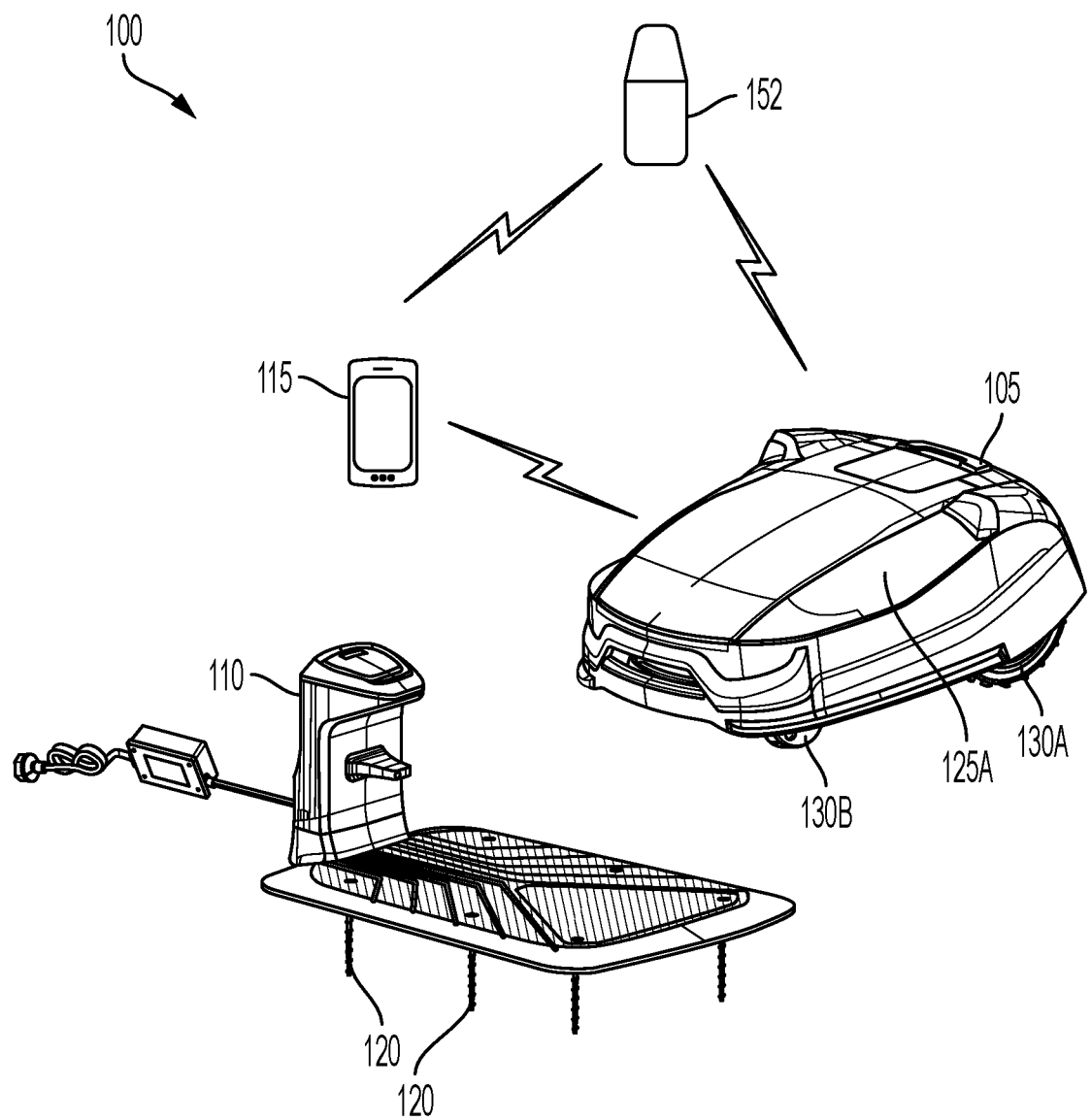
FIG. 1A illustrates a communication system including a robotic tool according to some example embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" may be used to describe the dimensions of various components and/or paths of travel of a robotic garden tool. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

FIG. 1A illustrates a communication system 100 that may include a robotic tool 105 (e.g., a robotic lawn mower), a docking station 110 for use with the robotic tool 105, an external device 115, and a server 152 according to some example embodiments. The robotic tool 105 may include a tool for cutting debris, sweeping debris, vacuuming debris, clearing debris, collecting debris, moving debris, and the like. Debris, in turn, may include plants (such as grass, leaves, flowers, stems, weeds, twigs, branches, etc., and clippings thereof), dust, dirt, jobsite debris, snow, and/or the like. For example, other implementations of the robotic tool 105 may include a vacuum cleaner, a trimmer, a string trimmer, a hedge trimmer, a sweeper, a cutter, a plow, a blower, a snow blower, etc.

In some embodiments, a lawn may include any type of property that includes grass, a crop, some other material to be trimmed, cleared, gathered, etc., and/or that includes some material to receive treatment from the robotic tool 105 (e.g., fertilizer to treat grass in the lawn). In some embodiments, a lawn may include paved portions of a property (e.g., a driveway), for example, when the robotic tool 105 is used for snow plowing/removal.

The docking station 110 of the system 100 is generally positioned along the perimeter 610 of the operating area 605 and is configured to serve as a docking location for the tool 105. More specifically, during use the robotic tool 105 may be configured to dock at the docking station 110 in order to charge a battery 245 and/or exchange information therebetween. In some embodiments, the docking station 110 is also configured to make an electrical connection with a power supply (e.g., via a cord and plug connected to a wall outlet that is connected to a power grid) in order to provide charging current to the robotic tool 105 when the robotic tool 105 is electrically coupled with the docking station 110. The docking station 110 may also include a hardline, wireless, and/or co-axial cable connection to allow data to transmitted thereto in both a wired and wireless fashion.

In some embodiments, the docking station 110 may also be electrically connected to a boundary wire 608 extending along and at least partially establishing the perimeter 610 of an operating area 605. In the illustrated embodiment, the boundary wire 608 generally runs along and is aligned with the perimeter 610. However, in some other embodiments, the boundary wire 608 may be offset (in an inward or outward direction) relative to the perimeter 610. In some embodiments, the docking station 110 provides power to the boundary wire 608 whereby the boundary wire 608 emits, for example, an electromagnetic signal that may be detected by the robotic tool 105.

In some embodiments, the robotic tool 105 does not operate in conjunction with a boundary wire 608. Rather, the robotic tool 105 may include mapping capabilities, position tracking capabilities (e.g., via GPS, odometry, and/or the like) that allow the robotic tool 105 to remain within the predefined perimeter 610 without the use of a physical boundary wire 608.

While FIG. 1A illustrates one robotic tool 105, one docking station 110, and one external device 115, in some embodiments, the communication system 100 includes additional robotic tools 105, docking stations 110, and/or external devices 115. In some embodiments, a single external device 115 may be configured to communicate with multiple robotic tools 105 to control and/or monitor the multiple robotic tools 105. In some embodiments, a single one of the robotic tools 105 may be configured to dock to a plurality of docking stations 110. Still further, in embodiments where more than one robotic tool 105 is present, different types of tool 105 may be used. For example, the system 100 may include a lawn mower, a string trimmer, and a fertilizer.

While FIG. 1A illustrates one server 152, in some embodiments, the communication system 100 may include additional servers 152. In still other embodiments, the communication system 100 may not include any servers 152. While not shown in FIG. 1A, as mentioned above, in some embodiments the communication system 100 may include a network such as a cellular network that includes one or more devices that act as an intermediary device to allow the robotic tool 105 to bidirectionally communicate with the external device 115 when the robotic tool 105 and the external device 115 are not within direct communication range of each other.

If the communication system 100 becomes disconnected for any reason during which the robotic tool 105 requires wireless communication, at least one of the first electronic processor 205 and the second electronic processor 305 may determine that the communication system 100 is disconnected via a signal or a lack of signal received by either the first network interface 215 or the second network interface 315. In the event that communication system 100 is disconnected, operation of the robotic tool 105 may cease, and/or the robotic tool 105 may return to the docking station 110. Subsequently, the second electronic processor 305 may display via the second display 325 to the user that the communication system 100 is disconnected. The user may be prompted via the second display 325 to reconnect the communication system 100 prior to further operation of the robotic tool 105. This may require, in the instance of Bluetooth™ and/or WiFi™ communications, for the user to physically locate the external device 115 closer to the robotic tool 105 and/or vice versa.

Figure 1B:
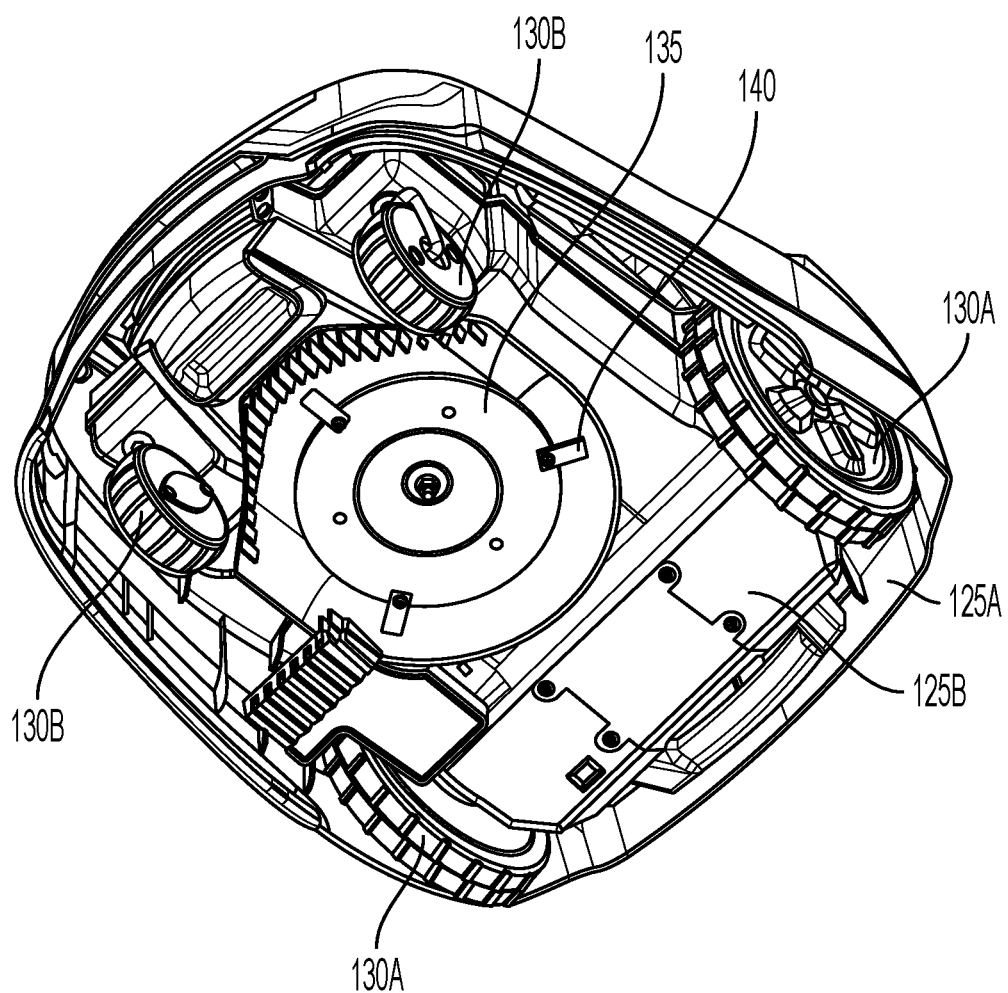
FIG. 1B illustrates a bottom perspective view of the robotic tool of FIG. 1A according to some example embodiments.

FIG. 1B illustrates a bottom perspective view of the robotic tool 105 according to some example embodiments. The robotic tool 105 may include a housing 125 that may include an outer housing 125A (i.e., outer housing shell) and an inner housing 125B. The outer housing 125A may be coupled to the inner housing 125B. The robotic tool 105 also may include wheels 130 (i.e., a set of wheels 130) coupled to the inner housing 125B and configured to rotate with respect to the housing 125 to propel the robotic tool 105 on an operating surface (e.g., a yard to be mowed). The wheels 130 may include motor-driven wheels 130A and non-motor-driven wheels 130B. In the embodiment shown in FIG. 1B, two rear motor-driven wheels 130A are motor-driven wheels 130A while two front wheels 130B are non-motor-driven wheels 130B. In other embodiments, the robotic tool 105 may include a different wheel arrangement (e.g., a different number of total wheels, a different number of each type of wheel, different wheels being motor-driven or non-motor-driven, and/or the like). In some embodiments, the housing 125 may not include the outer housing 125A and the inner housing 125B. Rather, the housing 125 may include a single integrated body/housing to which the wheels 130 are attached.

The robotic tool 105 also includes a wheel motor 235 (see FIG. 2) coupled to one or more wheels 130 and configured to drive rotation of the one or more wheels 130. In the illustrated embodiment, the robotic tool 105 includes multiple wheel motors 235 where each wheel motor 235 is configured to drive rotation of a respective motor-driven wheel 130A (see FIG. 2).

The robotic tool 105 also includes a working tool 135 configured to treat or otherwise interact with an operating area 605 within which the robotic tool 105 travels. The working tool 135 may be any working tool configured to interact with the operating area 605. For example, the working tool 135 in the illustrated embodiment is a cutting blade assembly which is coupled to the inner housing 125B and configured to rotate with respect to the housing 125 to cut grass within the operating area 605. In the illustrated embodiment, the working tool 135 may include a rotating disc to which a plurality of cutting blades 140 configured to cut the grass are attached. In some embodiments, the robotic tool 105 includes a working tool motor 240 (see FIG. 2) coupled to the inner housing 125B and to the working tool 135. The working tool motor 240 may be configured to drive rotation of the working tool 135. Other embodiments of the robotic tool 105 may include correspondingly operating working tools 135. For example, in embodiments where the robotic tool 105 is a plow, the working tool 135 thereof may include a fixed or articulating plow configured to plow snow or other debris or plow underlying dirt of the operating area 605. In embodiments where the robotic tool 105 spreads fertilizer, the working tool 135 may include a fertilizer spreader and feed system. Various other embodiments are envisioned.

In some embodiments, the robotic tool 105 and/or the docking station 110 include additional components and functionality than is shown and described herein.

Figure 2:
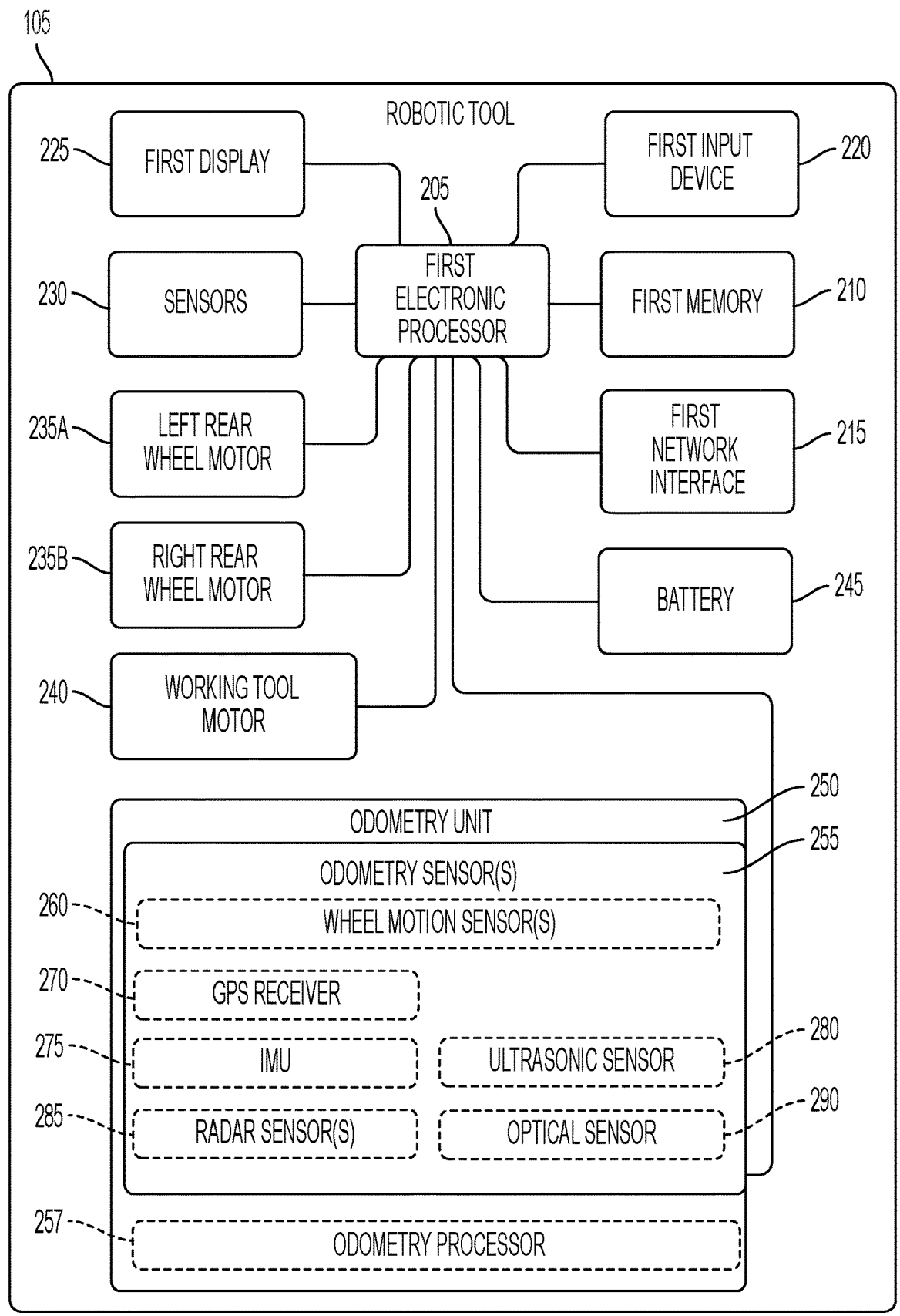
FIG. 2 is a block diagram of the robotic tool of FIGS. 1A and 1B according to some example embodiments.

FIG. 2 is a block diagram of the robotic tool 105 according to some example embodiments. In the embodiment illustrated, the robotic tool 105 includes a first electronic processor 205 (for example, a microprocessor or other electronic device). The first electronic processor 205 includes input and output interfaces (not shown) and is electrically coupled to a first memory 210, a first network interface 215, an optional first input device 220, an optional display 225, one or more sensors 230, a left rear wheel motor 235A, a right rear wheel motor 235B, a working tool motor 240, and a battery 245.

In some embodiments, the robotic tool 105 includes fewer or additional components in configurations different from that illustrated in FIG. 2. For example, the robotic tool 105 may include a location tracking device (e.g., a global positioning system (GPS) receiver) and/or a height adjustment motor configured to adjust a height of the working tool 135 (e.g., to set the cutting height). As yet another example, the robotic tool 105 may include additional sensors or fewer sensors than the sensors 230 described herein. In some embodiments, the robotic tool 105 performs functionality other than the functionality described below.

The first memory 210 of the tool 105 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 of the tool 105 is configured to send data to and receive data from other devices in the communication system 100 (e.g., the external device 115, the server 152, etc.). In some embodiments, the first network interface 215 includes one or more transceivers for wirelessly communicating with the external device 115 and/or the docking station 110 (e.g., a first radio frequency (RF) transceiver configured to communicate via Bluetooth™, WiFi™, or the like). The first network interface 215 may include an additional transceiver for wirelessly communicating with the server 152 via, for example, cellular communication. In some embodiments, at least some of the transceivers and/or receivers of the robotic tool 105 may be combined or share some elements (e.g., an antenna and/or other hardware). Alternatively or additionally, the first network interface 215 may include a connector or port for receiving a wired connection to the external device 115, such as USB cable.

As indicated in FIG. 1A, the robotic tool 105 is configured to bidirectionally wirelessly communicate with the external device 115 and/or the server 152. In some embodiments, the robotic tool 105 is configured to directly communicate with the external device 115 when the robotic tool 105 is within communication range of the external device 115 (e.g., via Bluetooth™, WiFi™, or the like). The robotic tool 105 is additionally or alternatively configured to communicate with the external device 115 via an intermediary device such as the server 152, a cellular communication tower/base station, another device in a cellular network, or the like (e.g., when the robotic tool 105 is outside of direct communication range with the external device 115). In some embodiments, other intermediate devices may provide a communication link between the external device 115 and the robotic tool 105. For example, the docking station 110 may function as an intermediate device providing a communication link between the external device 115 and the robotic tool 105. In some embodiments, the docking station 110 may serve as a range extender device (e.g., a "hot spot") configured to extend a communication range of any given communication protocol (e.g., Bluetooth™, WiFi™, or the like) between any of the external device 115, the robotic tool 105, and the server 152.

The first user input device 220 of the tool 105 is configured to allow the first electronic processor 205 to receive a user input to, for example, set/adjust an operational parameter (i.e., an attribute) (e.g., cutting/shoveling height, a blade speed, volumetric flow rate of fertilizer, travel path of the mower) of the robotic tool 105.

The first display 225 of the tool 105 is configured to display a user interface to the user (e.g., current power levels, current operating conditions, the presence of any alerts or faults, network status, described below). Similar to the user interface of the external device 115 (described below), the user interface displayed on the first display 225 may allow the user to access and interact with robotic mower information.

In some embodiments, the first display 225 may also act as the first input device 220. For example, a touch sensitive input interface (e.g., a touchscreen) may be incorporated into the first display 225 to allow the user to interact with content provided on the first display 225. The first display 225 may be a liquid crystal display (LCD) screen, an organic light emitting display (OLED) display screen, or an E-ink display. In some embodiments, the first display 225 includes future-developed display technologies.

In the illustrated embodiment, the first electronic processor 205 is in communication with a plurality of sensors 230 associated with the tool 105. Such sensors 230 may include electromagnetic field sensors, radio frequency sensors (e.g., radio frequency identification (RFID) interrogators/sensors), Hall sensors, other magnetic sensors, a transceiver/receiver of the first network interface 215, and/or the like. In some embodiments, the inner housing 125B includes at least two boundary cable sensors 230 in the form of electromagnetic field sensors configured to detect an electromagnetic signal being emitted by the boundary wire 608. For example, the electromagnetic field sensors may be able to detect a strength and/or a polarity of the electromagnetic signal from the boundary wire 608.

As shown in FIG. 2, the robotic tool 105 may also include an odometry unit 250. The odometry unit 250 is in operable communication with the first electric processor 205 and is configured to monitor and track the trajectory of the robotic tool 105 during operation. More specifically, the odometry unit 250 includes one or more odometry sensors 255 configured to collect data regarding the operation of (e.g., the position of) the robotic tool 105 and output the collected data to be processed by a processor (e.g., the first electronic processor 205, the second electronic processor 305, a processor of the docking station 110, and/or a processor of the server 152) to calculate the trajectory traveled by the mower 105.

In some embodiments, the odometry unit 250 may be a stand-alone device having a dedicated odometry processor 257 to independently process the data output by the one or more odometry sensors 255. The odometry processor 257, in turn, may be in two-way communication with the first electronic processor 205 of the robotic tool 105. The odometry unit 250 may output, via the odometry processor 257, a compiled (e.g., calculated) trajectory to the first electronic processor 205. However in other embodiments, raw data may be sent from the odometry sensor(s) 255 to any one of the first electronic processor 205, the second electronic processor 305, and/or the cloud where the data from the odometry sensor(s) 255 may be processed to calculate a trajectory of the robotic tool 105. The first electronic processor 205 of the robotic tool 105 may also transmit the data from the odometry unit 250 (raw or processed) via the first network interface 215 and the second network interface 315 to the second electronic processor 305 of the external device 115.

In one embodiment, the odometry unit 250 may include one or more wheel motion sensors 260, each coupled to and in operable communication with a corresponding motor-driven wheel 130A. More specifically, each wheel motion sensor 260 may be configured to detect and output a signal representative of how far and in what direction the corresponding motor-driven wheel 130A has rotated.

Figure 4:
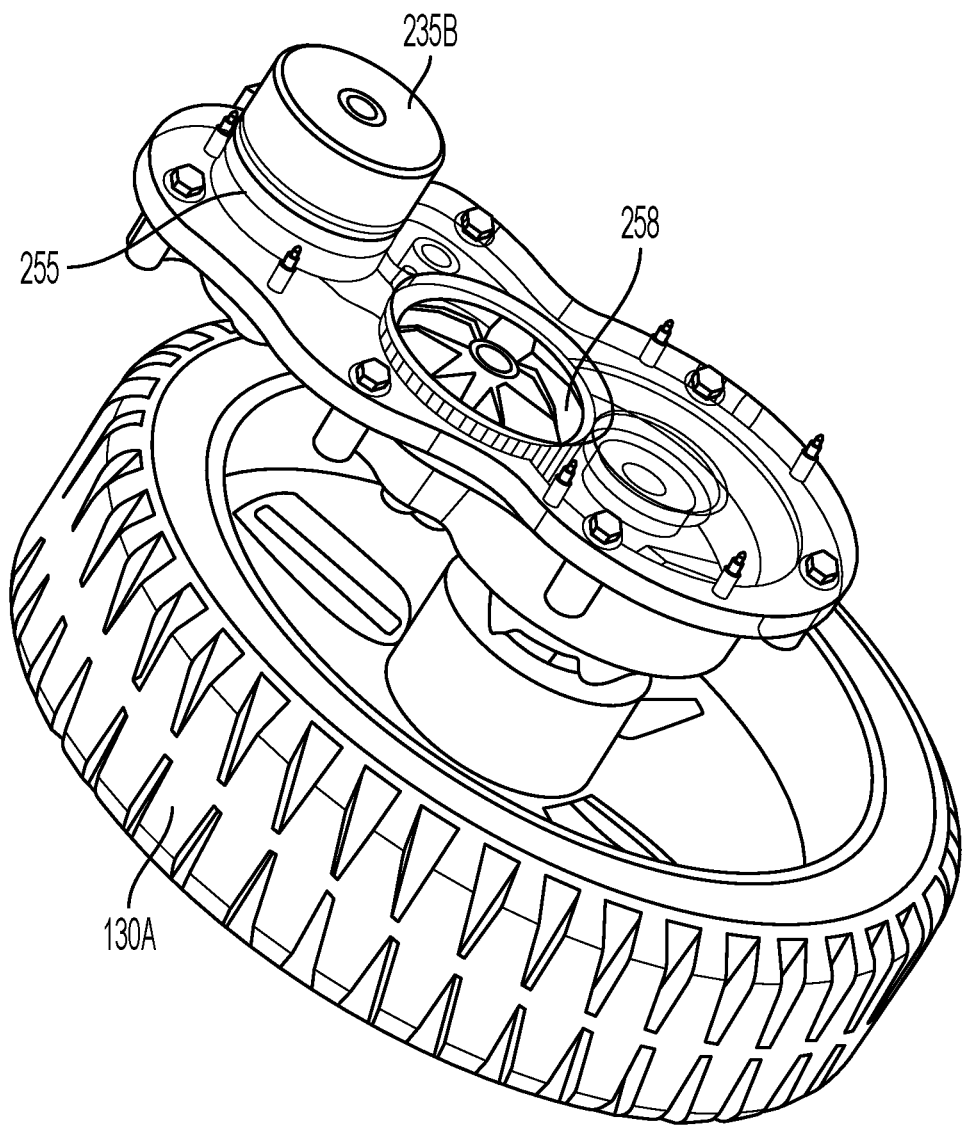
FIG. 4 is a perspective view of an odometry sensor and a motor-driven wheel of the robotic tool of FIG. 1A.

In some embodiments, the wheel motion sensor 260 may gather data indicative of when and how often the corresponding motor-driven wheel 130A is rotated. Measurement of each motor-driven wheel 130A may be taken directly (e.g., with a Hall effect magnet positioned on the motor-driven wheel 130A itself) or indirectly (e.g., with a Hall effect magnet or other magnetic component positioned on the wheel motors 235A, 235B). FIG. 4 illustrates an exemplary motor-driven wheel 130A. In the illustrated embodiment of FIG. 4, the odometry sensor 255 is positioned adjacent the wheel motor 235A upstream of a gear train 258 which couples the wheel motor 235B to the motor-driven wheel 130A. The odometry sensor 255 may also be configured to sense rotation of any component (e.g., a gear) of the gear train 258 and/or the motor-driven wheel 130A itself. Data from the odometry sensor 255 may be scaled according to gear ratios between the wheel motor 235A, the gear train 258, and the motor-driven wheel 130A to properly determine rotation of the motor-driven wheel 130A.

In some embodiments, the wheel motion sensor(s) 260 may be or include another type (or types) of sensors configured to gather data indicative of motion of the tool 105. For example, the wheel motion sensor(s) 260 may be laser or other types of tachometers. Such tachometer wheel motion sensor(s) may shine a light source (e.g., a LED light, laser beam or the like) against a tachometer surface of one of the motor-driven wheels 130A and/or the non-motor-driven wheels 130B, or any component of any gear train coupled thereto (e.g., the gear train 258), the light source may be reflected by the tachometer surface, and the tachometer may receive a signal indicating receipt of the light source. The tachometer may then determine a time difference in the amount of time for the light to be emitted and received, the time difference being indicative of how fast the motor-driven wheels 130A and/or the non-motor-driven wheels 130B is rotating.

During operation, the wheel motion sensor 260 tracks motion of the robotic tool 105 over time and outputs raw data regarding the detected motion to a processor (e.g., the first electronic processor 205, the second electronic processor 305, and/or the odometry processor 257). The processor, in turn, may then continuously or periodically determine an amount and direction of rotation for any given wheel 130 of the robotic tool 105. For example, one wheel motion sensor 260 may monitor the rotation of a left-side motor-driven wheel 130A, and another wheel motion sensor 260 may monitor the rotation of a right-side motor-driven wheel 130A. One exemplary wheel motion sensor 260 may detect angular rotation of (e.g., full rotations and/or partial rotations) of at least one of the wheels 130. With a fixed and known wheel size, and a sensed angular rotation of the wheel 130 with the wheel motion sensor 260, the electronic processor 205 can calculate the arc length of the wheel 130 (e.g., distance traveled over the support surface 50). In some embodiments, the wheel motion sensors 260 may be configured to intermittently and simultaneously gather data indicative of the position of the corresponding motor-driven wheel 130A. Data may be gathered by the wheel motion sensor 260 at any desired frequency (e.g., 100 Hz, 10 kHz, 1 MHz, etc.) according to the desired accuracy. The data may be collocated along with a timer and/or real-time clock.

In some embodiments, the odometry unit 250 includes an inertial measurement unit (IMU) 275. The IMU 275 gathers data indicative of the rotational orientation of the mower body (e.g., roll, pitch, yaw). The IMU 275 may include or entirely comprise, for example, an accelerometer, a magnetometer, a gyroscope, and the like. The IMU 275 may have a similar data collection frequency (e.g., 100 Hz, 10 kHz, 1 MHz, etc.) when compared to the wheel motion sensor 260 and/or other sensors of the odometry unit 250. The IMU 275 is configured to output a signal (or a plurality of signals, e.g., a first signal representing roll, a second signal representing pitch, a third signal representing yaw) representative of the rotational orientation of the robotic tool 105.

In some embodiments, the odometry unit 250 may include a radar sensor (e.g., a mmWave Radar sensor) 285. The radar sensor 285 may be configured to measure relative speed between the robotic tool 105 and an object in the environment of the robotic tool (e.g., the grass, ground, and/or soil of the operating area 605, a tree, a building, etc.). The radar sensor 285 is configured to output a signal (or a plurality of signals) representative of the speed of the robotic tool 105 relative to the object in the environment.

In some embodiments, the odometry unit 250 may include a global positioning system (GPS) receiver 270 configured to gather data indicative of the position thereof relative to a remote satellite. In other embodiments, the odometry unit 50 may include other types of sensors such as ultrasonic sensors 280, optical sensors 290 (e.g., laser sensors, infrared sensors), and/or the like. Such sensors may gather data indicative of the position of the robotic tool 105, and be configured to export the data for use by the odometry unit 250 to determine the position and orientation of the robotic tool 105 during use.

In still some embodiments, the odometry unit 250 may include any combination of the above-described odometry sensors 255 (e.g., the wheel motion sensor 260, the GPS Receiver 270, the IMU 275, the ultrasonic sensor 280, the radar sensor 285, and the optical sensor 290). The odometry unit 250 may be configured to receive and combine a plurality of inputs from any combination of the above-described odometry sensors 255. For example, the odometry unit 250 may include a wheel motion sensor 260, and an inertial measurement unit (i.e., IMU) 275. Data from wheel motion sensor (or sensors) 260 may be combined by the odometry unit 250 or by either the first electronic processor 205 or the second electronic processor 305 with data from the inertial measurement unit to generate a more accurate representation of the position of the robotic tool 105. This combination of data may account for, for example, sloped terrain including changes in elevation in an operating area 605 of the robotic tool 105. The combination of the data from the wheel motion sensor (or sensors) 260 and data from the inertial measurement unit 275 may otherwise add accuracy to the position of the robotic tool 105.

In still other embodiments, the odometry unit 250 may include a wheel motion sensor (or sensors) 260, and a radar (e.g., a mmWave) sensor 285. Data from the wheel motion sensor (or sensors) 260 may be combined by the odometry unit 250 or by either the first electronic processor 205 or the second electronic processor 305 with data from the radar sensor 285 to generate a more accurate representation of the position of the robotic tool 105. This combination of data may account for, for example, instances in which one or more of the motor-driven wheels 130A are rotated, but the robotic tool 105 does not in fact move in the operating area 605. This phenomenon may be described as "wheel slip" or "wheel slippage" of one or more of the motor-driven wheels 130A relative to the environment (e.g., the grass, ground, and/or soil of the operating area 605, a tree, a building, etc.).

In still other embodiments, the odometry unit 250 may include a wheel motion sensor (or sensors) 260, an inertial measurement unit 275, and a radar (e.g., a mmWave) sensor 285. Data from the wheel effect sensor (or sensors) 260 may be combined by the odometry unit 250, the first electronic processor 205, or the second electronic processor 305 with both data from the inertial measurement unit 275 and data from the radar sensor 285 to generate a more accurate representation of the position of the robotic tool 105. This combination of data may account for, for example, both sloped terrain including changes in elevation in the operating area 605 as well as any slipping motor-driven wheels 130A.

The robotic tool 105 also includes a timer and/or a real-time clock that may be implemented by the first electronic processor 205. The timer and/or real-time clock may be used in conjunction with the odometry unit 250 to collocate data gathered by at least one odometry sensor 255 and ultimately to determine a distance that the robotic tool 105 has traveled from any given start point 615 and/or the docking station 110. In some embodiments, the robotic tool 105 further comprises an uninterruptible power source, such as a button cell battery or battery pack, which may be charged by either the docking station 110 and/or the battery 245. The uninterruptible power source may provide power to the timer and/or the real-time clock to ensure accuracy of the timer and/or real-time clock in the event that the battery 245 is depleted. The first electronic processor 205 may use stored scheduling information and/or retrieved scheduling information to control times at which the robotic tool 105 is configured to operate, dock, etc. Such scheduling information may be stored in the first memory 210, the second memory 310, and/or the memory of the server 152.

Once a first set of data points regarding the movement of the tool 105 are gathered (e.g., corresponding to a given time), the corresponding data can be saved in any memory (e.g., by a memory of the odometry unit 250 (not shown), the first memory 210, the second memory 310, and/or a memory of the docking station 110 or the server 152) for future use. Once a second set of data points are gathered (e.g., corresponding to a later time), the second set of data points are compared (e.g., by the odometry processor 257 or the first electronic processor 205) to the second set of data points. In this comparison, for example, the odometry unit 250 may determine whether the left side motor-driven wheel 130A was rotated forwards an amount greater than the right side motor-driven wheel 130A. This is indicative of a right-hand turn of the robotic tool 105 as the robotic tool 105 is driven forwards. Other corresponding comparisons may be made for left-hand turns, straight travel, reverse travel, as well as left-handed and right-handed handed turning reverse travel. Further sets of data points are gathered at the desired data collection frequency (e.g., 100 Hz, 10 kHz, 1 MHz, etc.) to continuously monitor the position of the robotic tool 105. Data generated by the odometry unit 250 need not continuously be saved to memory. In some embodiments, only portions of data may be saved, and/or data may be saved and then subsequently erased (e.g., in a first in-first out basis, when it is no longer needed, or the like) to avoid requiring large amounts of memory.

Figure 3:
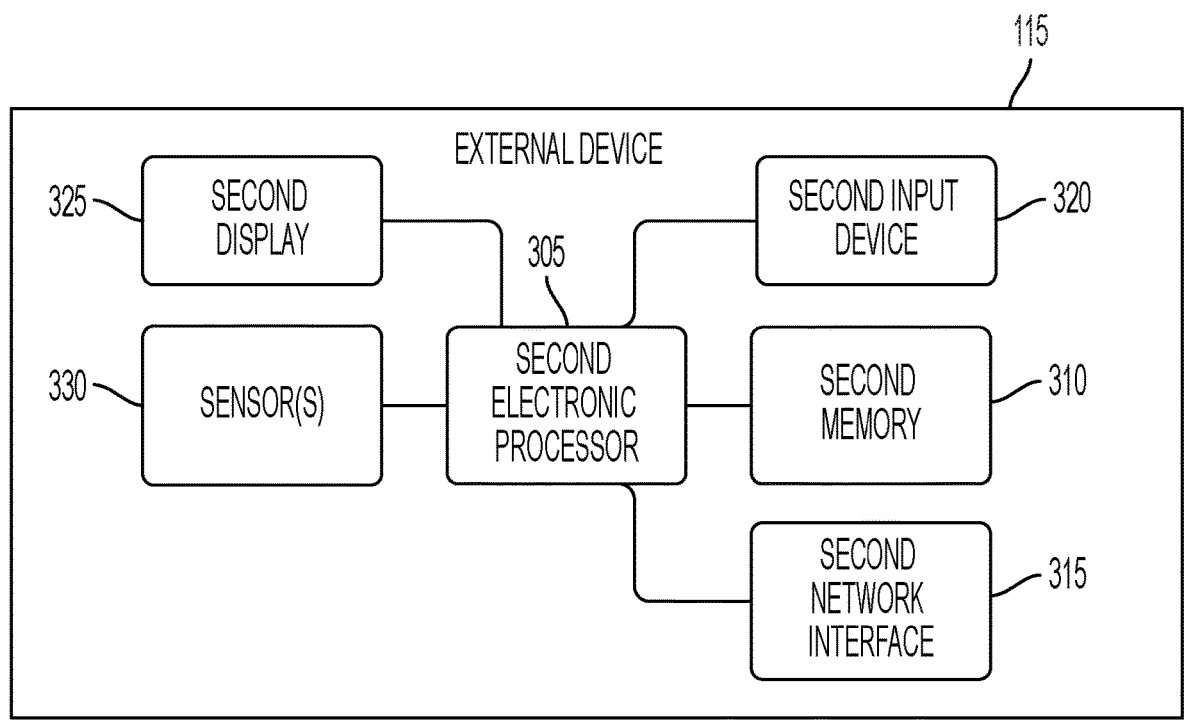
FIG. 3 is a block diagram of the external device of FIG. 1A according to some example embodiments.

FIG. 3 is a block diagram of the external device 115 according to some example embodiments. In the example shown, the external device 115 includes a second electronic processor 305 electrically connected to a second memory 310, a second network interface 315 (i.e., device network interface 315), a second user input device 320, and a second display 325. These components are similar to the like-named components of the robotic tool 105 explained above with respect to FIG. 2 and function in a similar manner as described above. For example, the second display 325 may also function as an input device (e.g., when the second display 325 is a touchscreen). In some embodiments, the second network interface 315 includes one or more transceivers for wirelessly communicating with the robotic tool 105 (e.g., a second RF transceiver configured to communicate via Bluetooth™, WiFi™, or the like). The second network interface 315 may include an additional transceiver for wirelessly communicating with the server 152 via, for example, cellular communication. The second network interface 315 may also include a second GPS receiver configured to receive a location signal from one or more satellites. In some embodiments, at least some of the transceivers and/or receivers of the external device 115 may be combined or share some elements (e.g., an antenna and/or other hardware). In some embodiments, the second electronic processor 305 sends data to and receives data from the robotic tool 105 and/or other devices of the communication system 100 via the second network interface 315.

The external device 115 may be, for example, a smart phone (as illustrated), a laptop computer, a tablet computer, a personal digital assistant (PDA), a wireless communication router that allows another external device 115 that is located remotely from the robotic tool 105 to communicate with the robotic tool 105, or another electronic device capable of communicating with the robotic tool 105. The external device 115 may generate a user interface on a display (described below) and allows a user to access and interact with robotic mower information in real time. The external device 115 may receive user inputs to determine operational parameters/instructions for the robotic tool 105, enable or disable features of the robotic tool 105, and the like. In some embodiments, the communication between the external device 115 and the robotic tool 105 may be wired (e.g., via a Universal Serial Bus (USB) cord configured to connect to respective USB ports of the external device 115 and the robotic tool 105). Broadly speaking, the user can interact with the external device 115 to control operation and/or future operation of the robotic tool 105.

In some embodiments, the external device 115 includes fewer or additional components in configurations different from that illustrated in FIG. 3. For example, the external device 115 may include a battery, a GPS receiver, or the like. In some embodiments, the external device 115 performs functionality other than the functionality described below.

In some embodiments, the server 152 includes similar elements as at least some of the elements described above with respect to the devices 105, 115 that function in a similar manner. For example, the server 152 may include an electronic processor, a memory, and a network interface, among other elements.

Figure 8:
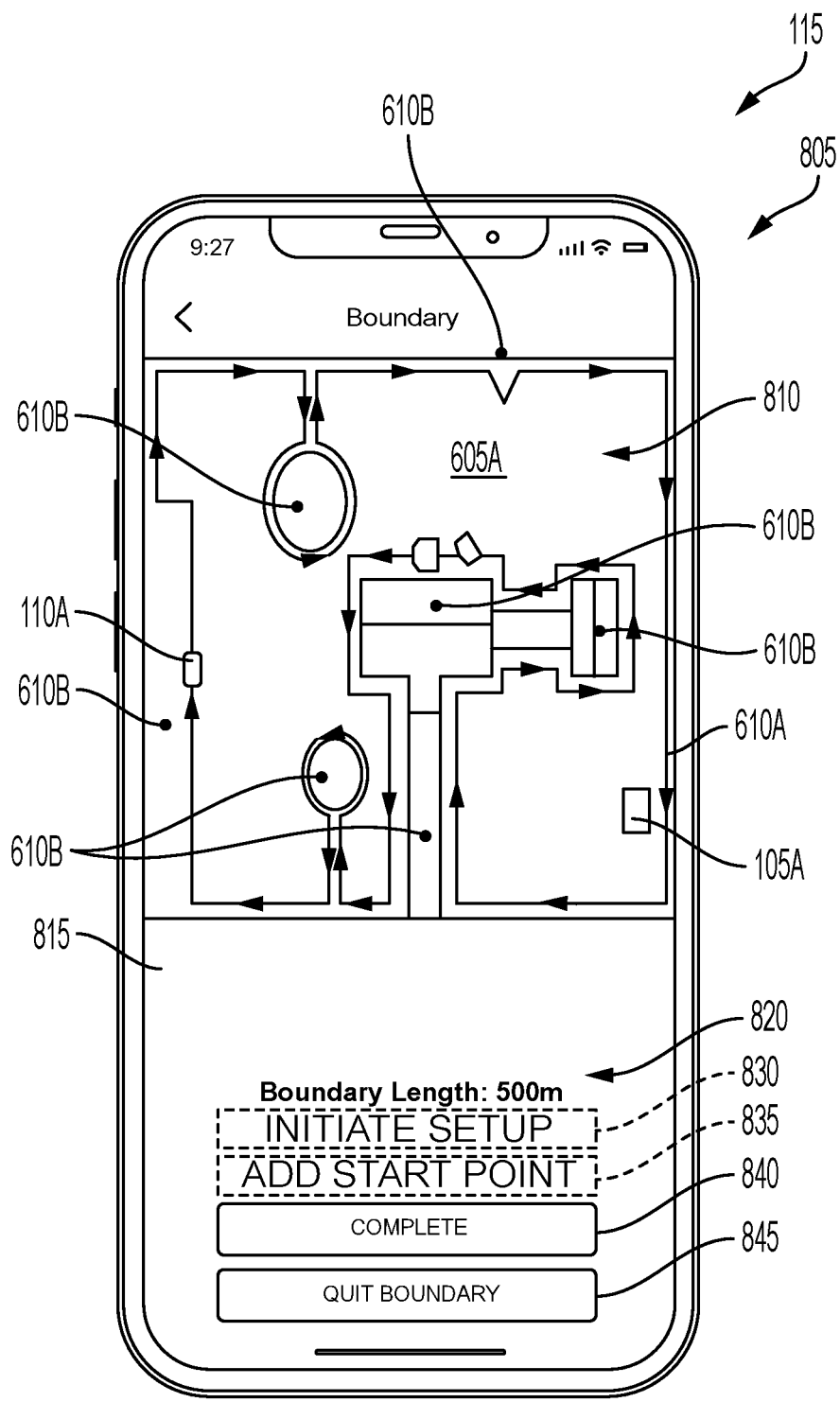
FIG. 8 illustrates a screenshot of an example boundary screen/graphical user interface that may be displayed on a second display of the external device of FIG. 1A according to some embodiments.

FIG. 8 illustrates one exemplary embodiment of a boundary screen 805 to be displayed on the second display 325 of the external device 115. The boundary screen 805 includes a map portion 810 and an interaction-display portion 815. The map portion 810 of the boundary screen 805 may be configured to overlay a series of indicia and/or other indicators onto a map of the operation area 605 to provide the user a visual representation of the current operational status of the system 100. In other embodiments, the boundary screen 805 may illustrate a generic map portion 810 which does not exactly replicate the operation area 605. In other words, the boundary screen 805 may not replicate the landscape of the operation area 605 as calculated by the odometry unit 250 but rather may include some pre-determined boundary outline (e.g., a generic house with driveway surrounded by a polygonal boundary). In some embodiments, a two-dimensional map of the operation area 605 may be provided, such as the map portion 810 illustrated in FIG. 8. This map portion 810 may or may not be representative of the actual dimensions of the operation area 605 and/or the boundary 610. In other embodiments, a one-dimensional line segment (e.g., the line segments 940, 960, described below with regard to FIG. 9A) may represent the perimeter 610. In some embodiments, the underlying map may include, but is not limited to, a user generated image of the desired region, a satellite image of the desired region, a computer-generated image of the desired area, and the like. More specifically, the illustrated map portion 810 includes a dock indicator 110A configured to represent the relative location of the docking station 110 within the operation area 605, a mower indicator 105A configured to represent the relative location of the robotic tool 105 within the operation area 605, an operating area map 605A configured to depict the general layout and shape of the operating area 605, and a perimeter indicator 610A configured to display the location of the perimeter 620 (e.g., the boundary wire 608) with respect to the operating area 605.

With continued reference to FIG. 8, obstacle indicators 610B may be provided on the map portion 810. As shown in FIG. 8, the obstacle indicators 610B may be, for example, sized to approximate the corresponding size of the obstacle it is configured to represent (e.g., the outer size and shape thereof) within the operating area 605. The obstacle indicators 610B may be positioned and/or sized to represent, for example, a building, tree, driveway, planter, garden, and other non-operating areas of the robotic tool 105 (e.g., non-mowable obstacles). As illustrated in FIG. 8, the perimeter indicator 610A may envelope but not pass through the obstacle indicators 610B. This represents actual operation of the robotic tool 105 avoiding the corresponding obstacle (building, tree, driveway, other non-operating area) during use. The obstacle indicators 610B may be adjustable in color and/or shape to correspond to the type of obstacle that they represent (e.g., a driveway may be colored grey, a tree may be colored a shade of green different than another shade of green of the operating area map 605A which represents the operating area 605, etc.). In some embodiments, the boundary screen 805 may update (e.g., automatically, contiguously, intermittently, etc.) the position of the mower indicator 105A with the sensed position (via the odometry unit 250) of the robotic tool 105 in the operating area 605. In other embodiments, the boundary screen 805 may not update the position of the mower indicator 105A with the sensed position of the robotic tool 105.

In some embodiments, the boundary screen 805 may be an accurate scaled representation of the size and shape of the operating area 605 and perimeter 610 with each indicator located in its real-time position. However, in other embodiments the boundary screen 805 may simply be display a generic representation of an operating area 605 and perimeter 610 with the indicators positioned in general positions. In some embodiments, the user may be able to zoom in, zoom out, and/or select the various indicia being displayed.

The interaction-display portion 815 of the boundary screen 805 may include a series of buttons and/or indicators through which the user may interact with the system 100 during use. In the illustrated embodiment, the interaction-display portion 815 includes a boundary length indicator 820, an "initiate setup" button 830, an "add start point" button 835, a "complete" button 840, and a "quit boundary" button 845. In other embodiments more or fewer buttons and/or indicators may be present. In other embodiments, the text on the buttons 830-845 may differ from the illustrated text. For example, the "add start point" button 835 may be a "modify start point" button 835.

The "initiate setup" button 830 is configured to instruct the system 100 (e.g., the external device 115 and tool 105) to initiate a setup sequence (described below). The "add start point" button 835 (and/or "modify start point" button) is configured to command the system 100 to add (and/or modify) a start point 615 to the existing list of start points. For example, in some embodiments selecting the "add start point" button 835 may cause the system 100 to communicate (e.g., retrieve), via the odometry unit 250, data relating to the position of the robotic tool 105, and to add a start point 615 at the current location of the tool 105 relative to the perimeter 620. However, in other embodiments selecting the "add start point" button 835 may cause a start point 615 to be added to a pre-determined position along the perimeter 810 whereby the user can later adjust the location of the start point 615 to the desired position.

Once added, the button 835 may transition to the "modify start point button" while the robotic tool 105 is adjacent the corresponding start point 615. When the "modify start point" button 835 is depressed, the user may be prompted to input a desired adjustment (e.g., +/−0.1 meter along the perimeter 610) and/or revised position (e.g., as a percentage of overall length and/or a desired position (e.g., 10 meters] relative to the docking station 110) for the start point 615. Once the robotic tool 105 moves away from the start point 615, the button 835 may transition back to the "add start point button" automatically. Additionally or alternatively, the "modify start point" button 835 may permit the user to delete any given start point. The "complete" button 840 may be configured to save the positions of any start points 615 present at that time. The "complete" button 840 may also be configured to end or conclude the initialization process (described below). Finally, the "quit boundary" button 845 is configured to exit or otherwise close the program.

In the illustrated boundary screen 805, the interaction-display portion 815 is positioned below the map portion 810. This may be reversed. Additionally, the various indicators and buttons 820-845 within the interaction-display portion 815 may be rearranged to any desired configuration relative to one another.

FIGS. 9A-9D illustrate screenshots of example screens/graphical user interfaces that may be displayed on the second display 325 of the external device 115. FIGS. 9A-9D illustrate the start point screen 905 in different situations that are explained below. In some embodiments, the start point screen 905 includes information related to the overall length of the perimeter 610, and the position of the start points 615A-615C with respect to the perimeter 610. As indicated previously herein, at least some of the information related to the robotic tool 105 that is displayed on the start point screen 905 may be wirelessly received by the external device 115 from the robotic tool 105.

Figure 9A:
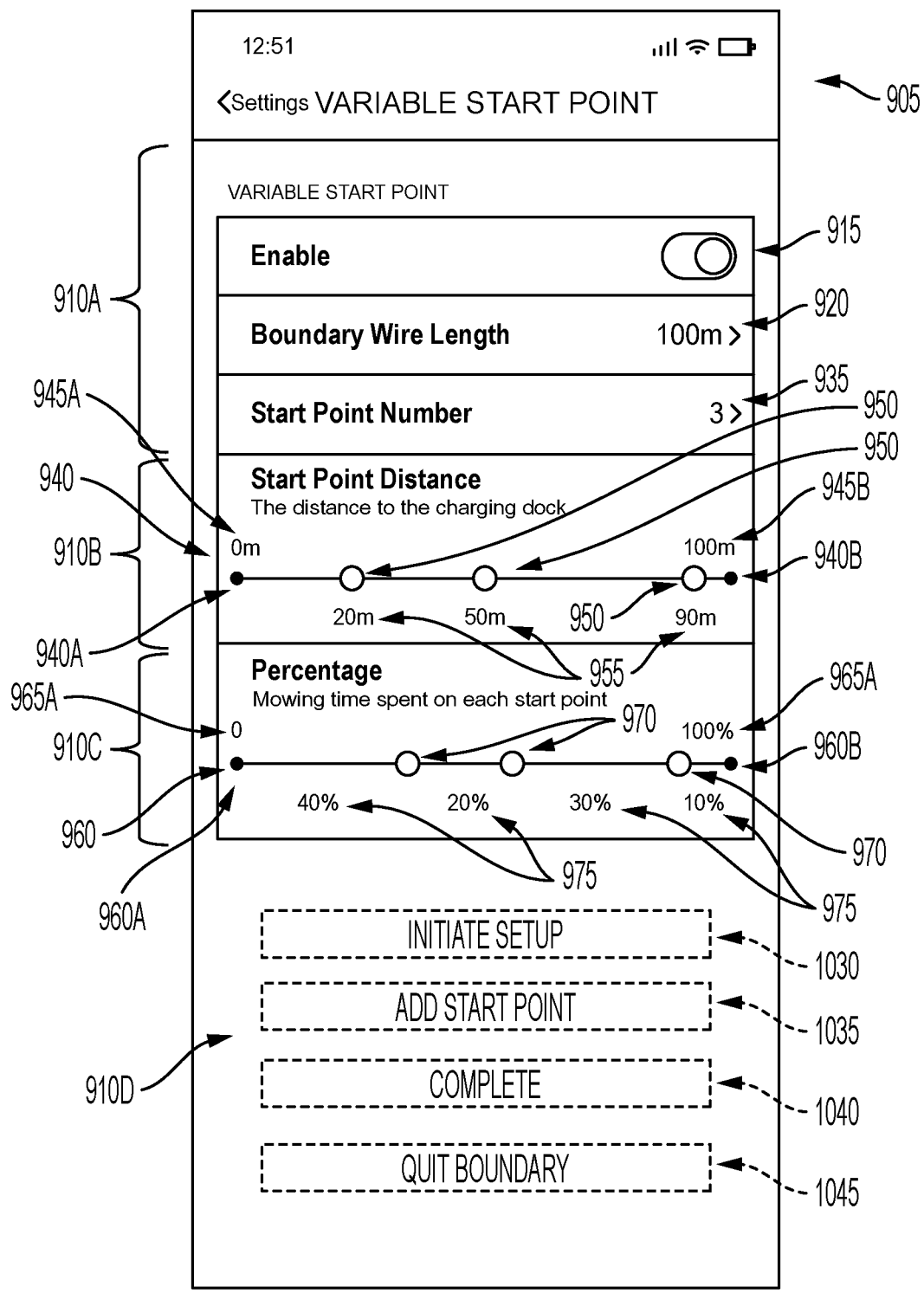
FIGS. 9A-9E illustrate screenshots of exemplary start point screens/graphical user interfaces that may be displayed on the second display of the external device of FIG. 1A according to some example embodiments.
Figure 9B:
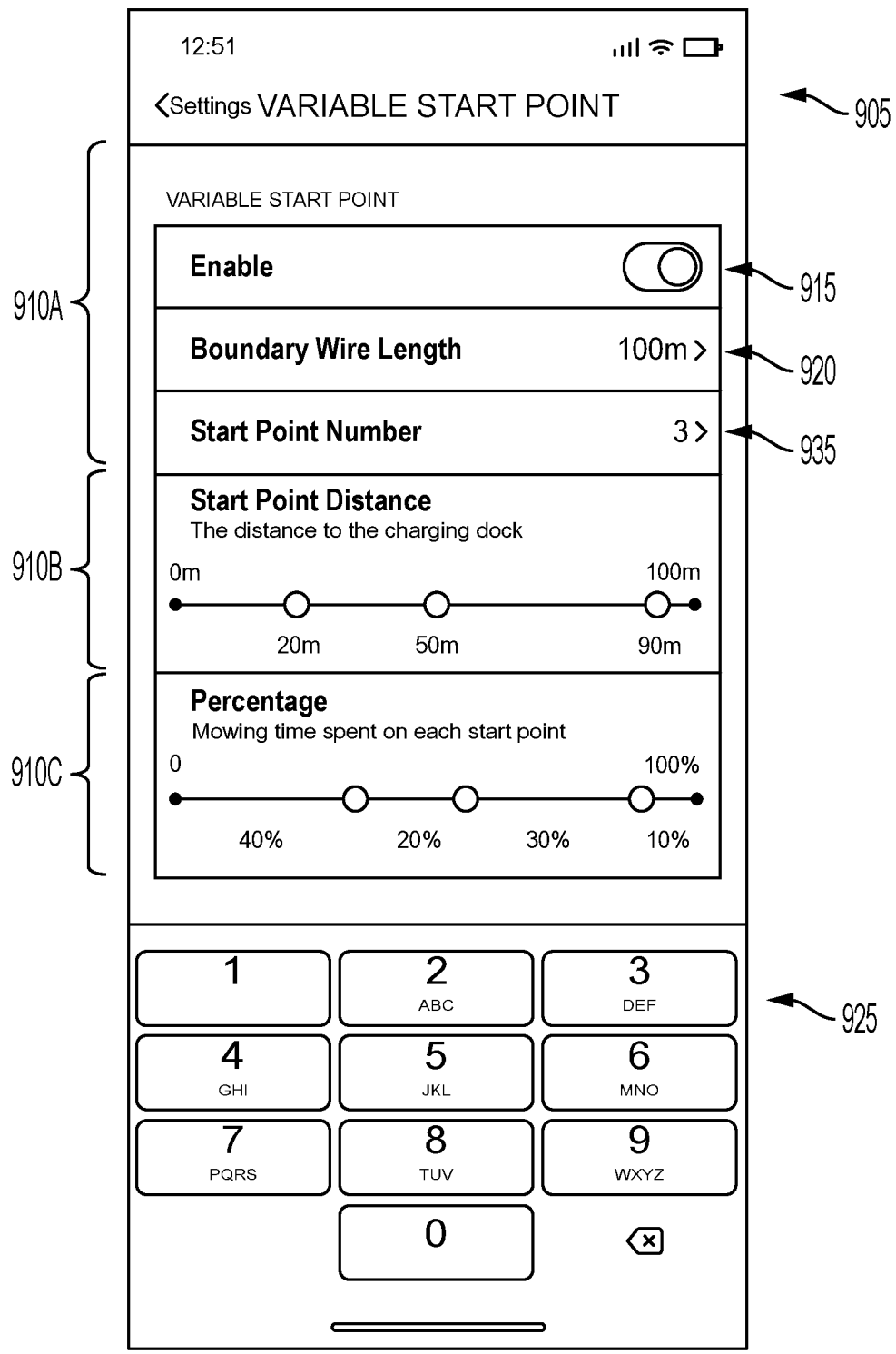
Figure 9C:
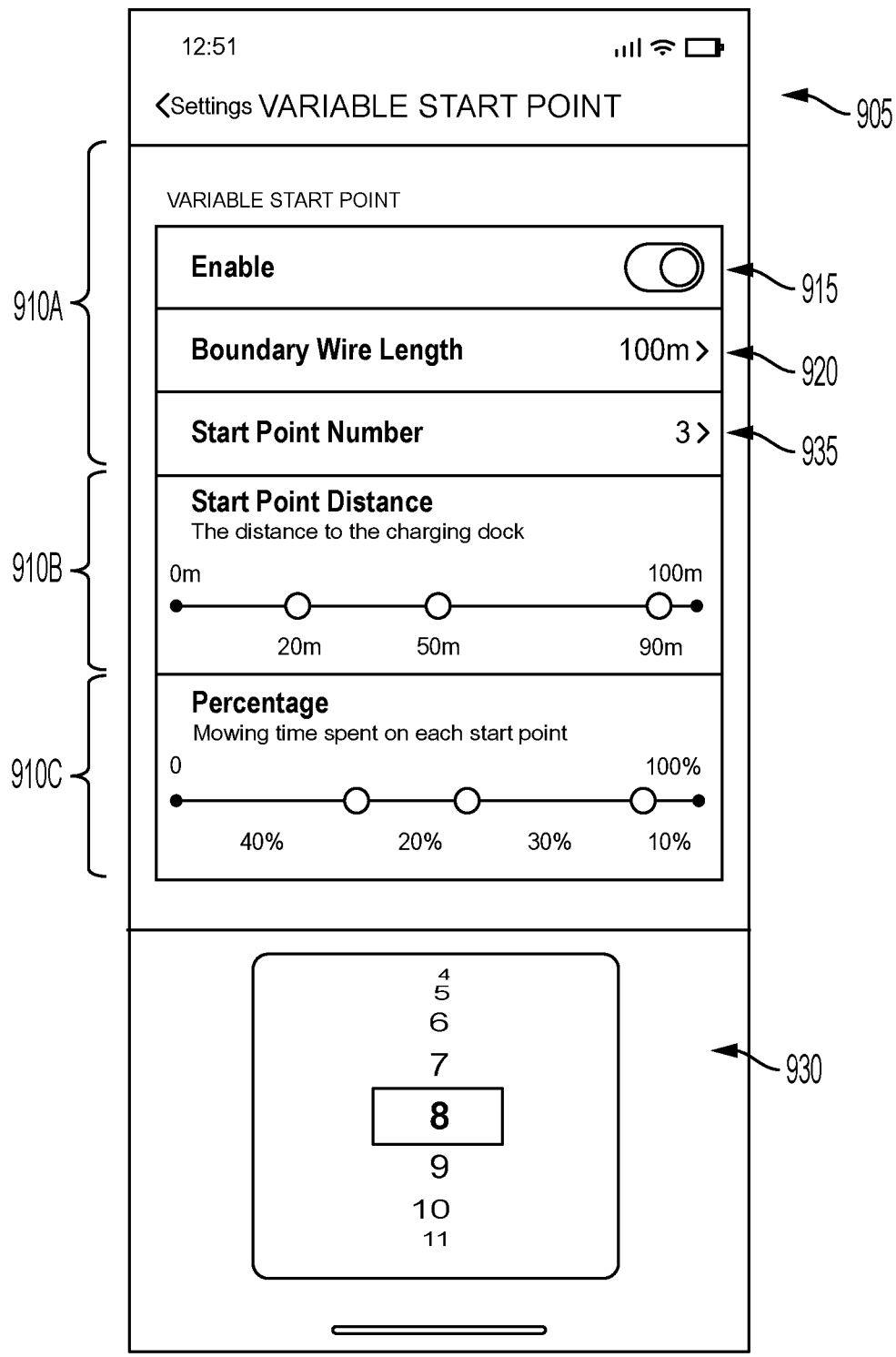

As shown in FIG. 9A, the start point screen 905 includes a plurality of display areas 910A-910D. A first display area 910A thereof includes a slider or toggle 915 configured to enable and/or disable the variable start point feature of the robotic tool 105. When the slider 915 is in the enabled position (see FIG. 9A) the display areas 910A-910D are enabled and free to be manipulated by the user (e.g., via the touch screen of the external device 115). The system is also configured such that the tool 105 will operate using the variable start point capability as prescribed by the display areas 910A-910D (described below).

Figure 9D:
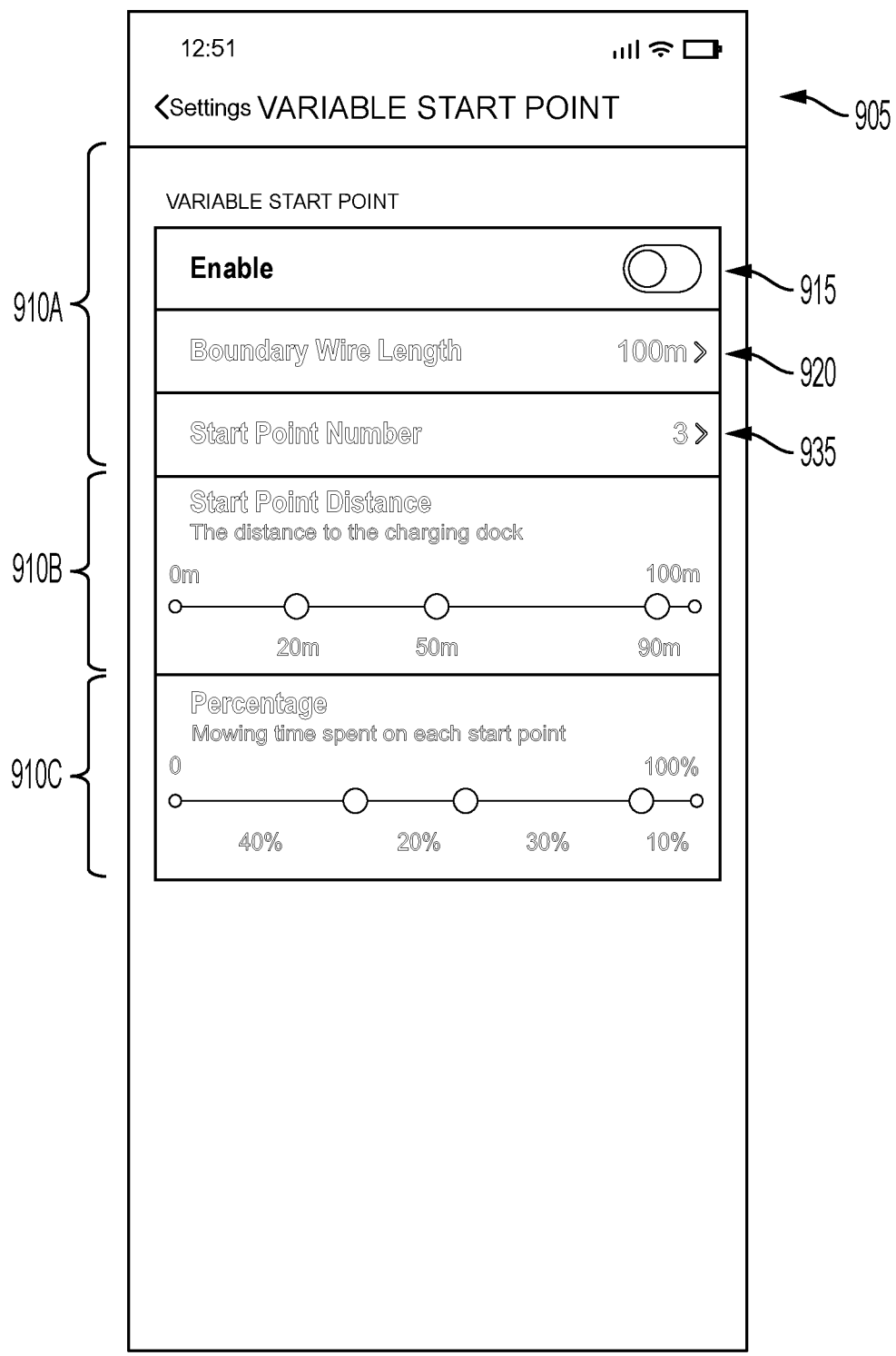

In contrast, when the slider 915 in the disabled position (see FIG. 9D), the interaction portions 910A-910D may be disabled and no longer accessible by the user. As shown in FIG. 9D, the start point screen 905 visually represents a disabled slider 915 by displaying the interaction portions 910A-910D in light grey tones. In other embodiments, the start point screen 905 may go blank or remove the relevant information when the slider 915 is disabled. Accordingly, the system 100 is configured such that the robotic tool 105 will not start from any set points saved on the first memory 210, the second memory 310, the memory of the server 152, or the memory of the docking station 110 when the variable start point slide 915 is in the disabled position. When the variable start point slide 915 is in the disabled position, in some embodiments, the robotic tool 105 may simply begin operation from the docking station 110. Similarly, when no start points 615A-615C have been generated (e.g., saved), the robotic tool 105 may simply begin operation from the docking station 110.

The first display area 910A of the start point screen 905 further includes an indicator 920 which displays the overall linear length of the perimeter 610. More specifically, the indicator 920 includes text indicative of the length of the perimeter 610 (e.g., "100 m", "100 meters", or the like). In the illustrated embodiment, an arrow or other indicia positioned adjacent to the indicator 920 signals to the user that the length of the perimeter 610 may be adjusted by interacting (e.g., tapping, clicking) with the indicator 920 via the second input device 320 (e.g., a touch screen, mouse, etc.). Upon interacting with the indicator 920, a keypad 925 (FIG. 9B) and/or a rotary selector 930 (FIG. 9C) may populate on the start point screen 905. The keypad 925 and the rotary selector 930 may each present a plurality of options for the user to adjust characteristics of the system 100. Other types of graphical user interfaces for gathering user input(s) may be displayed on the start point screen 905, such as but not limited to drop down menus, a plurality of checkboxes, radio buttons, toggle switches, and the like.

The user may interact with the second input device 320 (e.g., the touch screen, mouse) to input a known length of the perimeter 610 via the keypad 925 or the rotary selector 930. In some embodiments, a boundary length may be calculated automatically as part of the initial setup state (described below). The second input device 320 may be used in conjunction with the indicator 920 to adjust the length of the perimeter 610 after having been calculated by the odometry unit 250.

If the boundary length input by the user via the second input device 320 and in conjunction with the indicator 920 is different than the calculated perimeter length of the odometry unit 250, the user may be prompted by the device to confirm that the perimeter length should be adjusted and/or be prompted to return the robotic tool 105 to the docking station 110 to run the initial setup state again (described above). More specifically, if the perimeter length input by the user via the second input device 320 is less than the calculated boundary length of the odometry unit 250, the boundary length may be updated to the boundary length input by the user via the second input device 320. If any start points 615 must be removed to accommodate the newly entered boundary length (e.g., are positioned outside the newly established range), the user may be informed of which start point 615 may be deleted by the shortening of the boundary length. The user may then either select that the effected start point 615 can be deleted and/or to locate the start point 615 at the extreme end of the perimeter 610 (e.g., at the docking station 110). The user can then adjust the position of the effected start point 615 by moving the start point indicator 950 towards the first end 940A a desired amount such that the start point 615C is positioned on the perimeter 610 and not coincident with the docking station 110.

Once the perimeter length is input via the second input device 320, the perimeter length may be saved in the first memory 210, the second memory 310, the server 152, and/or the docking station 110. Any existing perimeter length data may be overwritten as needed. The updated perimeter length may then be displayed on the start point screen 905 via the indicator 920.

The first display area 910A further includes a start point number indicator 935 indicative of a total number of start points 615 on the perimeter 610. In the illustrated embodiment, the start point number indicator 935 may include text indicative of the number of start points 615 currently saved in memory (e.g., "3", or the like). An arrow or other indicia may be positioned adjacent to the start point number indicator 935 to indicate to the user that the total number of start points 615 may be adjusted by interacting (e.g., tapping, clicking) with the start point number indicator 935 via the second input device 320 (e.g., a touch screen, mouse). In some embodiments, the user may interact with the second input device 320 (e.g., the touch screen, mouse) to input a desired number of start points 615 via the keypad 925 or the rotary selector 930. In such embodiments, any configuration of start points 615 may be suitable. For example, when the boundary wire length is 100 meters, and three start points 615A-C are selected, the default setting may be to space each start point 615A-C evenly over the entire length of the perimeter docking station 110 (e.g., at 25 m, 50 m, and 75 m from the docking station 110). In other embodiments, the start points may be spaced randomly over the perimeter length. In still other embodiments, the start point number indicator 935 may be automatically populated during the setup and initialization processes (described below).

By interacting (e.g., tapping, clicking) with the start point number indicator 935 via the second input device 320 (e.g., a touch screen, mouse), the total number of start points 615 may be increased or decreased according to a user's desired number of start points 615A-615C. When the total number of start points 615 is increased, the user may be prompted to add the additional start points 615 to a desired position along the perimeter 610. In other embodiments, the additional start point 615 may be added to a pre-determined default location along the perimeter 610 (e.g., at the docking station 110, halfway along the perimeter 610, at another position along the boundary, and the like). In other embodiments, the additional start point may be positioned at a preset position relative to other existing start points (e.g., halfway between a start point and either another start point and the dock). In the case that the total number of start points 615 is decreased, the user may be prompted to select one or more start points 615 to be removed/deleted. The remaining start points can be validated and/or adjusted as the user sees fit.

The second display area 910B relates to the position of the start points 625A-C of the robotic tool 105 with respect to their position along the length of the perimeter 610. More specifically, the second display area 910B provides a more visual representation of the location of the start points 615A-C along the length of the perimeter 610. In the illustrated embodiment, the second display area 910B includes a line segment 940 having a first end 940A, an opposite second end 940B, a first end indicia 945A positioned adjacent the first end 940A, and a second indica 945B positioned adjacent the second end 940B. In other embodiments, the line segment 940 may otherwise represent the perimeter 610 in another form. For example, the line segment 940 may be replaced by an enclosed box (e.g., rectangle), an open box (e.g., an open line segment), an actual map (e.g., the map portion 810), or the like.

The first end indicia 945A may indicate a relative position of the first end 945A of the line segment 940 relative to the docking station 110. Typically, the first end indicia 945A will display "0", "0 m", "0 meters", or the like, as the docking station 110 may function as a home position of the tool 105. In contrast, the second end indicator 945B may indicate a current and/or full length of the perimeter 610. The second end indicator 945B typically will match the text of the indicator 920.

Figure 9E:
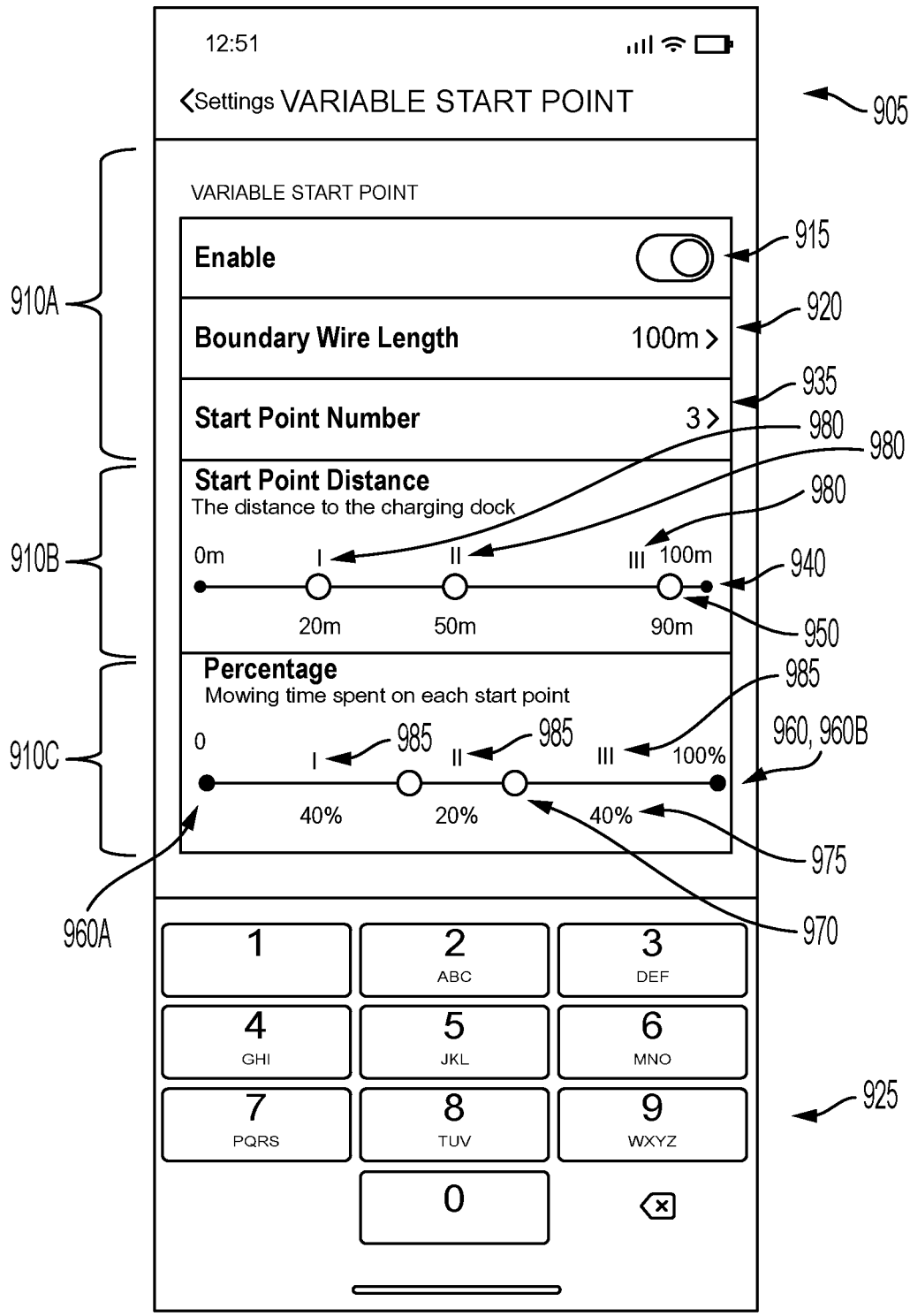

As shown in FIG. 9A, a plurality of start point indicators 950 are positioned along the line segment 940. In the illustrated embodiment, each start point indicator 950 includes a symbol or indicia (e.g., a circle) positioned on the line segment 940 in a position generally corresponding to the position of the represented start point 615A-C. While the illustrated indicators are circular, other types of start point indicators 950 may also be used (e.g., arrow, star, polygonal, or otherwise shaped). In some embodiments, each indicator 950 may include a label or have a unique shape to allow the user to more easily identify what start point 615A-C each indicator 950 represents (see label 984 of FIG. 9E). In the illustrated embodiment, the line segment 940 and the start point indicators 950 are differently colored to improve contrast. In other embodiments, the line segment 940 and the start point indicators 950 may be the same color. Furthermore, each start point indicator 950 is proportionally placed between the first end 940A and the second end 940B of the line segment 940 an amount corresponding to a length along the perimeter 610 between the docking station 110 and the corresponding start point 615A-C. For example, the length of the gap between the left-most start point indicator 950 and the first end 950A of the line segment 940 is 20% of the overall length of the line segment 940 (e.g., the distance between the first end 950A and the second end 950B) because the left-most start point indicator 950 is representative of the first start point 615A which, in turn, is positioned 20 meters from the docking station 110 where the overall length of the perimeter 610 is 100 meters. In other words, the start point indicator 950 provides accurate, to-scale visual representation of the position of each start point 615A-615C with respect to the overall length of the perimeter 610. In embodiments where one of the start points 615 are coincident with the docking station 110, the start point 615 may be represented by positioning the corresponding start point indicator 950 at one of the first end 940A and/or the second end 940B of the line segment 940.

In embodiments where the perimeter 610 is represented by a form other than the line (e.g., as an enclosed box, an open box, an actual map, etc.), the start point indicators 950 may be positioned adjacent to or along the other form in correspondence to the proportionality of the start points 615A-615C relative to the docking station 110.

With continued reference to FIG. 9A, a plurality of start point indicia or labels 955 are positioned below the line segment 940 and adjacent to a corresponding start point indicator 950. The illustrated start point indicia 955 include text (e.g., "20 m", "50 m", "90 m") indicative of a length between the docking station 110 and the start point 615A-C being represented by that particular indicia 950.

As will be described in greater detail below, the second display area 910B is also configured to allow the user to independently adjust (i.e., edit) and/or modify the relative locations of each of the start point indicators 950, and as a result, the physical location of the start points 615A-615C along the length of the perimeter 610. More specifically, the user is able to independently adjust the relative location of any one of the start points 615A-615C by selecting and dragging the relevant indicator 950 to the desired location. For example, if the user wishes to move the first start point 615A so that it is 10 m from the home position, the user can select and drag the left-most indicator 950 toward the first end 940A until it is positioned at 10% of the overall length of the line segment 940 (e.g., at the 10 m position). In other embodiments, the user may independently modify the relative locations of each start point 615A-C by selecting the indicator 650 corresponding to the start point 615A-C the user wishes to move. Once selected, the display may provide a prompt to allow the user to enter the exact location (in meters, percentage, and the like) where the start point 615 should be located. The display will then automatically move the indicator 650 to represent the new location. In still other embodiments, both the "drag and drop" and "prompt" concepts may be used.

In embodiments where the perimeter 610 is represented by a form other than the line (e.g., as an enclosed box, an open box, an actual map, etc.), the start point indicators 950 may be adjusted in a similar manner (e.g., by dragging the start point indicator 950 along the actual map, etc., or by entering an exact location where the start point 615 should be located) to the start point indicators 950 positioned along the line segment 940.

The third display area 910C relates to the relative frequency at which each of the start points 615A-615C of the robotic tool 105 are utilized during operation. More specifically, the third display area 910C provides a graphical representation of the relative frequency at which the robotic tool 105 begins a session from each start point (discussed below). In the illustrated embodiment, the third display area 910C includes a line segment 960 having a first end 960A, and a second end 960B opposite the first end 960A. The first end indicia 965A is positioned adjacent the first end 960A and labels the beginning of the line segment 960. In the illustrated embodiment, the first end indicia 945A displays "0". However, in other embodiments, the first end indicia 945A may display "0%" or the like. The second end indicator 945B is positioned adjacent the second end 960B and labels the end of the line segment 960. In the illustrated embodiment, the second end indicia 965B displays "100%".

However, in other embodiments, the second end indicia 965B may display "100" or the like.

As shown in FIG. 9A, the third display area 910C also includes a plurality of frequency adjustment indicators 970 positioned along the line segment 960 that, together, are configured to generally represent the frequency at which the tool 105 will begin a session from a particular start point 615A-615C. In other embodiments, the line segment 960 may otherwise represent an operating frequency of the robotic tool 105 at a desired start point 615A-615B. For example, the line segment 960 may be replaced by a pie chart, a doughnut chart, a tree map, a two-dimensional segmented column chart, and the like. More specifically, the third display area 910C is configured so that the size of the gap between the end indicia 960A, B and/or the indicators 970 themselves are scaled to represent the frequency each start point 615A-C is utilized. More specifically, the size of the left-most gap (e.g., between the first end indicia 960A the left-most indicator 970) generally corresponds to frequency at which the robotic tool 105 will depart from the first start point 615A positioned closest to the home position; the size of the left-center gap (e.g., between the left-most indicator 970 and the central indicator 970) generally corresponds to the frequency at which the tool 105 will depart from the second start point 615B positioned second closest to the home position; the size of the right-center gap (e.g., between the central indicator 970 and the right-most indicator 970) generally corresponds to the frequency at which the tool 105 will depart from the final start point 615C positioned furthest from the home position; and finally the right-most gap (e.g., between the right-most indicator 970 and the second end indicia 960B) generally corresponds to the frequency at which the tool 105 will depart directly from the docking station 110. In embodiments where the user does not want the docking station 110 to be considered a start point 615, the third display area 910C may include one less indicator 970 than the number of start points 615A-C so the number of gaps present matches the number of start points 615A-C (see FIG. 9E).

In embodiments where the line segment 960 is formed as a pie chart, the frequency indicators 970 may be represented as lines between adjacent pie segments. Other similar frequency indicators 970 are possible.

In the illustrated embodiment, the frequency adjustment indicators 970 are circularly shaped, and are positioned on the line segment 940. However, other types of frequency adjustment indicators 970 (e.g., arrow, star, polygonal, or otherwise shaped) may otherwise be positioned along, adjacent to, or otherwise indicating (e.g., via a color or shape thereof) a position along the line segment 960. In some embodiments, each indicator may include a label or have a unique shape to allow the user to more easily identify what start point 615A-C corresponds with each gap (see labels 985 of FIG. 9E). In the illustrated embodiment, the line segment 960 and the frequency adjustment indicators 970 are differently colored. In other embodiments, the line segment 960 and the frequency adjustment indicators 970 may be the same color.

With continued reference to FIG. 9A, a plurality of frequency indicia 975 are positioned below the line segment 940 and between two corresponding frequency adjustment indicators 970 and/or end indica 960A, 960B. In the illustrated embodiment, each of the plurality of frequency indicia 975 are centered between two adjacent corresponding frequency adjustment indicators 970. In the illustrated embodiment, the frequency indicia 975 include text (e.g., "40%", "20%", "30%", 10%) indicative of a frequency with which the robotic tool 105 may begin mowing (e.g., begin a session) from a corresponding start point.

As will be described in greater detail below, the third display area 910C is also configured to allow the user to independently adjust and/or modify the frequency at which the tool 105 will depart any given start point 615A-C and/or the docking station 110. More specifically, the user is able to independently adjust the relative frequency for any one of the start points 615A-615C by selecting and dragging the relevant indicator 970 to the desired location. For example, if the user wishes to decrease the frequency of the first start point 615A, the user can select and drag the left-most indicator 970 toward the first end 960A until it is positioned closer thereto. By doing so, the user is decreasing the size of the left-most gap while also simultaneously increasing the size of the left-center gap. As such, each percentage point reduced from the first start point 615A will be added to the second start point 615B. As such, the third display area 910C automatically maintains the requisite 100% total frequency for all of the start points 615A-C and the docking station 110.

In embodiments where the line segment 960 is formed as a pie chart, the frequency indicators 970 adjusted between adjacent pie segments in manners similar to the above-described adjustment of the frequency indicators 970 (e.g., by dragging a line between adjacent pie segments, entering a desired start point frequency percentage). Other similar means to adjust the frequency indicators 970 are possible.

In another example, if the user would like to stop having the tool 105 depart directly from the docking station 110, the user can select and drag the right-most indicator 970 to the right until it is coincident with the second end 960B. By doing so, the right-most gap is eliminated setting the frequency value for the docking station 110 to 0%, at the same time, the user also increases the size of the right-center gap such that the third start point 615C will now have a frequency of 40% (see FIG. 9E).

The start point screen 905 further includes a fourth display area 910D. The fourth display area 910D includes a plurality of buttons and/or indicators for the user to interact with. More specifically, the fourth display area 910D includes an "initiate setup" button 1030, an "add start point" button 1035, a "complete" button 1040, and a "quit boundary" button 1045. These buttons are similar to the above-described buttons of the boundary screen 805 and therefore will not be described in detail herein. Additional or fewer user actuatable buttons may be provided on the start point screen 905.

In the illustrated embodiment, the first display area 910A, second display area 910B, the third display area 910C, and the fourth display area 910D are aligned with one another in a vertical direction (as viewed in FIG. 9A) on the second display 325. In other embodiments, only some of the display areas 910A-910D may be aligned with one another in the vertical direction of the second display 325. For example, the second display area 910B and the fourth display area 910D may be aligned in the vertical direction, while the third and fourth display areas 910A, 910D are otherwise positioned on the second display 325 or missing from the display 325. In the illustrated embodiment, the first display area 910A is at a top of the second display 325 as viewed in FIG. 9A, and the remaining display areas 910B-910D are provided below the first display area 910A in a sequential manner. The order of the display areas 910A-910D in the height direction may differ. Furthermore, the orientation and visual appearance of the individual line segments 940, 960 may also differ in other embodiments. For example, while the illustrated line segments 940, 960 are oriented horizontally, it is understood that in other embodiments different forms of visual user interface may be used such as, but not limited to, vertical line segments, vertical and/or horizontal bars, a number of user-manipulatable dials, text fields, and the like.

During operation, the robotic tool 105 may be in any one of a plurality of states at any given time. In some embodiments, the plurality of states include, but are not limited to an initial setup state, a modification state (i.e. to add, delete, or modify start point), a validation state, a combined initial setup and validation state (e.g., a combined state), a general operational state, a paused state, a perimeter cutting state, a perimeter walking state, a docking state, a charging state, a standby state, and an error state.

When operating in the initial setup state, the robotic mower 105 is configured to establish one or more start points 615 along the perimeter 610 of the operating area 605. To place the system 100 in the initial setup state, the user first actuates a button (e.g., the initiate setup button 830 on the boundary screen 805 or the initiate setup button 1030 on the start point screen 905) on the second input device 320 (e.g., the touch screen) of the external device 115.

Once selected, a series of commands are executed in no particular order: 1) the external device 115 begins to display the initialization startup screen 705 on the second display 325 (see FIG. 7A), and 2) the external device 115 transmits, via the second network interface 315 of the external device 115, a command to the tool 105 to return to the docking station 110. In circumstances where the tool 105 is not already docked with the docking station 110, the tool 105 will begin to travel back toward the docking station 110 either directly and/or by traveling along the perimeter 610 (e.g., via the boundary wire 608). In some embodiments, the tool 105 may also output an audio and/or visual signal to indicate that it has entered the initial setup state. While the illustrated system 100 establishes the docking station 110 as a home position, it is understood that in systems 100 with more than one docking station or no docking station, other locations along the perimeter 610 may be used. In such embodiments, the tool 105 will travel to the home position when the initial startup state is selected.

Figure 7A:
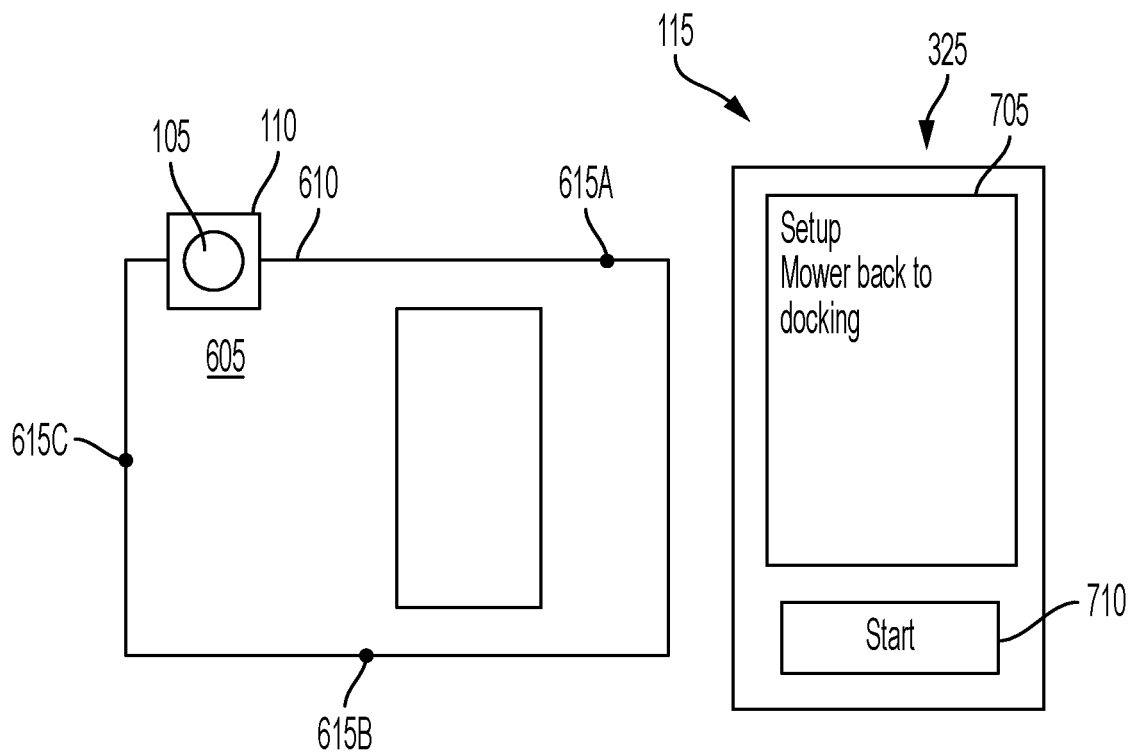

After the tool 105 has returned to the docking station 110 and docked therewith (e.g., returned to the home position), the "start" button on the initialization startup screen 705 will become active on the external device 115 (see FIG. 7A). When the user is ready to begin the initialization process, the user may then select the start button 710 whereby the external device 115 will transmit a command to the tool 105, via the second network interface 315, to begin advancing along the perimeter 610 in a first direction (e.g., in a clockwise direction).

Upon receiving the command from the external device 115, the robotic tool 105 travels along the perimeter 610 in the first direction under its own control, relying on any one of the electromagnetic signals output by the boundary wire 608 and/or the odometry unit 250 for guidance and telemetry. In other embodiments, the robotic tool 105 could be moved along the perimeter 610 under manual control by the user (e.g., via remote control, and/or physical movement of the robotic tool 105 by the user). This would allow the user to define not only establish the perimeter 610 of the operating area 605, but further internal boundaries within the perimeter 610 for representing non-operating areas (e.g., buildings, trees, driveways, etc.). Furthermore, the odometry unit 250 of the robotic tool 105 is simultaneously measuring the current distance and/or trajectory of the robotic tool 105 has traveled along the perimeter 610 with respect to the home position (e.g., the docking station 110). For the purposes of this application the current linear distance between the tool 105 and the home position, as measured along the perimeter 610, is referred to as the "current travel distance."

Figure 7B:
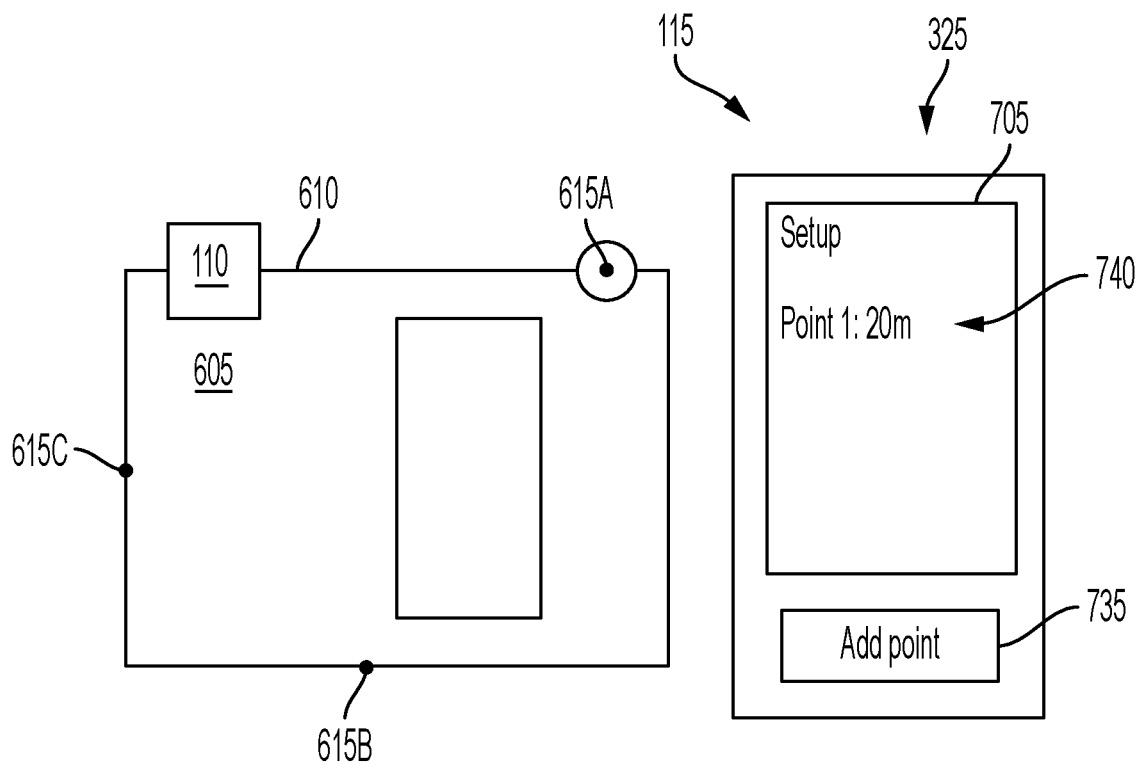

Once the tool 105 reaches the desired location along the perimeter 610 for the first start point 615A, the user selects the "add point" button 735 of the initialization startup screen 705 on the external device 115 (see FIG. 7B). By doing so, the external device 115 outputs a command to the tool 105 to record and output the current travel distance. Once the current travel distance is received by the external device 115, the device 115 displays an entry 740 on the second display 325 both confirming the start point 615A has been recorded and providing the details of the newly established start point 615A. In the illustrated embodiment, such details include listing the start point name or identification number (e.g., start point 615A is assigned the name "Point 1"), and displaying the linear distance between the start point 615A and the home position measured along the perimeter 610 (e.g., 20 m, see FIG. 7B). The odometry data indicative of the first start point 615A may then be stored by any of the first memory 210, the second memory 310, and/or the memory of the server 152. In some embodiments, the tool 105 may pause momentarily and/or output some form of audio and/or visual signal to confirm that the start point 615A has been created.

Figure 7C:
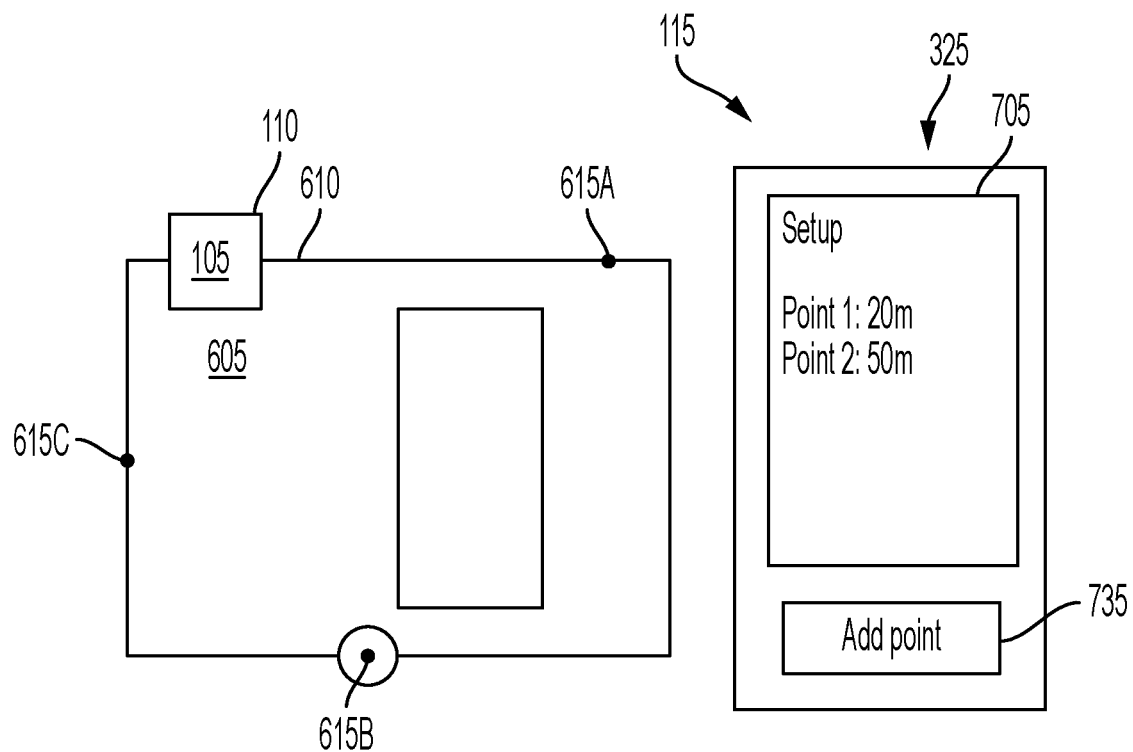
Figure 7D:
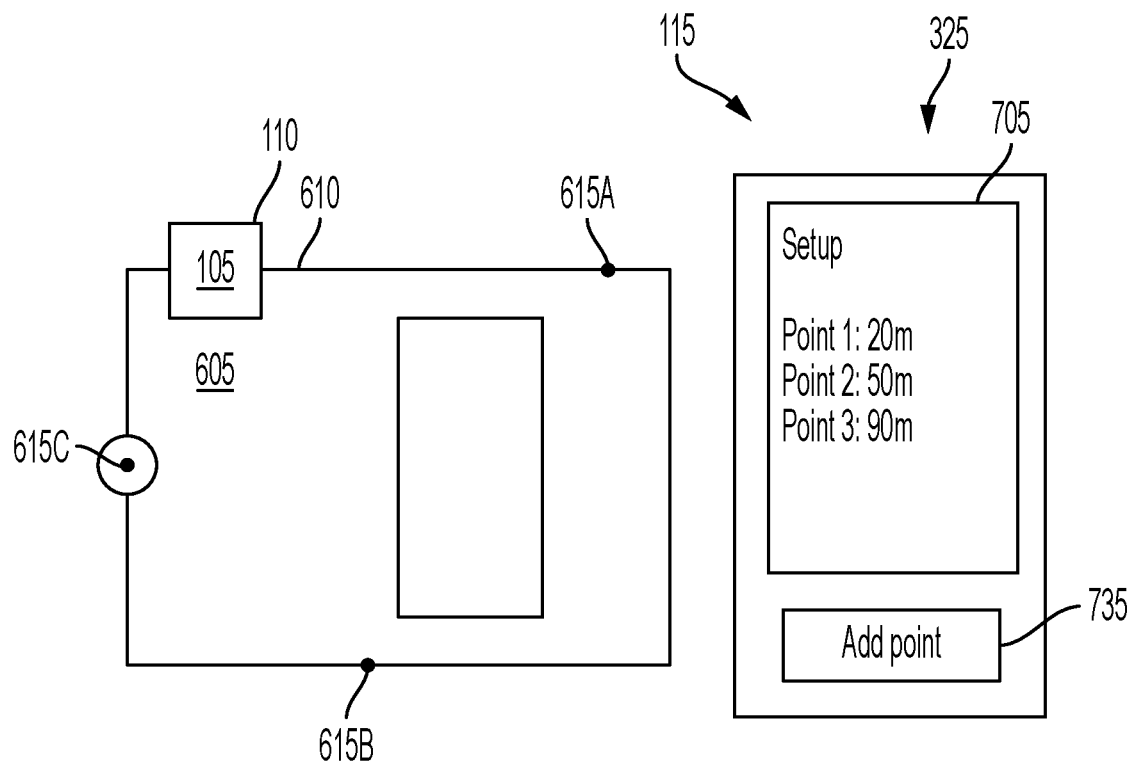

After the first start point 615A has been recorded and displayed, the tool 105 will resume traveling along the perimeter 610 in the first direction (e.g., in a clockwise direction) continuing to monitor and record the current travel distance and/or trajectory via the odometry unit 250. When the tool 105 reaches the desired location for the second start point 615B, the user again selects the "add point" button 735 of the display 795 on the external device 115. As discussed above, doing so causes the external device 115 to output a command to the tool 105 to record and output the current travel distance whereby the external device 115 will assign the point a name or identification number (e.g., start point 615B is assigned the name "Point 2"), and display the linear distance between the start point 615B and the home position (e.g., 50 m; see FIG. 7C). The user is then able to repeat this process until all of the desired start points 615A-C have been recorded and displayed in the manner discussed above (see FIG. 7D).

After completing a full loop of the perimeter 610 of the operating area 605, the tool 105 is configured to dock with the docking station 110 (when present) and record the overall perimeter distance and/or trajectory traveled via the odometry unit 250. The overall perimeter distance is then transmitted to the external device 115, via the first network interface 215. Once the final data is received, the external device 115 is configured to display the overall perimeter length 745 on the second display 325 and enable the "finish" button 747 (see FIG. 7E). In some other embodiments, the external device 115 is configured to display the map portion 810 representative of calculated dimensions of the perimeter 610. The user can then select the finish button 747 to exit the initial setup state and save all of the newly formed start points 615A-C and perimeter data in any one of the first memory 210, the second memory 310, and/or the memory of the server 152.

While the illustrated setup state created and recorded all of the desired start points 615A-C during a single loop of the perimeter 610, it is understood that in other embodiments the tool 105 may continue to loop the perimeter 610 (e.g., multiple times) until the user has created all of the desired start points 615A-C and selected the "finish" button 747. More specifically, the robotic tool 105 may take one or more laps around the perimeter 610 and relative to the docking station 110 in the initial setup state. None, one, or more than one start points 615A-615C may be saved during each lap around the perimeter 610 in the initial setup state. When calculating the boundary length, the robotic tool 105 may account for the number of laps around the perimeter 610 taken relative to the docking station 110. In some embodiments, the robotic tool 105 may take a first lap around the perimeter 610 and relative to the docking station 110. In this first lap, the odometry unit 250 may gather odometry data and calculate the boundary length. In a subsequent lap (i.e., a start point setting lap), the user may actuate the add start point button 1035 via the second input device 320 to set a start point (e.g., the start point 615A) along the perimeter 610. Any number of laps may be taken.

In still other embodiments, the screen 705 may include a button or feature allowing the user to individually select and delete specific start points 615 while remaining in the initial setup state. For example, if the user presses the "add point" button 735 at the wrong time (e.g., establishing a start point 615 in an undesired location) the screen 705 may have a button or feature whereby the offending start point 615 can be selected and deleted.

In some embodiments, the system 100 may include an alternative initial setup state whereby the user may use the external device 115 in place of the tool 105 to establish the start points 615A-C. Before the alternative initial setup state can be executed, the user may undergo some form of perimeter initialization. For example, in some embodiments a perimeter initialization may include having the tool 105 with an odometry unit 250 travel along and record the telemetry of the entire perimeter 610 of the operating area 605. In other embodiments, a perimeter initialization may occur when the user manually enters the layout and shape of the perimeter 610 into the device 115 (e.g., by entering the coordinates of waypoints and the like). In still other embodiments, the perimeter initialization may occur by having a computer-generated layout created based on one of a satellite image or other map of the operating area 605. In still other embodiments, a perimeter initialization may include the user having gone through the primary initial setup state discussed above.

With the perimeter initialized at some point in the past, the user may then enter the "alternative initial setup state" by selecting the necessary buttons on the second display 325 of the external device 115 (not shown). Once selected, the external device displays the initialization startup screen 705 or some variant thereof. The device 115 also activates and aligns the GPS or other location capabilities included thereon.

With the external device 115 prepared, the user can then walk directly to the location where he or she wishes the first start point 615A to be located. Once there, the user can select the "add point" button 735 whereby the GPS system of the device 115 records the present location of the device 115. Once recorded, the second electronic processor 305 is configured to compare and contrast the GPS data recorded by the device 115 with the initialized perimeter data discussed above. The second electronic processor 205 then enters the comparative data into one or more algorithms saved in the second memory 310 whereby the second electronic processor 305 establishes the first start point 615 at the point of the perimeter 610 located closest to the recorded GPS location. The algorithm then also calculates the current travel distance based on the initialized perimeter data. With the location and current travel distance established, the device 115 may then display the start point name and current travel distance on the second display 325 as discussed above. The user can then repeat this process until all of the desired start points 615A-C are created.

In still other embodiments, the user may walk along the perimeter 610 of the operating area 306 whereby the second electronic processor 305 will operate in a similar manner to that described with respect to the tool 105 above—only substituting the compiled GPS data from the device 115 for the odometry unit 250 data.

Figure 7F:
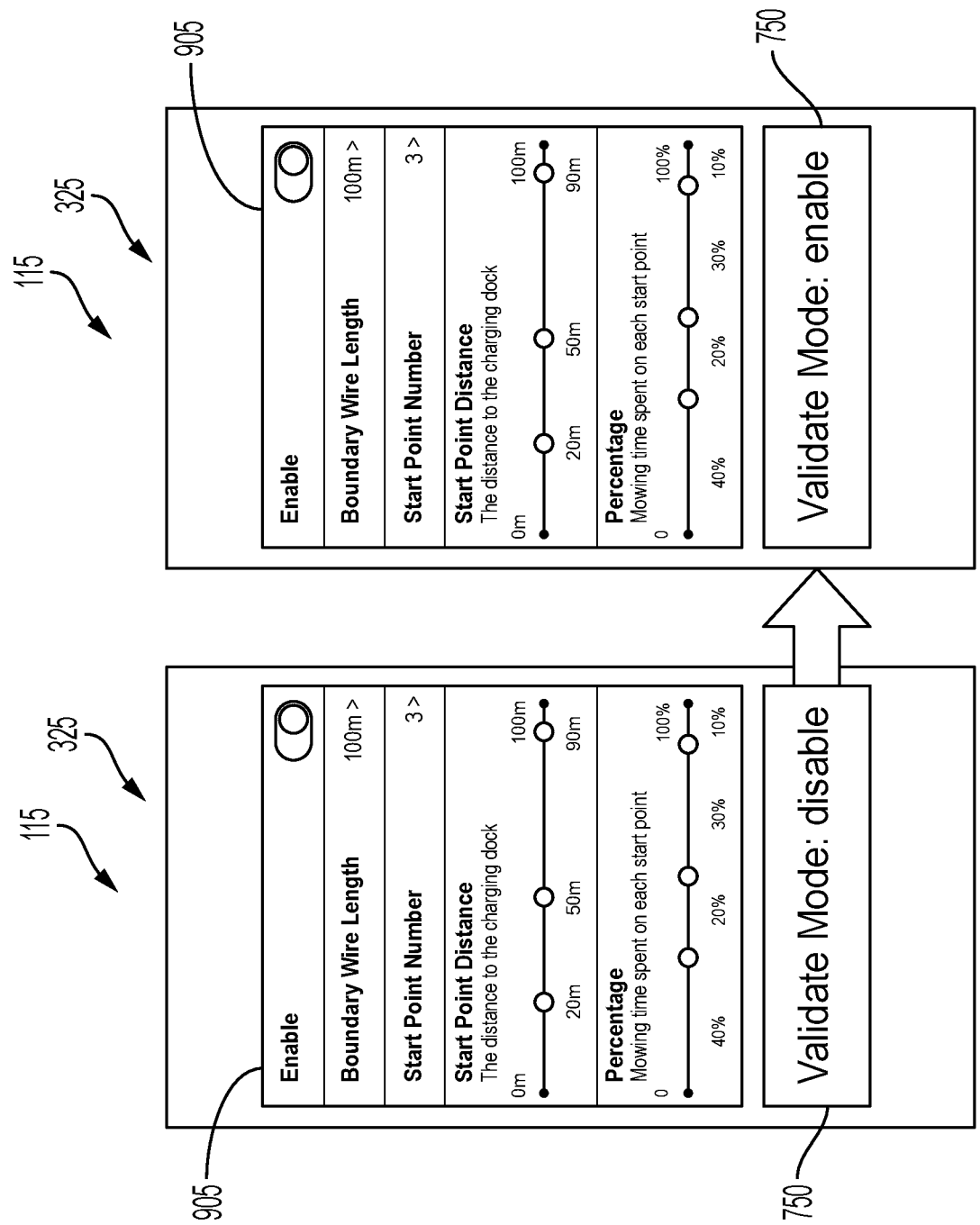
FIG. 7F illustrates screenshots of an example a start point screen including a validation mode enabling icon.

As shown in FIG. 7F, after at least one of the desired start points 615 is known (e.g., the first start point 615A has been recorded and saved), the system 100 may be placed in a "validation state" whereby the user is able to individually confirm that the start points 615A-C are each in a desired position and, if one or more of the start points 615 are misplaced, adjust the position of the start point 615 along the length of the perimeter 610.

To enter the validation state, the user may interact with the second input device 320 (e.g., the touch screen) of the external device 115. More specifically, when the user is viewing the start point screen 905, the user may actuate the "validate mode" icon 750—changing the icon 750 to the enabled condition and placing the system 100 in the validation state.

With the system 100 in the validation state, the user is then generally able to select any one of the start point indicators 950 whereby the system 100 will "validate" the start point position already stored in memory by instructing the tool 105 to physically travel to and stop at the saved position along the perimeter 610 of the operating area 605. If the indicated position is undesirable, the user may then manipulate the selected start point position (e.g., by sliding the corresponding start point indicator 950 along the line segment 940, described above), whereby the system 1000 will output instructions to the tool 105 so that any changes instituted by the user on the second display 325 of the external device 115 via the second input device 320 are physically carried out and reproduced in real-time along the perimeter 610 of the operating area 605 by the tool 105 itself.

Having enabled the validation state, the external device 115 begins by displaying start point screen 905 whereby each of the entries shown represents the current operating conditions of the system 100. More specifically, the second display area 910B includes a line segment 940 with a plurality of start point indicators 950 positioned thereon. The indicators 950, in turn, are positioned to represent the current saved start point 615 locations. For example, the left-most start point indicator 950 represents the saved location of the first start point 615A which is 20 meters from the home position, the middle start point indicator 950 represents the saved location of the second start point 615B which is 50 m from the home position, and the right-most indicator 950 represents the saved location of the third start point 615C which is 90 meters from the home position. The second display area 910B also includes a second end indicator 945B which displays the current saved overall perimeter length of the perimeter 610, which in the illustrated embodiment is 100 meters.

In addition to instructing the external device 115 to display the start point screen 905 as described above, the system 100 may also output instructions to the tool 105 instructing it to return to the home position (e.g., return to and dock with the docking station 110). In some embodiments, the tool 105 may output audio and/or visual signals indicating that it has entered into the validation state.

To validate one of the start point positions, the user must first select the indicator 950 corresponding to the desired start point 615A-C. For example, if the user wants to validate the first start point 615A, he or she may do so by selecting (e.g., taping on) the left-most start point indicator 950. Upon selecting the left-most start point indicator 950, the external device 115 is configured to output commands, via the second electronic processor 305, to the tool 105 instructing the tool 105 to travel along the perimeter 610 in the first direction (e.g., clockwise) for 20 meters. In some embodiments, the external device 115 may also display some form of acknowledgement (e.g., having the point indicator 950 change colors, begin blinking, change shape, and the like) to signal to the user that the command was received and in the process of being executed. In still other embodiments, the external device 115 may switch to an alternative screen layout emphasizing the current position of the first start point 615A and the options available to the user.

Upon receiving the command from the external device 115, the robotic tool 105 travels along the perimeter 610 in the first direction (e.g., clockwise) under its own control, relying on any one of the electromagnetic signals output by the boundary wire 608 and/or the odometry unit 250 for guidance and telemetry. Furthermore, the odometry unit 250 of the robotic tool 105 simultaneously measures the current distance the robotic tool 105 has traveled away from home position. Once the odometry unit 250 signals that 20 meters has been traversed, the robotic tool 105 comes to a stop. In some embodiments, the robotic tool 105 may also be configured to output a visual and/or audible signal to signify that the instructed location has been successfully reached.

In instances where the displayed start point location 615A is undesirable, the user may then adjust the position via the external device 115. More specifically, the user may select and drag the left-most point indicator 950 along the line segment 940 until the indicator 950 is in the desired location. For example, if the user believes the first start point 615A is too far from the docking station 110, the user may select and drag the left-most point indicator 950 to the left (e.g., toward the first end 940A) to the desired location (e.g., to a 10 m position).

Once the user disengages from the left-most point indicator 950, the updated location is saved in memory and the difference in position calculated by the second electronic processor 305. Once calculated, the external device 115 outputs a command to the tool 105 instructing it to travel 10 m closer to the home position (e.g., toward the docking station 110). Upon receiving the command from the external device 115, the robotic tool 105 travels along the perimeter 610 in a second direction (opposite the first direction) under its own control until the odometry unit 250 signals that 10 meters has been traversed. The tool 105 then comes to a stop at the updated location. The user is able to repeat the above described process until the first start point 615A is in the desired location. The first start point 615A may be repositioned to an adjusted (i.e., edited) first start point 615D. This adjusted first start point 615D may be saved to any viable memory (e.g., the first memory 210, the second memory 310, memory of the docking station 110, and/or memory of the server 152) for future recall.

With the first start point 615A in the desired position, the user may then validate another start point 615B, 615C by selecting another point indicator 950 as described above. Upon doing so, the external device 115 outputs commands to the tool 105 causing it to travel along the perimeter 610 until it is in a position corresponding to the saved position for the newly selected start point 615B, 615C. The user is then free to independently change the location of the selected start point 615B, 615C as described above.

Once all of the start points 615A-C have been validated, the user may then re-select the validation mode icon 750—changing the status to "disabled." By doing so, the system 100 exits the validation state and any additional changes to the locations of the start points 615A-C will not be carried out by the tool 105.

In some embodiments, the system 100 may include a combined initial setup state and validation state (e.g., a combined state). In a combined state, the robotic tool 105 is configured to travel along the perimeter 610, receiving instructions from the external device 115 to add a start point 615A to the perimeter 610 at a particular location and to prompt the user to validate the start point before the tool 105 will continue along the perimeter 610 to the subsequent location. More specifically, the user first places the system 100 in the combined state by selecting one or more buttons on the external device 115 (not shown). Once selected, the external device 115 may be instructed to display the start point screen 905 while the tool 105 is instructed to return to the home position (e.g., to return to and dock with the docking station 110).

With the system 100 properly configured, the start point screen 905 may begin with the second display area 910B blank, only having a line segment 940 shown thereon. The user may then place an indicator 950 on the segment by tapping or touching the second input device 320, which may be a touchscreen including the second display 325, in the general location of where the user wishes the first start point 615A to be located. In some instances the screen 905 may include a keypad to allow the user to insert a specific value, however in other embodiments the user may drag his or her finger along the line segment 940 until the proper location is produced.

With the first indicator 950 positioned, the external device 115 may then save the position data in memory and output a command to the tool 105 to travel the selected distance along the perimeter 610. Upon receiving the command from the external device 115, the robotic tool 105 travels along the perimeter 610 in the first direction (e.g., clockwise) under its own control, relying on any one of the electromagnetic signals output by the boundary wire 608 and/or the odometry unit 250 for guidance and telemetry. Furthermore, the odometry unit 250 of the robotic tool 105 simultaneously measures the current distance the robotic tool 105 has traveled away from home position. Once the odometry unit 250 signals that the selected distance has been traversed, the robotic tool 105 comes to a stop. In some embodiments, the robotic tool 105 may also be configured to output a visual and/or audible signal to signify that the instructed location has been successfully reached.

With the tool 105 in position, the user may then evaluate whether the indicated position is acceptable. If the user does not accept the position, the user may then adjust the position as described above with respect to the validation state (e.g., the tool 105 will change positions along the perimeter 610 in real time to reflect the adjustments being made by the user). Once the position is acceptable, the user can accept the position (e.g., validate the position) whereby the tool 105 will begin traveling to the next desired position as established by the second placed indicator 950. In instances where no additional indicators 950 are present, the tool 105 may travel along the remainder of the perimeter 610 until it meets with and docks to the docking station 110—recording and saving the overall perimeter length at the same time.

Once all of the start points 615A-C are in the desired positions, the user may de-select the combined state whereby the system 100 will return to normal operating conditions.

In another embodiment of a combined state, a user may engage the initiate setup button 1030 of the second input device 320. By doing so, the tool 105 begins to travel along the perimeter 610 in the first direction (e.g., clockwise). Once the robotic tool 105 reaches a desired start point (e.g., start point 615A), the user can select the add start point button 1035 to instruct the robotic tool 105 to stop and gather data regarding the current position of the tool 105 as detected by the odometry unit 250. The collected data can then be saved as a first start point 615A, and displayed as a newly added start point indicator 950 positioned on the line segment 940.

Once the start point indicator 950 is added, the tool 105 remains in place allowing the user to evaluate whether the indicated position is acceptable. If the user does not accept the position, the user may then adjust the position as described above with respect to the validation state (e.g., the tool 105 will change positions along the perimeter 610 in real time to reflect the adjustments being made by the user). Once the position is acceptable, the user can accept the position (e.g., validate the position) whereby the tool 105 will continue traveling along the perimeter 610 in the first direction (e.g., clockwise).

After the first start point 615A is established, the user may continue to add subsequent start points 615B, 615C using the same process as described above. Once all of the start points 615A-C are established, the user may select (e.g., tap, click), via the second input device 320, the complete button 1040. The start points 615A-C and the position of the corresponding start point indicators 950 are then be saved in any of the first memory 210, the second memory 310, the memory of the docking station 110, or the memory of the server 152 for future reference. The system 100 can then return to normal operating conditions.

During operation in the general state, the robotic tool 105 is configured to carry out one or more operation sessions whereby the mower 105 travels within the perimeter 610 of an operating area 605 to execute a task (e.g., mowing a lawn, fertilizing a lawn, shoveling a driveway, and the like). More specifically, the tool 105 may be configured to travel randomly within the operating area 605 defined by the perimeter 610 with the goal of traveling over or engaging the entire operating area 605.

Figure 5A:
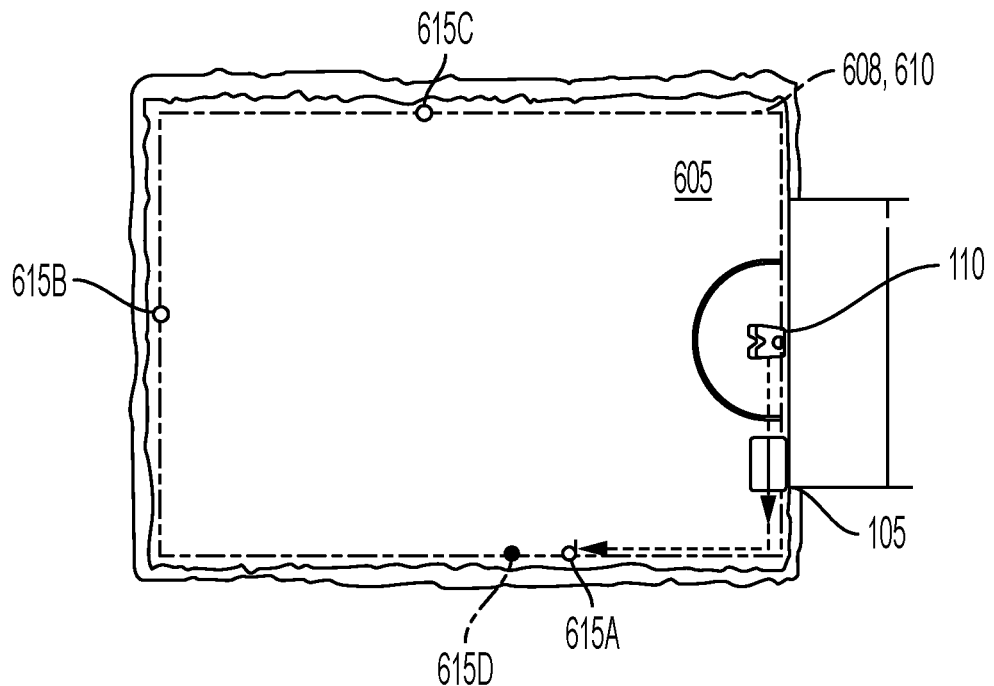
FIGS. 5A-5B are top views of the robotic garden tool of FIG. 1A traveling along an exemplary operating area.
Figure 5B:
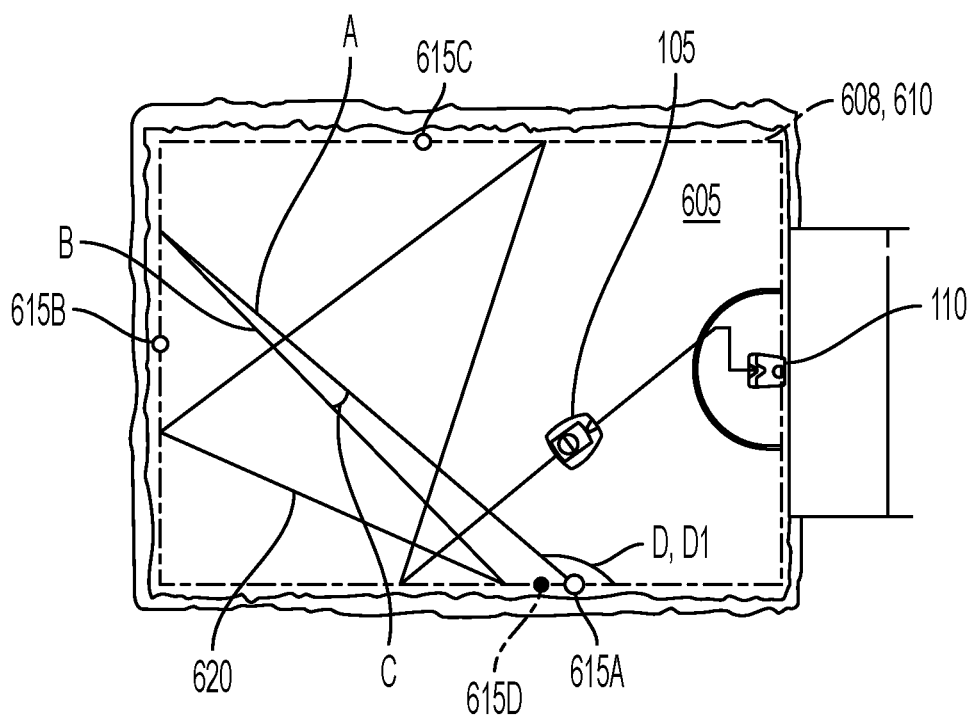
Figure 6A:
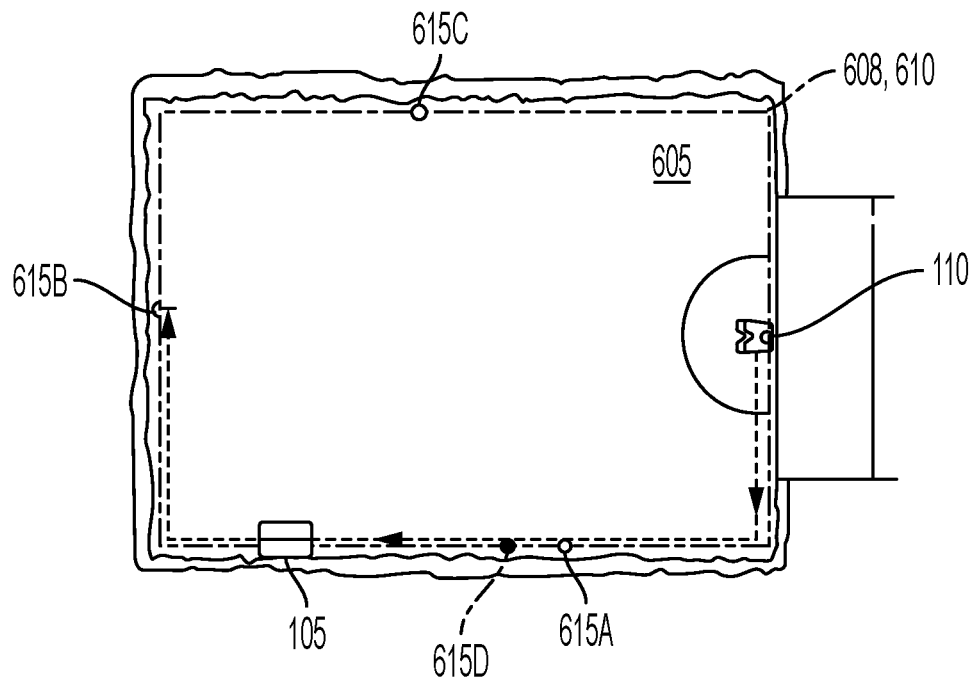
FIGS. 6A-6B are top views of the robotic garden tool of FIG. 1A operating in the exemplary operating area.

To do so, the tool 105 begins each session at a docking station 110 positioned on or near the perimeter 610 of the operating area 605 (e.g., a home position; see FIGS. 5, 6). As illustrated in FIG. 5, once prompted to begin operations in a general operational state, the robotic tool 105 first travels along the perimeter 610 (e.g., following the boundary wire 608 when present or traveling along a pre-saved perimeter path) until reaching the pre-selected one of a plurality of start points 615A-615C (described below). In some embodiments, the pre-selected start point 615A-C may be randomly generated or selected as part of an overall operating program. In other embodiments, the user may individually select an ordered list of start points 615A-C as they see fit.

As illustrated in FIG. 6, after reaching the desired start point (e.g., illustrated start point 615A in FIG. 6), the robotic tool 105 then turns and travels into the operating area 605 producing a first departure angle D1 relative to the perimeter 610. In some embodiments, the robotic tool 105 may also implement a first set of operating parameters (e.g., operating attributes) at this time. Such operational parameters may include, but are not limited to the cutting height, cutting speed, travel speed, etc.). Upon leaving the first start point 615A, the robotic tool 105 then travels in an approximate straight line across the operating area 605 defining a first path A and treating (e.g., cutting with the working tool 135) the vegetation over which it travels.

The tool 105 continues to travel along the first path A until the robotic tool 105 encounters and detects the perimeter 610. In the illustrated embodiment, the robotic tool 105 may detect the perimeter 610 based on the above-described electromagnetic signal emitted by the boundary wire 608. With the perimeter 610 detected, the robotic tool 105 is then configured to turn a predetermined amount (e.g., turn angle C) and continue traveling in an approximate straight line along a new, second path B while continuing to treat the operating area 605 over which the tool 105 passes. The mower 105 is then configured to travel along the new path B until encountering and detecting the perimeter 610, at which point the tool 105 undergoes a second turn and the process repeats.

The tool 105 is configured to continue operating in the above-described manner until the overall task completes (e.g., the entire operating area 605 has been treated) and/or some form of alert is detected (e.g., low battery) causing the session to end and the robotic tool 105 to return to the docking station 110.

Upon detecting and/or receiving an alert, the first electronic processor 205 of the robotic tool 105 may determine that the tool 105 should return to the docking station 110. For example, the first electronic processor 205 may indicate that an alert condition exists in response to determining that a charge level of the battery 245 is below a predetermined threshold, in response to determining that inclement weather is occurring or about to occur (e.g., based on detecting high humidity or rain by one or more of the sensors 230, etc.), or in response to determining that a scheduled time period for operation has elapsed or is about to elapse. In other embodiments, the robotic tool 105 may be configured to generate an alert and act upon the alert in response to detection of operating conditions relating to the environment within the operating area 605. For example, if vegetation within the operating area 605 is too rigorous (e.g., grass or vegetation too thick, too severely sloped terrain, icy driveways, etc.), operation of the robotic tool 105 may be adjusted and/or ceased. In some embodiments, the alert may be generated by the first electronic processor 205, and be transmitted via the first network interface 215 and the second network interface 315 to the external device 115 to be displayed to the user via the second display 325. The user may then choose to act upon the alert (e.g., ignore, return the robotic tool 105 to the docking station 110, and/or adjust an operational parameter of the tool 150 itself.

In instances where the robotic tool 105 is forced to return to the docking station 110 due to an alert (e.g., the previous session was ended), the robotic tool 105 may then begin a new session once the alert has been cleared (e.g., the battery has been charged, the fertilizer levels replenished, the error corrected, and/or obstruction cleared). To start the new session, the robotic tool 105 travels along the perimeter 610 until reaching a second start point 615B, different than the first start point 615A. The robotic tool 105 may be configured to start from one of a plurality of start points 615A-615C. As will be described in detail below, the robotic tool 105 may start at any one of the plurality of start points 615A-615C each time a new session begins.

Figure 6B:
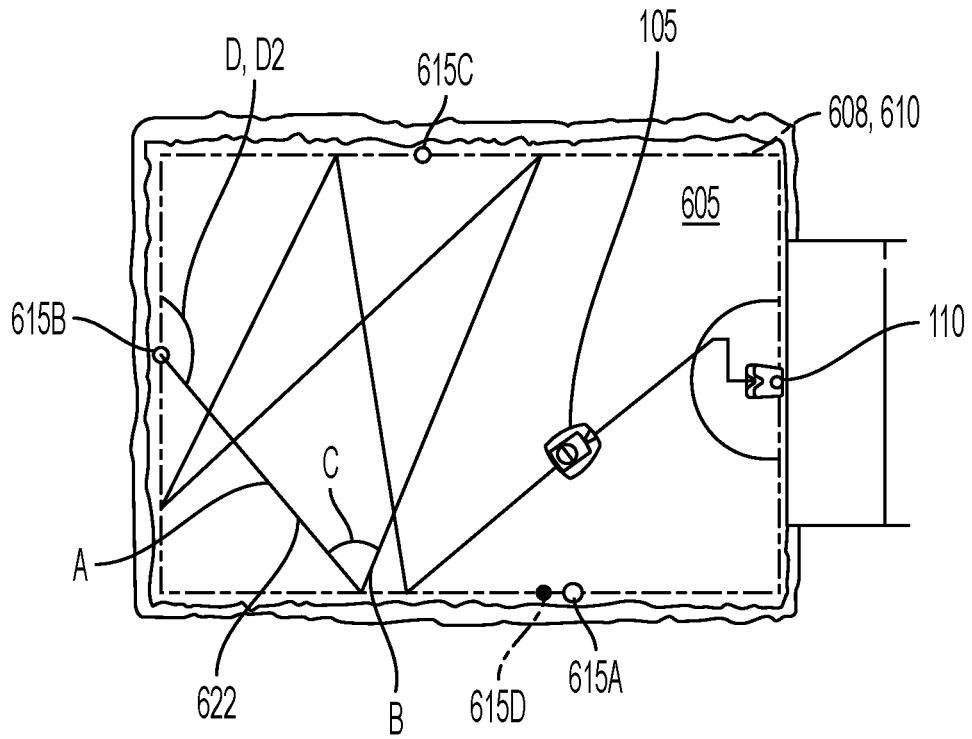

As illustrated in FIG. 6B, once in place at the second start point 615B, the robotic tool 105 then turns and travels into the operating area 605 at a departure angle D2 while implementing a second set of operating parameters that may or may not be different from the first set of operating parameters. The robotic tool 105 then repeats the process as described above along a new set of travel paths 622 (including the above-described first path A, second path B). Depending on the size of the operating area 605 and the operating capabilities of the robotic tool 105 (e.g., an effective diameter of the cutting blades 140), the robotic tool 105 may undergo multiple sessions, each originating at a new start point, having a unique departure angle D, and/or unique operating parameters, until the task is complete.

Any parameter relating to the travel of the robotic tool 105 and/or the working tool 135 may be adjusted based on the start point 615A-615C at which the robotic tool 105 begins an operation session. For example, the robotic tool 105 may depart from any given start point 615A-615C at a preselected departure angle D which may be different than a departure angle of another start point (e.g., departure angle D1 from start point 615A and departure angle D2 from start point 615B may be different). In other embodiments, the robotic tool 105 may record, in memory (e.g., the first memory 210, the second memory 310, a memory of the docking station 110, or a memory of the server 152) a departure angle D1 of a first session of the robotic tool 105 starting at the first start point 615A. In a subsequent session of the robotic tool 105 starting at the first start point 615A, the departure angle D1 saved in the memory may be accessed by the first electronic processor 205, and the first electronic processor 205 may either choose to operate the robotic tool 105 with the same departure angle D1 as the first session, or another departure angle D1 different than the first session. In the event that the same departure angle D1 is used in the first session and the subsequent session, the robotic tool 105 may travel, in the subsequent session, along the same path 620 as the first session. In the event that differing departure angles D1 are used in the first session and the subsequent session, the robotic tool 105 may travel, in the subsequent session along a different path (not shown) when compared to the first session. In other embodiments, the path 620 may be generally random in the first session in which the robotic tool 105 starts at the start point 615A. The path 622 may travel in an entirely different manner than the path 620. For example, the path 622, starting from the start point 615B may travel in parallel rows or columns between sides of the perimeter 610.

In other embodiments, other operational parameters may be adjusted based on the start point 615A-615C at which the robotic tool 105 begins operation. For example, the different cutting height of the cutting blade 140 may be adjusted. The cutting blade 140 may be positioned at a first height (e.g., a high level) upon starting the session adjacent the first start point 615A. The sessions may be completed, and a subsequent session adjacent the second start point 615B may be initiated. Upon or prior to reaching the second start point 615B, the height of the cutting blade 140 may be positioned at a second height (e.g., a low level) for cutting vegetation. This may be especially helpful in areas (e.g., tall grass, wet grass) which are demanding on the cutting blade 104 and/or the working tool motor 240. In other embodiments, rather than adjusting a position (e.g., height) of the cutting blade (e.g., the working tool 135), the working tool motor 240 may be operated at different speeds. Various other attributes relating to adjusting operation of the travel and/or the operation of the working tool 135 based on a given start point 615A-615C are within the scope of the disclosure.

In the illustrated embodiment, the magnitude of the turn angle C, the magnitude of the departure angle D, and the order in which start points 615A-615C are selected is done at random (e.g., by a random number generator) by one of the first electronic processor 205 or the second electronic processor 305. By doing so, the robotic tool 105 travels along a unique path during each session. In other embodiments, a frequency of use of each of the start points 615A-615C may be monitored by, for example, the first processor 205, and the first processor 205 may instruct the robotic tool 105 to begin a session at a start point (e.g., the start point 615C) which has less than desired starts. For example, if a desired frequency at a start point (e.g., the start point 615C) is desired to be 30%, but the robotic tool 105 has only started 10% of sessions at the start point 615C, then the first processor 205 may choose to start the session with the robotic tool 105 at the start point 615C to balance the desired start point frequency and the actual frequency of which the robotic tool 105 starts at the start point 615C.

In other embodiments, the robotic tool 105 may travel in a fully or partially predetermined pattern within the operating area 605 perimeter 610. For example, the mower 105 may travel in parallel rows or columns between sides of the perimeter 610 to more efficiently and evenly cover the operating area 605. In still other embodiments, the robotic tool 105 may travel along pre-determined paths and/or keep track of its current location within the operating area 605. In embodiments where the previous travel path of the robotic tool 105 is recorded, the first electronic processor 205 and/or the second electronic processor 305 may be configured to review the path to assure that the entire operating area has been treated.

In still other embodiments, the robotic tool 105 may have a pre-ordered list of start points, departure angles D, and/or turn angles C for each subsequent session within a task. In such embodiments, the user may even select a particular program from a list of pre-determined path lists or path parameters to customize the task being performed by the robotic tool 105. Different portions of the operation area 605 may be prone to require differing amounts of operation thereon/therein. For example, in some instances, vegetation in some portions of the operation area 605 may be thicker, heavier, and/or grow at a rate higher than other portions of the operation area 605. In other instances, the operation area 605 itself may be shaped such that typical operation of the robotic tool 105 in the operation area 605 may force operation of the robotic tool 105 in some portions of the operation area 605 more than other portions of the operation area 605 (e.g., due to random turning or other turning sequences of the robotic tool 105 in the operation area 605). Accordingly, it may be difficult for a user to continuously monitor cutting operation of the lawn mower 105 for efficient operation of the robotic tool 105 in the operation area 605. Thus, there is a technological problem related to efficiently operating robotic garden tools in various portions of the operation area 605.

The systems, methods, and devices described herein address the above-noted technological problem by providing a user interface/screen on the second display 325 of the external device 115 to indicate various start point details of the robotic tool 105 to the user in an organized fashion. The user interfaces/screens also allow the user to easily revise/adjust start point information of the robotic tool 105. For example, a start point screen 905 (see FIGS. 9A-9D) provided on the second display 325 improves user interaction between the robotic tool 105 and the user to allow the user to monitor and adjust one or more start points of the robotic tool 105 (or of multiple robotic mowers 105) more efficiently. Further, operational parameters (e.g., relating to the path of the robotic tool 105 and/or the working tool 135) may be adjusted based on the start point (e.g., the first start point 615A) to further customize and thus improve efficiency of the robotic tool 105.

Although aspects of the disclosure have been described in detail with reference to certain preferred embodiments, variations and modifications exist within the scope and spirit of one or more independent aspects as described.

The invention claimed is:

1. An external device for use with one or more robotic tools, the external device comprising:
 a display;
 a device network interface configured to allow the external device to wirelessly communicate with the one or more robotic tools;
 an electronic processor coupled to the display, the device network interface, and a memory, and configured to communicate with the one or more robotic garden tools via the device network interface, the electronic processor configured to
  display a start point screen on the display, the start point screen including an initiate setup button and an add start point button,
  wherein when the initiate setup button is selected by a first user input, the processor is configured to send a signal to the first robotic garden tool to travel from a dock and along a perimeter of an operating area,
  wherein the first robotic garden tool includes an odometry unit, which, while the first robotic garden tool travels along the boundary of the operating area, gathers data indicative of the position of the first robotic garden tool,
  wherein when the add start point button is selected by a second user input, the processor is configured to retrieve a first position of the first robotic garden tool, the first position being indicative of a first start point remote of the dock, and
  wherein the first robotic garden tool is configured to return to the dock after traveling along the perimeter and to communicate a calculated boundary length based on the data gathered by the odometry unit to the processor.

2. The external device of claim 1, wherein the start point button is configured to be selected during a first instance of the first robotic garden tool traveling from the dock and along the boundary of the operating area.

3. The external device of claim 1, wherein the odometry unit continuously communicates data indicative of the position of the first robotic garden tool with the external device via the device network interface.

4. The external device of claim 3, wherein a current boundary length is calculated based on the data gathered by the odometry unit, and the current boundary length is displayed on the setup screen as the first robotic garden tool travels along the boundary.

5. The external device of claim 1, wherein the setup screen includes an indicia relating to the calculated perimeter length.

6. The external device of claim 1, wherein the setup screen includes a line segment indicative of the perimeter, and a first start point indicia is populated adjacent the line segment at a corresponding length along the boundary as the first position.

7. The external device of claim 6, wherein the setup screen further includes a start point indicia relating to the length of the first position relative to the dock.

8. The external device of claim 1, wherein in a first lap of the first robotic garden tool along the perimeter, the odometry unit gathers data for calculation of the boundary length, and in a subsequent start point setting lap of the first robotic garden tool along the perimeter, the start point button is selected by the second user input to generate the first start point.

9. The external device of claim 1, wherein after the first robotic garden tool returns to the dock and receives instructions to operate in a general operational state, the first robotic garden tool is configured to travel along the perimeter to the first start point and operate within the operating area starting from the first start point.

10. The external device of claim 9, wherein
 when the add start point button is selected by a third user input, the processor is configured to retrieve a second position of the first robotic garden tool, the second position being indicative of a second start point remote of the dock, the second position being different than the first position; and
 one of the first robotic garden tool and the external device includes a frequency balancing feature configured to determine whether the first robotic garden tool should travel along the perimeter to the first start point or the second start point prior to operation within the operating area from either the first start point or the second start point.

11. An external device comprising:
 a display;
 a device network interface configured to allow the external device to wirelessly communicate with one or more robotic garden tools;
 an electronic processor coupled to the display, the device network interface, and the memory, and configured to communicate with the one or more robotic garden tools via the device network interface, the electronic processor configured to
  display a start point screen on the display, the start point screen including a line segment indicative of a perimeter of an operating area, and at least one start point indicator indicative of a first start point of the first robotic tool along the boundary,
  wherein when a first start point indicator of the at least one start point indicator is selected by a first user input, the processor is configured to send a signal to the first robotic garden tool to travel to the first start point, and
  wherein the first start point indicator is configured to be edited by a second user input to edit the first start point, and the processor is configured to reprogram the first start point to an adjusted first start point.

12. The external device of claim 11, wherein the first start point indicator is positioned adjacent the line segment a corresponding amount relating to a first distance between a dock on the perimeter and the first start point.

13. The external device of claim 12, wherein the edited first start point is positioned adjacent the line segment a corresponding amount relating to a second distance between the dock and the edited start point.

14. The external device of claim 12, wherein the electronic processor is configured to display a start point indicia on the start point screen and adjacent both the first start point indicator and the line segment, the start point indicia providing further indication of the distance between the dock and the first start point.

15. The external device of claim 11, wherein the electronic processor is configured to display a second start point indicator on the start point screen, the second start point indicator being indicative of a second start point of the first robotic garden tool along the boundary.

16. The external device of claim 11, wherein the electronic processor is configured to display a boundary length indicia on the start point screen, the boundary length indicia being indicative of a length of the boundary.

17. The external device of claim 11, wherein the electronic processor is configured to display a graphical user input interface once the external device receives the second user input, the graphical user input interface presenting to a user a plurality of options for adjusting the position of the first start point to the adjusted first start point.

18. An external device comprising:
   a display;
   a device network interface configured to allow the external device to wirelessly communicate with one or more robotic garden tools;
   an electronic processor coupled to the display, the device network interface, and the memory, and configured to communicate with the one or more robotic garden tools via the device network interface, the electronic processor configured to
   display a start point screen on the display, the start point screen including a first display area having a line segment and at least one frequency adjustment indicator,
   wherein the line segment is indicative of a starting frequency of a first robotic garden tool of the one or more robotic garden tools to start cutting at either a first start point or a second start point different than the first start point, and
   wherein the frequency adjustment indicator is configured to be edited by a user input to edit the starting frequency of the first robotic garden tool.

19. The external device of claim 18, wherein the electronic processor is further configured to display a second display area having a second line segment and at least one start point indicator.

20. The external device of claim 19, wherein the first line segment and the second line segment extend parallel to one another in the first display area and the second display area, respectively.

\* \* \* \* \*